(12) United States Patent
Sahu et al.

(10) Patent No.: US 10,341,317 B2
(45) Date of Patent: Jul. 2, 2019

(54) SYSTEMS AND METHODS FOR IMPLEMENTING A PERSONALIZED PROVIDER RECOMMENDATION ENGINE

(71) Applicant: YP LLC, Tucker, GA (US)

(72) Inventors: Sudheer Sahu, Encinitas, CA (US); Randell Beltran, Arcadia, CA (US); Monik Khare, Pasadena, CA (US); Premkumar Mani, Santa Clarita, CA (US); Gunjan Sharman, Los Angeles, CA (US); Saravana Narayana Reddy Siddhavarapu, Glendale, CA (US); Nataliya Kupchyk, Sherman Oaks, CA (US)

(73) Assignee: YP LLC, D/FW Airport, TX (US)

(*) Notice: Subject to any disclaimer, the term of this patent is extended or adjusted under 35 U.S.C. 154(b) by 196 days.

(21) Appl. No.: 14/918,340

(22) Filed: Oct. 20, 2015

(65) Prior Publication Data
US 2016/0112394 A1 Apr. 21, 2016

Related U.S. Application Data

(60) Provisional application No. 62/096,162, filed on Dec. 23, 2014, provisional application No. 62/066,333, filed on Oct. 20, 2014.

(51) Int. Cl.
*H04L 29/06* (2006.01)
(52) U.S. Cl.
CPC ............ *H04L 63/08* (2013.01); *H04L 63/102* (2013.01)

(58) Field of Classification Search
CPC ............................ G06Q 30/02; G06Q 30/0256
See application file for complete search history.

(56) References Cited

U.S. PATENT DOCUMENTS

| 6,970,848 | B2 * | 11/2005 | Osaka | G06F 21/31 |
| | | | | 705/50 |
| 7,353,182 | B1 * | 4/2008 | Missinhoun | G06Q 10/0631 |
| | | | | 705/7.12 |
| 7,401,025 | B1 * | 7/2008 | Lokitz | G06Q 30/0281 |
| | | | | 705/346 |

(Continued)

*Primary Examiner* — Mahfuzur Rahman
*Assistant Examiner* — Richard W Cruz-Franqui
(74) *Attorney, Agent, or Firm* — Mark E. Stallion; Greensfelder Hemker & Gale PC

(57) ABSTRACT

Techniques for making personalized provider recommendations in related categories include identifying a first entity category from a plurality of entity categories based on context information. A first category relationship is identified from a plurality of category relationships based on the first entity category. The first category relationship indicates that the first entity category and a second entity category are related. A first provider specific profile is identified from a plurality of provider specific profiles based on user profile data associated with a user account. The first provider specific profile is associated with the first entity category. A second provider specific profile associated with the second entity category is identified from the plurality of provider specific profiles based on the user profile data. A plurality of providers including a first provider associated with the first provider specific profile and a second provider associated with the second provider specific profile is displayed.

20 Claims, 20 Drawing Sheets

(56) References Cited

U.S. PATENT DOCUMENTS

| | | | | |
|---|---|---|---|---|
| 8,065,156 B2* | 11/2011 | Gazdzinski | ........ | G06Q 30/0251 704/275 |
| 8,229,782 B1* | 7/2012 | Adams | ................. | G06Q 10/10 705/7.32 |
| 9,348,918 B2* | 5/2016 | Rose | ...................... | G06Q 30/02 |
| 2002/0152136 A1* | 10/2002 | Hill | ....................... | G06Q 30/02 705/14.73 |
| 2005/0024376 A1* | 2/2005 | Gettman | ............... | G06F 16/954 345/582 |
| 2006/0110009 A1* | 5/2006 | Klassen | .................. | G06T 7/001 382/112 |
| 2007/0067305 A1* | 3/2007 | Ives | ....................... | G06Q 30/02 |
| 2008/0268868 A1* | 10/2008 | Maitland | ............... | G06Q 30/02 455/456.1 |
| 2011/0191142 A1* | 8/2011 | Huang | ............... | G06Q 30/0204 705/7.33 |
| 2011/0313840 A1* | 12/2011 | Mason | .................. | G06Q 30/02 705/14.35 |
| 2012/0072441 A1* | 3/2012 | True | ...................... | G06Q 10/10 707/769 |
| 2012/0131136 A1* | 5/2012 | Kelley | .................. | G06O 30/02 709/217 |
| 2012/0189186 A1* | 7/2012 | Csulits | .................... | G07D 7/12 382/135 |
| 2012/0221600 A1* | 8/2012 | Yan | ....................... | G06O 30/02 707/769 |
| 2013/0080447 A1* | 3/2013 | Ramer | .................. | G06O 30/02 707/748 |
| 2013/0286018 A1* | 10/2013 | Freyhult | ................ | G09G 5/393 345/428 |
| 2016/0112394 A1* | 4/2016 | Sahu | ...................... | H04L 63/08 726/7 |
| 2016/0171103 A1* | 6/2016 | Fanous | .............. | G06F 16/9535 707/770 |

* cited by examiner

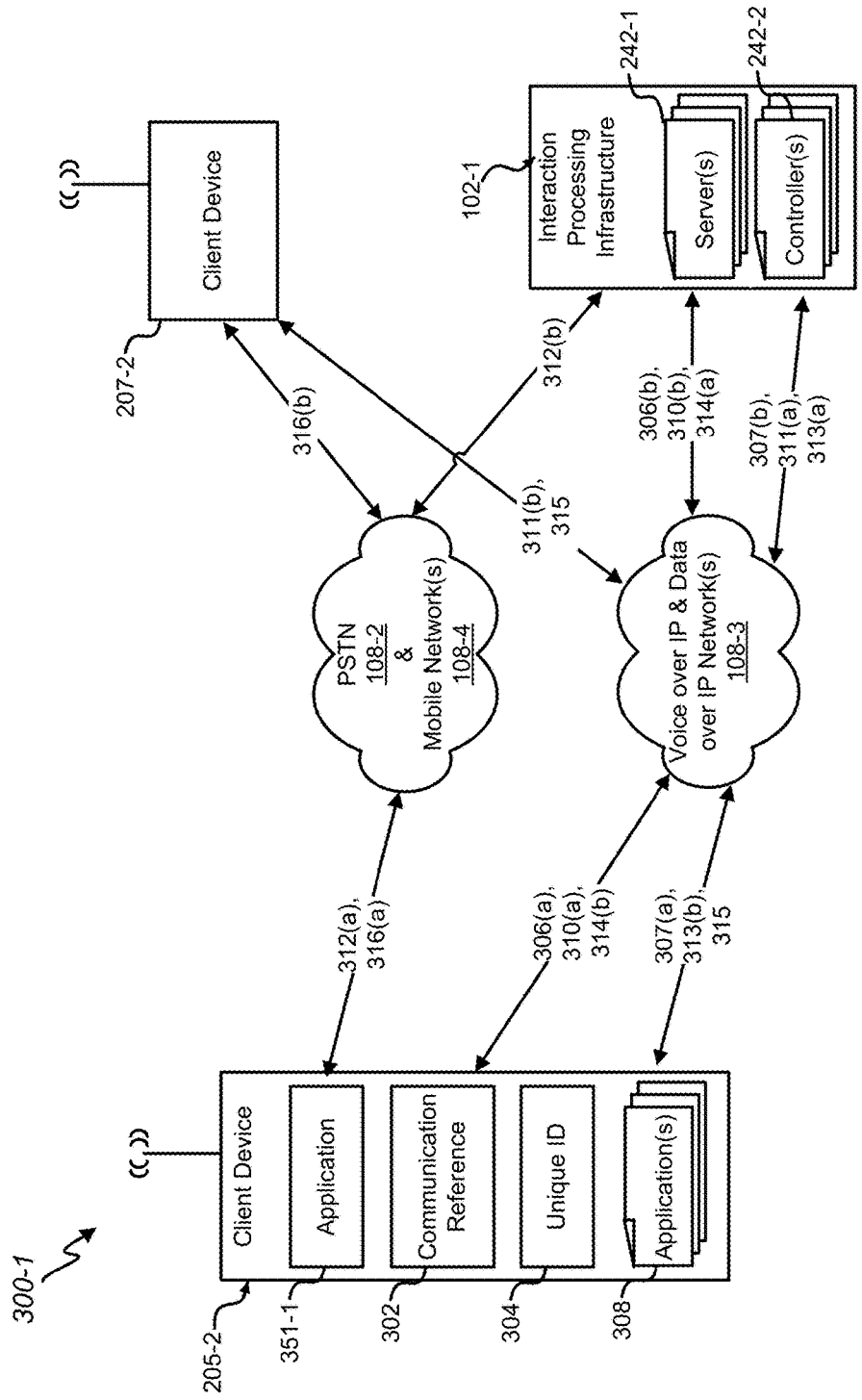

SYSTEMS AND METHODS FOR IMPLEMENTING A PERSONALIZED PROVIDER RECOMMENDATION ENGINE

CROSS-REFERENCES TO RELATED APPLICATIONS

This application claims the benefit of U.S. Provisional Patent Application No. 62/096,162 filed Dec. 23, 2014, entitled "TRIP PLANNING FOR A TASK LIST," and U.S. Provisional Patent Application No. 62/066,333 filed Oct. 20, 2014, entitled "TRIP PLANNING FOR A TASKS LIST," the entire disclosures of which are hereby incorporated by reference for all purposes.

BACKGROUND

Certain embodiments of the present disclosure relate generally to recommendation engines, and in particular to systems and methods for making personalized provider recommendations in related categories.

The internet and mobile technology have made information more accessible and easier to use, presenting consumers with an increasing number of choices and amount of detail. Ideally, providers compete for customers by making better products and improving levels of service. However, in reality, providers have to devote more and more resources to advertising just to get the attention of consumers. To compensate, providers make more focused and tailored offerings. This creates a paradox for consumers where the ease and faster speeds of access to information have led to greater amounts of effort and time being spent on making narrower consumption decisions. Thus, for savvy consumers that do their research, technology can result in less productivity and more stress, transforming a simple decision such as where to go for dinner into a difficult task.

There is a need for systems and methods to provide personalized recommendations in a range of products and services. This and other needs are addressed by the present disclosure.

BRIEF SUMMARY

In one embodiment, a system for making personalized provider recommendations in related categories is presented. The system includes a network attached storage, a user interface, and a computer server system.

The network attached storage is configured to store a plurality of entity categories, a plurality of provider specific profiles, a plurality of category relationships, and a plurality of user accounts. Each entity category indicates at least one of a type of good and a type of service offered by a provider. Each provider specific profile includes an associated provider and at least one associated entity category from the plurality of entity categories. Each category relationship indicates that two or more entity categories from the plurality of entity categories are related. Each user account includes associated authentication data and associated user profile data.

The user interface is configured to receive authentication information from a user and transmit the authentication information to the computer server system. The user interface is further configured to receive context information that indicates at least one of a current condition or an attribute of an environment of the user, and transmit the context information to the computer server system. Additionally, the user interface is configured to receive a plurality of providers that are personalized to the user from the computer server system and display the plurality of providers.

The computer server system is communicatively coupled to the network attached storage and the user interface. The computer server system is configured to receive the authentication information from the user interface. A first user account is identified from the plurality of user accounts based on the authentication information. The computer server system compares the authentication information with a first authentication data that is associated with the first user account and the user is authenticated based on the comparison of the authentication information with the first authentication data. The computer server system is further configured to receive the context information from the user interface and identify a first entity category from the plurality of entity categories based on the context information. A first category relationship is identified from the plurality of category relationships based on the first entity category. The first category relationship indicates that the first entity category and a second entity category are related. A first provider specific profile is identified from the plurality of provider specific profiles based on a first user profile data that is associated with the first user account. The first provider specific profile is associated with the first entity category. A second provider specific profile is identified from the plurality of provider specific profiles based on the first user profile data. The second provider specific profile is associated with the second entity category. Additionally, the computer server system is configured to transmit the plurality of providers to the user interface. The plurality of providers includes a first provider associated with the first provider specific profile and a second provider associated with the second provider specific profile.

In another embodiment, a method is presented for making personalized provider recommendations in related categories. The method includes storing a plurality of entity categories, a plurality of provider specific profiles, a plurality of category relationships, and a plurality of user accounts. Each entity category indicates at least one of a type of good and a type of service offered by a provider. Each provider specific profile includes an associated provider and at least one associated entity category from the plurality of entity categories. Each category relationship indicates that two or more entity categories from the plurality of entity categories are related. Each user account includes associated authentication data and associated user profile data.

The method further includes receiving authentication information from a user. A first user account is identified from the plurality of user accounts based on the authentication information. The authentication information is compared with a first authentication data that is associated with the first user account and the user is authenticated based on the comparison of the authentication information with the first authentication data. Context information indicating at least one of a current condition or an attribute of an environment of the user is received and a first entity category is identified from the plurality of entity categories based on the context information. A first category relationship is identified from the plurality of category relationships based on the first entity category. The first category relationship indicates that the first entity category and a second entity category are related. A first provider specific profile is identified from the plurality of provider specific profiles based on a first user profile data that is associated with the first user account. The first provider specific profile is associated with the first entity category. A second provider specific profile is identified from the plurality of provider specific profiles based on the first user profile data. The second provider specific profile is associated with the second entity category. A plurality of providers including a first provider associated with the first provider specific profile and a second provider associated with the second provider specific profile are displayed.

In a further embodiment, a non-transitory computer-readable medium is presented. The non-transitory computer-readable medium has instructions stored therein, which when executed cause a computer to perform a set of operations including receiving authentication information for a user. A first user account is identified from a plurality of user accounts based on the authentication information. The authentication information is compared with a first authentication data that is associated with the first user account and the user is authenticated based on the comparison of the authentication information with the first authentication data. Additional operations include receiving context information indicating at least one of a current condition or an attribute of an environment of the user and identifying a first entity category from a plurality of entity categories based on the context information. Each entity category indicates at least one of a type of good and a type of service offered by a provider. A first category relationship is identified from a plurality of category relationships based on the first entity category. The first category relationship indicates that the first entity category and a second entity category are related. Further operations include identifying a first provider specific profile from a plurality of provider specific profiles based on a first user profile data that is associated with the first user account and identifying a second provider specific profile from the plurality of provider specific profiles based on the first user profile data. The first provider specific profile is associated with the first entity category and the second provider specific profile is associated with the second entity category. A plurality of providers is transmitted to a user interface for display. The plurality of providers includes a first provider associated with the first provider specific profile and a second provider associated with the second provider specific profile.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

FIG. 3B depicts a high-level block diagram of a system for communication routing and tracking, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims. Further, when a particular feature, structure, or characteristic is described in connection with an embodiment, it is submitted that it is within the knowledge of one skilled in the art to affect such feature, structure, or characteristic in connection with other embodiments whether or not explicitly described.

Certain embodiments according to the present disclosure may provide for systems and methods that recommend providers personalized to user with the goal of improving engagement. Embodiments can be used in native mobile applications, mobile web, and web home pages to provide "You Might Like" recommendations. In addition, embodiments can provide recommendations based on the user's current search in a search results page as well as a listing page. Further features include the ability to recommend providers for a geographical location to be used in site map generation to further improve search engine optimization. Recommendations are made in related or complementary categories of providers with diverse results in each category.

Various embodiments will now be discussed in greater detail with reference to the accompanying figures, beginning with FIG. 1.

Figure 1:
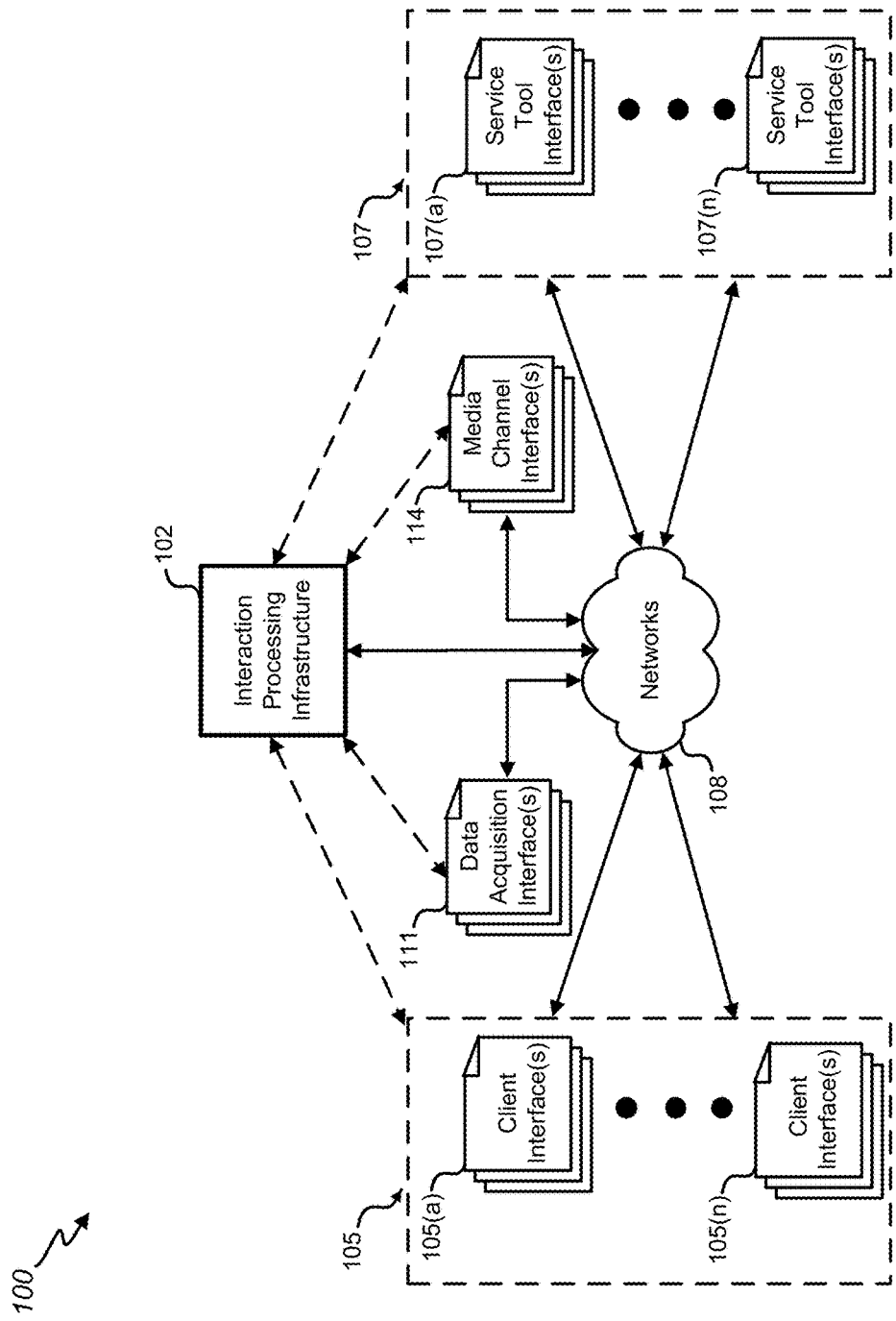
FIG. 1 is a high-level block diagram of a system, in accordance with certain embodiments of the present disclosure.

FIG. 1 depicts a high-level block diagram of a system 100, in accordance with certain embodiments of the present disclosure. The system 100 may allow for interaction between two or more of an interaction processing infrastructure 102 (sometimes referenced herein as interaction infrastructure 102), client interfaces 105, service tool interfaces 107, data acquisition interfaces 111, and/or media channel interfaces 114. As depicted, components of the system 100 may be communicatively coupled or couplable to one or more networks 108.

The one or more networks 108 may be a suitable means to facilitate data transfer in the system 100 and could include multiple networks and/or network components. In various embodiments, the one or more networks 108 may be implemented with, without limitation, one or more of the Internet, a wide area network (WAN), a local area network (LAN) such as one based on Ethernet, Token-Ring and/or the like, a wireless network (e.g., a network operating under Bluetooth®, any of the Institute of Electrical and Electronics (IEEE) 802.11 suite of protocols, and/or any other wireless protocol), a wireless local area network (WLAN), a cellular network, such as through 4G, 3G, GSM (Global System for Mobile Communications), etc., another wireless network, a gateway, a public switched telephone network (PSTN), and/or any other appropriate architecture or system that facilitates the communication of signals, data, and/or message. In various embodiments, the one or more networks 108 may transmit data using any suitable communication protocol(s), such as, without limitation, TCP/IP (transmission control protocol/Internet protocol), SNA (systems network architecture), IPX (Internet packet exchange), AppleTalk, and/or the like. In various embodiments, the one or more networks 108 and its various components may be implemented using hardware, software, and communications media such wires, optical fibers, microwaves, radio waves, and other electromagnetic and/or optical carriers; and/or any combination of the foregoing and/or the like. In some embodiments, the network 108 may include a telephone network that may be circuit switched, package switched, or partially circuit switched and partially package switched. For example, the telephone network may partially use the Internet to carry phone calls (e.g., through VoIP).

The interaction processing infrastructure 102 may facilitate searching of one or more information repositories in response to data received over the one or more networks 108 from any one or combination of the interfaces. In various embodiments, the interaction processing infrastructure 102 may include a set of devices configured to process, transform, encode, translate, send, receive, retrieve, detect, generate, compute, organize, categorize, qualify, store, display, present, handle, or use information and/or data suitable for the embodiments described herein. For example, servers of the infrastructure 102 may be used to store software programs and data. Software implementing the systems and methods described herein may be stored on storage media in the servers. Thus, the software may be run from the storage media in the servers. In some embodiment, software implementing the systems and methods described herein may be stored on storage media of other devices described herein.

The interaction processing infrastructure 102 may be implemented in or with a distributed computing and/or cloud computing environment with a plurality of servers and cloud-implemented resources. The interaction processing infrastructure 102 may include processing resources communicatively coupled to storage media, random access memory (RAM), read-only memory (ROM), and/or other types of memory. The interaction processing infrastructure 102 may include various input and output (I/O) devices, network ports, and display devices.

In certain embodiments, the interaction processing infrastructure 102 may be communicatively coupled or couplable to one or more data sources via one or more data acquisition interfaces 111. The one or more data sources may include any suitable source of data to facilitate embodiments disclosed further herein. In various embodiments, the one or more data sources may include one or more of a database, a website, any repository of data in any suitable form, and/or a third party system. In various embodiments, the one or more data sources may correspond to one or more social media websites and/or photo-sharing websites. With some embodiments, the data sources may include one or more mobile computing device locator services that provide information regarding the location of one or more client devices 205 and/or 207 (depicted in FIG. 2). With some embodiments, the data sources may provide various details relating to call data. With some embodiments, the data sources may provide caller name information from calling name delivery (CNAM), also known as caller identification or caller ID, may be used to determine particular details about the caller. With some embodiments, the data sources may provide information about the area of a caller. With some embodiments, the data sources may provide demographic data about an area.

In various embodiments, the data from the one or more data sources may be retrieved and/or received by the interaction processing infrastructure 102 via the one or more data acquisition interfaces 111 through network(s) 108 and/or through any other suitable means of transferring data. In some embodiments, the interaction processing infrastructure 102 and the data sources could use any suitable means for direct communication. According to certain embodiments, data may be actively gathered and/or pulled from one or more data sources, for example, by accessing a third party repository and/or by "crawling" various repositories. Certain data pulled and/or pushed from the one or more data sources may be transformed and the transformed data and/or other data generated based thereon may be made available by the interaction processing infrastructure 102 for users of client devices 205 and/or 207. In alternative embodiments, data from the one or more data sources may be made available directly to client devices 205 and/or 207.

In some embodiments, the one or more data acquisition interfaces 111 may be implemented in similar manner to interfaces 105 and/or 107 or any other suitable interface. In some embodiments, the one or more data acquisition interfaces 111 may include one or more application programming interfaces (APIs) that define protocols and routines for interfacing with the data sources. The APIs may specify application programming interface (API) calls to/from data source systems. In some embodiments, the APIs may include a plug-in to integrate with an application of a data source system. The one or more data acquisition interfaces 111, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

According to certain embodiments, the interaction processing infrastructure 102 may include or provide a service management platform. A provider may access the interaction processing infrastructure 102 via a service tool interface 107. An end user may access the interaction processing infrastructure 102 via a client interface 105. The interaction processing infrastructure 102 may facilitate searching of one or more information repositories in response to information received over the network 108 from the client interfaces 105 and/or service tool interfaces 107.

The client interfaces 105 and/or service tool interfaces 107 may allow for transfer of and access to information in accordance with certain embodiments disclosed herein. In various embodiments, the client interface(s) 105 and/or service tool interface(s) 107 may include one or more suitable input/output modules and/or other system/devices operable to serve as an interface between a service provider(s) and the provider management platform. The client interfaces 105 and/or service tool interfaces 107 may facilitate communication over the network 108 using any suitable transmission protocol and/or standard. In various embodiments, the interaction infrastructure 102 may include, provide, and/or be configured for operation with the client interfaces 105 and/or service tool interfaces 107, for example, by making available and/or communicating with one or more of a website, a web page, a web portal, a web application, a mobile application, enterprise software, and/or any suitable application software. In some embodiments, a client interface 105 and/or service tool interface 107 may include an API to interact with the interaction infrastructure 102.

In some embodiments, a client interface 105 and/or a service tool interface 107 may include a web interface. In some embodiments, the client interface 105 and/or service tool interface 107 may include or work with an application made available to one or more interfaces, such as a mobile application as discussed herein. In some embodiments, the client interface 105 and/or service tool interface 107 may cause a web page to be displayed on a browser of a service provider. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the interaction processing infrastructure 102 may have web site(s)/portal(s) giving access to such information, such as a provider portal.

In various embodiments, a client interface 105 and/or a service tool interface 107 may include providing one or more display screen images that may each include one or more user interface elements. A user interface may include any text, image, and/or device that can be displayed on a display screen for providing information to a user and/or for receiving user input. A user interface may include one or more widgets, windows, dashboards, text, text boxes, text fields, tables, grids, charts, hyperlinks, buttons, lists, combo boxes, checkboxes, radio buttons, and/or the like.

In certain embodiments, a client interface 105 and/or a service tool interface 107 may include a computing device of an end user and/or a service provider. In certain embodiments, a client interface 105 and/or a service tool interface 107 may include a mobile computing device that may be any portable device suitable for sending and receiving information over a network in accordance with embodiments described herein.

Certain embodiments may provide a multi-channel communication regime to coordinate multiple communication channels used by end users and providers. Multiple communication pipes within a communication pipe could be implemented according to certain embodiments. Some embodiments may implement a greater number of communication channels. For example, one set of channels could be used for an end user to request help, and one set of channels could be used for a provider to respond to the end user. The system can use web communication, text communication, voice communication, e-mail communication, push notification, and/or the like.

According to certain embodiments, the interaction processing infrastructure 102 may be or include a content provisioning platform. In some embodiments, the interaction processing infrastructure 102 may provide for the selection, generation, and provision of content objects to one or more client interfaces 105. In certain embodiments, providers may have content objects that may be placed in a web page made available to one or more client interfaces 105. In certain embodiments, providers may have content objects that may be displayed with an application made available to one or more client interfaces 105, such as a mobile application according to various embodiments. In some embodiments, placement of the content objects could be in accordance with one or more paid placement arrangements and one or more content presentation models.

Content objects may be included in a results page responsive to a keyword search initiated by an end user via, for example, a webpage and/or a mobile application. The search may be performed by an online search engine facilitated by the interaction processing infrastructure 102. A content object of provider may be included within a results page with results identified and/or compiled by the search engine and sent via the network 108 to the client interface 105 of the end user that initiated the search.

An end user, in various embodiments, may correspond to an end user of products, services, and/or information. A provider, in various embodiments, may correspond to (and may be variously referenced herein by) any one or combination of a service provider, a product provider, a merchant, a commercial entity, an advisor, a representative, and/or the like. End users may use one or more client interfaces 105; providers may use one or more service tool interfaces 107.

Figure 2:
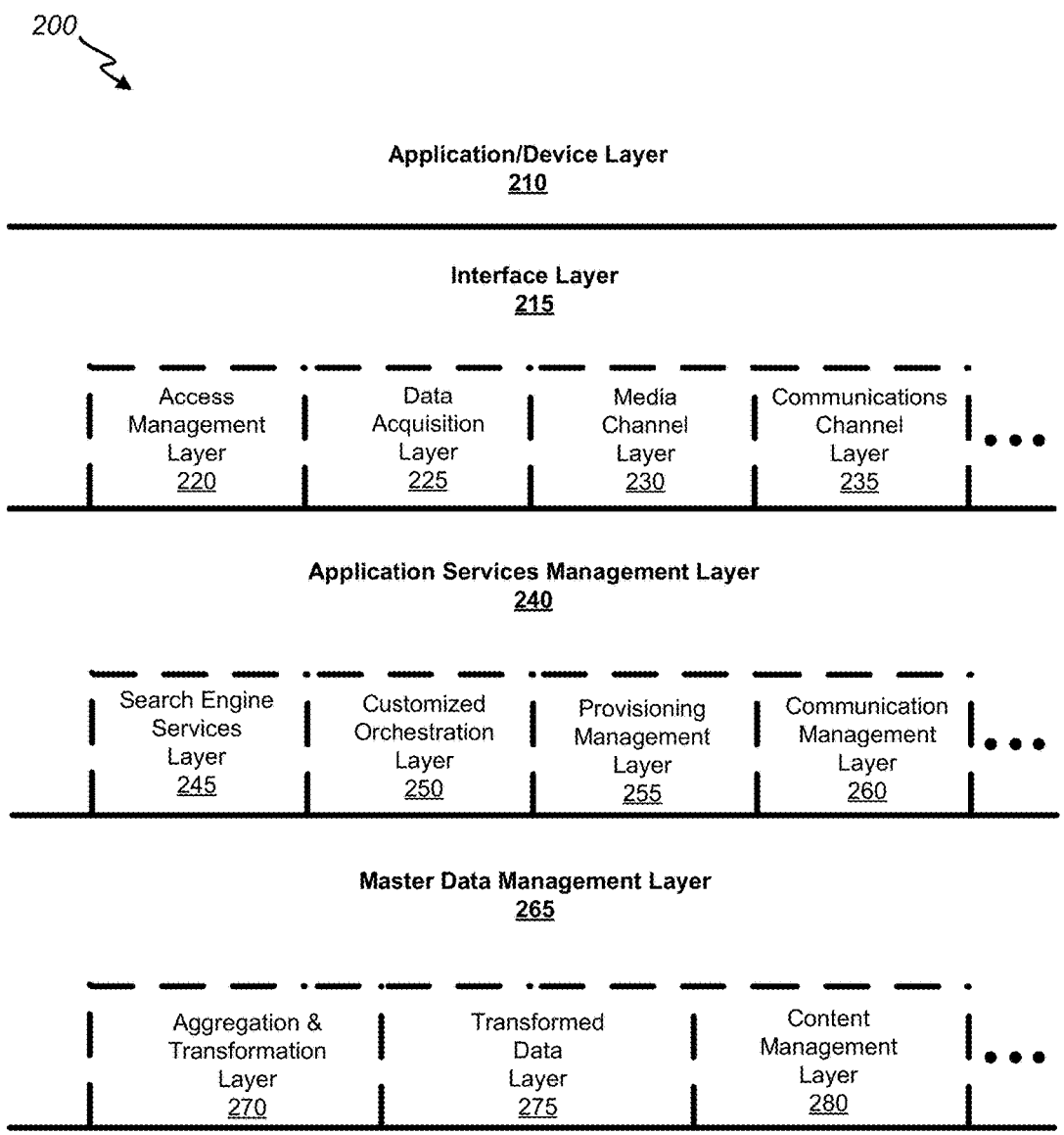
FIG. 2 shows a diagram of an architecture stack of the interaction infrastructure, in accordance with certain embodiments of the present disclosure, in accordance with certain embodiments of the present disclosure.

FIG. 2 shows a diagram of an architecture stack 200 of the interaction infrastructure 102, in accordance with certain embodiments of the present disclosure. While architecture stack 200 is illustrated as having a particular structure, it should be understood that certain embodiments may include other structures, including those with more or less layers than illustrated, in varying orientations and divisions. The architecture stack 200 may be implemented across a plurality of systems and/or subsystems corresponding to the interaction infrastructure 102. In some embodiments, a multi-layer part of the architecture stack 200 may be implemented at a single system or device within the interaction infrastructure 102.

The different layers of the architecture stack 200 are described generally herein with reference to FIG. 2 and in detail with reference to subsequent figures. From a high level perspective, the architecture stack 200 may include an application and/or device layer 210, an application services management layer 240, and/or a master data management layer 265. The application and/or device layer 210, the application services management layer 240, and/or the master data management layer 265 may include or otherwise interface with any of various sublayers. In some embodiments, the application and/or device layer 210, the application services management layer 240, and/or the master data management layer 265 may share resources and services with any one or combination of sublayers; and, in some embodiments, certain sublayers may share resources and services with certain other sublayers.

The application/device layer 210 may include user devices and applications for interacting with the other elements of the architecture stack 200 via the elements of an interface layer 215. For example, the applications may include web-based applications, entity portals, mobile applications, widgets, and the like for requesting services from and/or otherwise accessing the interaction infrastructure 102. These applications may run on one or more user devices. The user devices may be any suitable user device as detailed herein.

The interface layer 215 of the architecture stack 200 may provide interfaces for a user device to interact with the other elements of the architecture stack 200. For example, clients, entities, administrators, and others serviced by and/or otherwise associated with the interaction infrastructure 102 may utilize one or more user devices interacting within the application/device layer 210 to request services and/or access from an application services management layer 240. In some examples, a web-based search interface, a mobile application search interface, an orchestration platform interface, a provider dashboard interface, and/or the like may be provided.

In various embodiments, the interface layer 215 may include or otherwise interface with any one or combination of an access management layer 220, a data acquisition layer 225, a media channel layer 220, a communications channel layer 235, and/or the like layer in accordance with embodiments disclosed herein.

The architecture stack 200 may include an access management layer 220. The access management layer 220 may include elements to manage access to services and/or data. For example, the access management layer 220 may include elements to verify user login credentials, IP addresses associated with a user device, device IDs, telephone numbers, locations, and/or the like in order to provide certain services and/or access.

The architecture stack 200 may include a data acquisition layer 225. In some embodiments, the data acquisition layer 225 may be included in the application services management layer 240. The data acquisition layer 225 may receive data from various data sources to facilitate various embodiments disclosed herein. The any one or combination of data sources disclosed herein and/or the like, with aggregation being facilitated in some embodiments with any one or combination of interfaces 105, 107, 111, 114 and/or client devices 205, 207.

The architecture stack 200 may include a media channel layer 220. The media channel layer 220 may provide interfaces for the interaction infrastructure 102 to utilize various media channels. For example, services may be provided to clients, entities, administrators, and others serviced by and/or otherwise associated with the interaction infrastructure 102 by way of media channels of many various types including websites, mobile applications, social/provider network websites, cable and satellite television, telephone systems, video distribution, and print (e.g., newspapers and magazines).

The architecture stack 200 may include a communications channel layer 235. The communications channel layer 235 may provide interfaces for the interaction infrastructure 102 to centrally manage services based on real-time communications. For example, services may be provided to clients, entities, administrators, and others serviced by and/or otherwise associated with the interaction infrastructure 102 by way of tracking and/or handling of communications such as telephone calls, video calls, messages, chats, video conferencing, and/or the like in response to content objects presented through the various media channels.

In various embodiments, the application services management layer 240 may include or otherwise interface with any one or combination of a search engine services layer 245, a customized orchestration layer 250, a content provisioning management layer 255, a communications management layer 260, and/or the like layer in accordance with embodiments disclosed herein. In various embodiments, the search engine services layer 245 may include elements to provide effective search services to end users, providers, and/or internal elements and/or users of the interaction infrastructure 102. In some embodiments, the search services may include geo-aware search services. The geo-aware search services may provide fast and efficient access to information tailored to particular geographies. In various embodiments, the master data management layer 265 may include or otherwise interface with any one or combination of an aggregation and transformation layer 270, a transformed data layer 275, a content management layer 280, and/or the like layer in accordance with embodiments disclosed herein.

Figure 4:
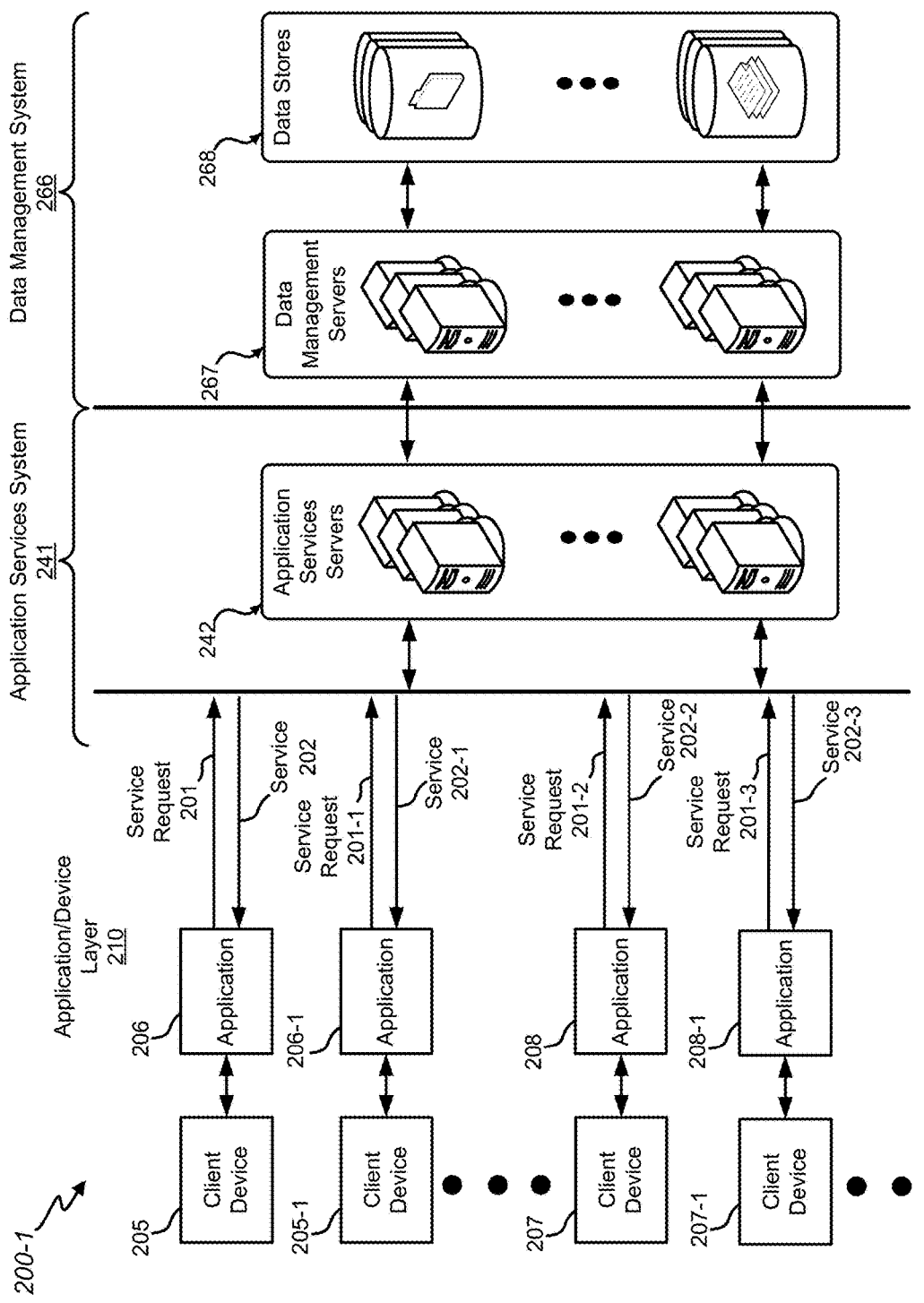
FIG. 4 shows a diagram of a portion of the architecture stack of the interaction infrastructure including certain aspects of an application/device layer, an application services system, and a data management system, in accordance with certain embodiments of the present disclosure.

FIG. 4 shows a diagram of a portion 200-1 of the architecture stack 200 of the interaction infrastructure 102, in accordance with certain embodiments of the present disclosure. The portion 200-1 at least partially includes the application/device layer 210, as wells as an application services system 241 and a data management system 266 of the interaction infrastructure 102. In some embodiments, the application services system 241 may correspond at least partially to the interface layer 215 and the application services management layer 240. In some embodiments, the data management system 266 may correspond at least partially to the master data management layer 265.

The application services system 241 may interface with the application/device layer 210 and the data management system 266. In some embodiments, the application services system 241 may include at least part of the application/device layer 210. The application services system 241 could be a middle tier of the interaction infrastructure 102 in some embodiments, with the data management system 266 corresponding to a back-end in some embodiments.

The application services system 241 and the data management system 266 each may be or include a server system 242 and a server system 267, respectively, that include one or more servers. In various embodiments, the server systems 242, 267 may include one or more computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the server systems 242, 267 may be adapted to run one or more services, operations, processing, or software applications described herein. The server systems 242, 267 may run an operating system including any of those discussed above, as well as any commercially available server operating system. The server systems 242, 267 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Entity Machines), and the like.

In some embodiments, the server systems 242, 267 may include one or more applications to analyze and consolidate data feeds and/or event updates received from various data sources. As an example, data feeds and/or event updates may include, but are not limited to, application 206, 208 updates, Twitter® feeds, Facebook® updates, updates (real-time and/or otherwise) received from one or more third party information sources and/or continuous data streams, which may include real-time events related to sensor data applications, and/or the like. The server system 242 may also include one or more applications to display the data feeds and/or real-time events via the client devices 205, 207 and/or devices internal to the interaction infrastructure 102.

The application services system 241 and/or the data management system 266 may also include one or more data stores 268. The data stores 268 may include various forms of data storage including solid state storage, disk storage, databases (including relational, column, document, key-value and graph type databases) and cache. The data stores 268 may reside in a variety of locations, such as on a non-transitory storage medium local to (and/or resident in) the server systems 242, 267 and/or remote from the server systems 242, 267 and in communication with the server systems 242, 267 via a network-based or dedicated connection. In certain embodiments, the data stores 268 may reside in a storage-area network (SAN). Similarly, any necessary files for performing the functions attributed to the server systems 242, 267 may be stored locally on the server systems 242, 267 and/or remotely, as appropriate. In one set of embodiments, the data stores 268 may include relational databases that are adapted to store, update, and retrieve data in response to SQL-formatted commands. It should be appreciated that information corresponding to the repositories may be stored elsewhere and/or in other ways, or may not be stored, depending on the implementations chosen. Likewise, while various segregations of data corresponding to the repositories are provided herein, it should be appreciated that such examples are non-limiting, and some or all the data may be handled in any suitable manner.

In certain embodiments, the interaction infrastructure 102 may be implemented in or with a distributed computing and/or cloud computing environment with a plurality of servers and cloud-implemented processing, memory, and data resources. Thus, with accretion of service information, the system may allow for scaling out with additional processing resources, server resources, data storage resources, data management resources, and the like. Some embodiments may use different types of servers to service different types of client device 205, 207.

The interaction infrastructure 102 may provision services facilitated by one or more components of the interaction infrastructure 102, and, in some embodiments, one or more of the services may be offered as cloud services. A specific instantiation of a service 202 provided by the interaction infrastructure 102 may be referred to herein as a service instance 202. In some examples, a service 202 provided by the interaction infrastructure 102 may include provisioning of content objects, facilitating real-time communications, exposing features of a provider platform, exposing features of an orchestration platform, providing protected computer network access to data generated and/or transformed, and stored by the infrastructure system 102, for example, via a hosted database, a hosted web server, a hosted application server, a software application, and/or the like. In certain embodiments, the interaction infrastructure 102 may include a suite of applications, middleware, and database service offerings that are delivered to clients and/or providers.

In the illustrated embodiment, one or more client devices 205, 207 may be used by users to interact with the interaction infrastructure 102. Although only a limited number of the client devices 205, 207 are shown, any number of client devices 205, 207 may be supported. In various embodiments, the client devices 205 and/or 207 may correspond to devices supporting and/or accessing a client interface 105 and/or a service tool interface 107. In some embodiments, the client devices 205 and/or 207 may correspond to devices supporting and/or accessing a data acquisition interface 111 and/or a media channel interface 114.

In various embodiments, the client devices 205 and/or 207 may be configured to operate a client application such as a web browser, a proprietary client application, a web-based application, an entity portal, a mobile application, a widget, or some other application, which may be used by a user of the client device 205, 207 to interact with the interaction infrastructure 102 to use services provided by the interaction infrastructure 102. The client devices 205 and/or 207 may be portable handheld devices (e.g., an iPhone®, cellular telephone, an iPad®, computing tablet, a personal digital assistant (PDA)) or wearable devices (e.g., Google Glass® device), running software such as Microsoft Windows Mobile®, and/or a variety of mobile operating systems such as iOS, Windows Phone, Android, BlackBerry 10, Palm OS, and/or the like, and being Internet, e-mail, short message service (SMS), Blackberry®, and/or other communication protocol enabled. In some embodiments, one or more of the client devices 205 and/or 207 can be general purpose personal computers including, by way of example, personal computers and/or laptop computers running various versions of Microsoft Windows®, Apple Macintosh®, and/or Linux operating systems. In some embodiments, one or more of the client devices 205 and/or 207 can be workstation computers running any of a variety of commercially-available UNIX® or UNIX-like operating systems, including without limitation the variety of GNU/Linux operating systems, such as for example, Google Chrome OS. Alternatively, or in addition, one or more of the client devices 205 and/or 207 may be any other electronic device, such as a thin-client computer, an Internet-enabled gaming system (e.g., a Microsoft Xbox gaming console with or without a Kinect® gesture input device), and/or a personal messaging device, capable of communicating over network(s) 108.

Figure 3A:
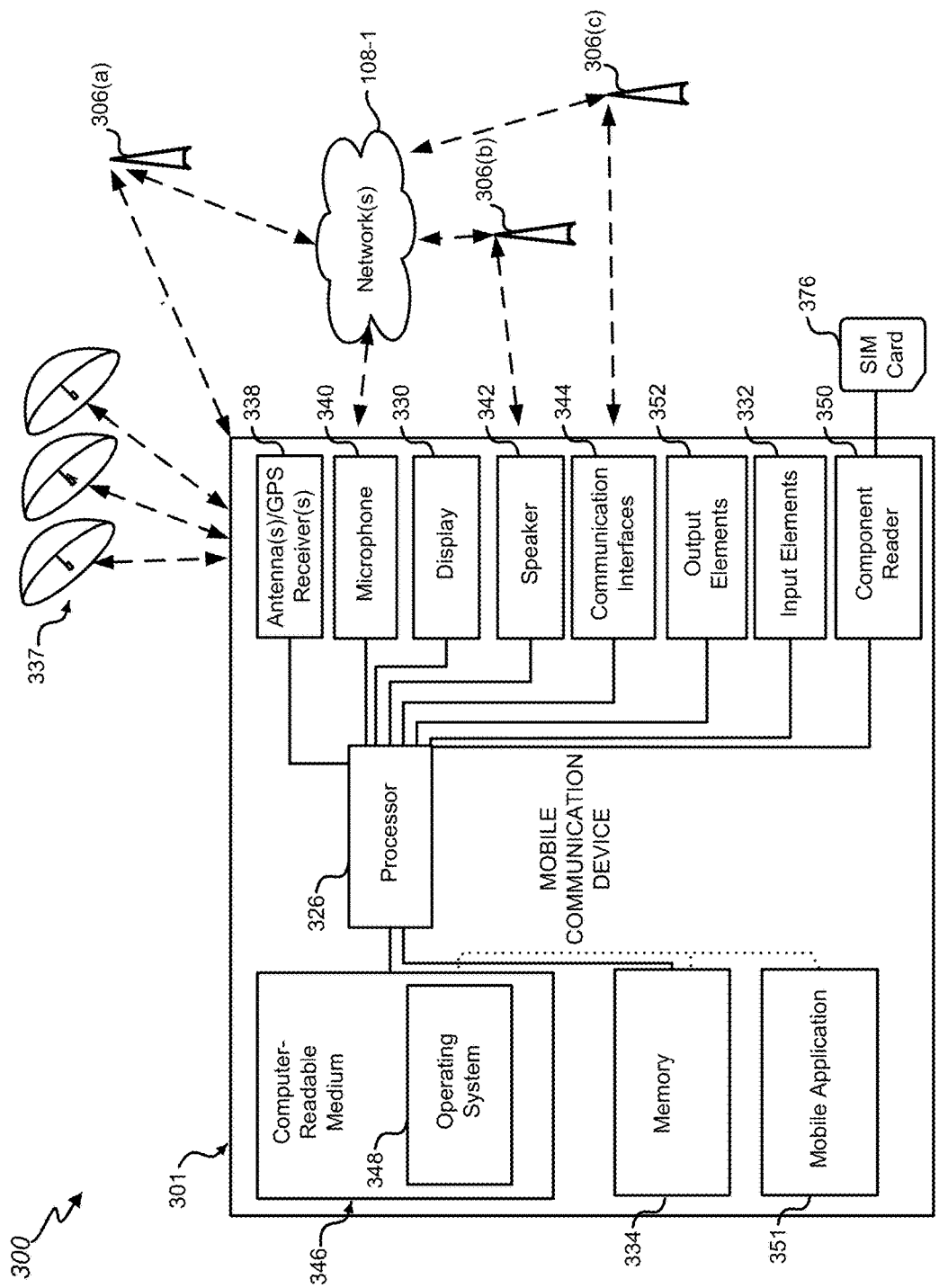
FIG. 3A is a block diagram of a system including one non-limiting example of a client device that corresponds to a mobile communication device, in accordance with certain embodiments of the present disclosure.

FIG. 3A is a block diagram of a system 300 including one non-limiting example of a client device 205 and/or 207 that corresponds to a mobile communication device 301, in accordance with certain embodiments of the present disclosure. The mobile communication device 301 may be a portable device suitable for sending and receiving information over a network in accordance with embodiments described herein. For example without limitation, in various embodiments, the mobile communication device 301 may include one or more variously referenced as a mobile phone, a cellular telephone, a smartphone (for example without limitation, a smart phone such as: the iPhone® phone available from Apple Inc. of Cupertino, Calif.; Android™ operating system-based phones, available from as Google of Mountain View, Calif.; and/or the like), a handheld mobile device, a tablet computer, a web pad, a personal digital assistant (PDA), a notebook computer, a handheld computer, a laptop computer, a vehicle computer, and/or the like.

In some embodiments, the mobile communication device 301 may be provided with a mobile application 351, which may correspond to a client application configured to run on the mobile communication device 301 to facilitate various embodiments of this disclosure. In various embodiments, the mobile application 351 may correspond to application 206 and/or 208. For example without limitation, the mobile application 351 may transform the mobile communication device 301 into a communication tracking facilitator. The mobile application 351 and the mobile communication device 301 may cooperate with the interaction infrastructure 102 to facilitate tracking and/or handling of communications (e.g., calls, messages, chats, video conferencing, and/or the like) in response to content objects presented through the mobile communication device 301. The mobile application 351 can be a computer program that can be installed and run on the mobile communication device 301.

In various embodiments, mobile communication device 301 configured with the mobile application 351 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 3, the mobile communication device 301 includes a display 320 and input elements 332 to allow a user to input information into the mobile communication device 301. By way of example without limitation, the input elements 332 may include one or more of a keypad, a trackball, a touchscreen, a touchpad, a pointing device, a microphone, a voice recognition device, or any other appropriate mechanism for the user to provide input. Further, the mobile communication device 301 the input elements 332 may include a communication component reader 350 for accepting a communication component such as a SIM card 376.

In some embodiments, the interaction infrastructure 102 may provide content objects of any suitable type to a user of the mobile communication device 301 through the mobile application 351. The mobile application 351 can include a utility that communicates with the interaction infrastructure 102 to control downloading, displaying, caching, and/or other operations concerning the handling of content objects. The mobile application 351 and the mobile communication device 301 may cooperate with the interaction infrastructure 102 to facilitate communication tracking in response to content objects displayed through the one or more additional applications.

In some embodiments, the client device 205 and/or 207 may include one or more additional applications, for example, that may be provided by one or more intermediaries and/or may provide functionality relating to one or more intermediaries. An intermediary may be any entity, including, for example, a news content provider, a social networking company, any entity, a gaming company, a music vendor, a multimedia content provider, and/or the like. Content objects (e.g., media objects, multimedia objects, electronic content objects, and/or the like) of any of various types may be displayed through the one or more additional applications. The mobile application 351 and the mobile communication device 301 may cooperate with the interaction infrastructure 102 to facilitate communication tracking in response to content objects displayed through the one or more additional applications. In some embodiments, the mobile application 351 could include a toolkit with client-side utility for interfacing with the one or more additional applications to facilitate tracking and/or call handling responsive to presented content. In some embodiments, the one or more additional applications could include the toolkit. In some embodiments, the mobile application 351 could be grafted into the one or more additional applications to provide tracking and/or communication handling functionalities. In some embodiments, the mobile application 351 could use a number of API translation profiles configured to allow interface with the one or more additional applications.

The user selection of a user-selectable option corresponding to a content object may involve any one or combination of various user inputs. The user selection may be in the form of a keyboard/keypad input, a touch pad input, a track ball input, a mouse input, a voice command, etc. For example, the content object may be selected by the user by pointing and clicking on the content object. As another example, the content object may be selected by an appropriate tap or movement applied to a touch screen or pad of the mobile communication device 301. The selection of a content object may initiate a voice call, video call, message, chat, and/or other communication. In some embodiments, a telephone number may be presented in content information in a format such that, when the user selects a communication reference, the client device (e.g., a cellular phone or a computer) dials a telephone number corresponding to the communication reference. For example, the call could have been initiated by end user selecting a click-to-call option displayed via the user device. In some embodiments, user devices can automatically dial the telephone number. For example, a Dual Tone Multi-Frequency (DTMF) generator can dial a phone number. In some embodiments, the user device may initiate the phone call through a VoIP system.

In some embodiments, the mobile application 351 can run continuously (e.g., in the background) or at other times, such as when the mobile application 151 is launched by an end user. In certain embodiments, the mobile application 351 can automatically run each time that a user accesses the one or more additional applications or selects a content object. The mobile application 351 may be provided in any suitable way. For non-limiting example, the mobile application 351 may be made available from the interaction infrastructure 102, a website, an application store, etc. for download to the mobile communication device 301; alternatively, it may be pre-installed on the mobile communication device 301. In some embodiments, the mobile application 351 can be pre-installed on the device platform by a mobile communication device manufacturer or carrier. In some embodiments, a mobile application 351 can be downloaded and installed by an end-user on their client device 205 and/or 207.

The mobile communication device 301 includes a memory 334 communicatively coupled to a processor 336 (e.g., a microprocessor) for processing the functions of the mobile communication device 301. The mobile communication device 301 may include at least one antenna 338 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The mobile communication device 301 may also include a microphone 340 to allow a user to transmit voice communication through the mobile communication device 301, and a speaker 342 to allow the user to hear voice communication. The antenna 338 may include a cellular antenna (e.g., for sending and receiving cellular voice and data communication, such as through a network such as a 3G or 4G network). In addition, the mobile communication device 301 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile communication device 301 may be capable of transmitting and receiving information wirelessly through both short range, radio frequency (RF) and cellular and Wi-Fi connections.

Additionally, the mobile communication device 301 can be capable of communicating with a Global Positioning System (GPS) 337 in order to determine to location of the mobile communication device 301. The antenna 338 may be a GPS receiver or otherwise include a GPS receiver. In various embodiments contemplated herein, communication with the mobile communication device 301 may be conducted with a single antenna configured for multiple purposes (e.g., cellular, transactions, GPS, etc.), or with further interfaces (e.g., three, four, or more separate interfaces).

The mobile communication device 301 can also include at least one computer-readable medium 346 coupled to the processor 336, which stores application programs and other computer code instructions for operating the device, such as an operating system (OS) 348. In some embodiments, the mobile application 351 may be stored in the memory 334 and/or computer-readable media 346. In some embodiments, the mobile application 351 may be stored on the SIM card 376. In some embodiments, mobile communication device 301 may have cryptographic capabilities to send encrypted communications and/or messages protected with message hash codes or authentication codes. Again, the example of mobile communication device 301 is non-limiting. Other devices, such as those addressed herein, may interact with the interaction infrastructure 102.

The mobile communication device 301 may access the network 108 through a wireless link to an access point. For example, a mobile communication device 301 may access the network 108 through one or more of access point 306(a), access point 306(b), access point 306(c), and/or any other suitable access point(s). The access points 306 may be of any suitable type or types. For example, an access point 306 may be a cellular base station, an access point for wireless local area network (e.g., a WiFi access point), an access point for wireless personal area network (e.g., a Bluetooth access point), etc. The access point 306 may connect the mobile communication device 301 to the network 108, which may include the Internet, an intranet, a local area network, a public switched telephone network (PSTN), private communication networks, etc. In some embodiments, access point(s) 306 may be used in obtaining location information for the mobile communication device 301, as described further herein.

FIG. 3B depicts a high-level block diagram of a system 300-1 for communication routing and tracking, in accordance with certain embodiments of the present disclosure. Certain embodiments may allow for tracking of a great number of providers, where the tracking not limited by a telephone number inventory. Previously, call tracking numbers were essential for call tracking, being the only means to tie an offline activity to a phone call that can be tracked. Static phone numbers were provisioned for call tracking so that, when a call to a particular number came through the PSTN, the provider to which the number was assigned had to be determined. However, certain embodiments may provide for technological improvements that allow for control over sequences of activities after a user initiates a response to a particularized content object.

The client device 205 configured with the application 351-1 may be configured to associate the application 351-1 with a communication reference 302 of the client device 205. In some embodiments, the communication reference 302 is a telephone number associated with the client device 205. In some embodiments, the application 351-1 may gather the telephone number from the device, a carrier associated with device subscriber, or via input of the end-user. In some embodiments, the application 351-1 may register unique identification information 304 associated with the client device 205. For example without limitation, the application 351-1 may gather the information 304 from the client device 205. In some embodiments, unique identification information 304 may be gathered from a SIM card 376 or another card of the client device 205. In some embodiments, unique identification information 304 may be gathered from other components of the client device 205.

The unique identification information 304 may be sent by the client device 205 to the infrastructure 102. The unique identification information 304 could include any suitable subscriber identity information. In some embodiments, the unique identifier may include an IMSI. In some embodiments, the unique identifier may be derived from the IMSI such that the actual IMSI is not sent. In some embodiments, a hash code based on the IMSI may be sent. The unique identifier may indicate associated network location information in some embodiments.

In some embodiments, to provision tracking service, the client device 205 configured with the application 351-1 may send provisioning information to the infrastructure 102. The provisioning information may indicate communication reference information 302. For example without limitation, as indicated by interactions 306(a) and 306(b), the client device 205 may send phone number information to the infrastructure 102. In some embodiments, the provisioning information could be sent to a MSC/HLR, which could then convey the information to the infrastructure 102. In some embodiments, the provisioning information could be sent via SMS messaging, as indicated by interactions 312(a) and 312(b). For example without limitation, SMS messaging may be sent to the infrastructure 102 via one or more of a home carrier MSC, a home carrier SMSC, an intercarrier SMS gateway, serving carrier SMSC, a mobile network 108-4, a serving carrier MSC/VLR, and/or the like.

Provisioning could be initiated with launching/installing the application 351-1. The provisioning information may be sent to the infrastructure 102 via an Internet Protocol (IP) message via one or more IP networks, such as network(s) 108-3. In some embodiments, the provisioning information may include the subscriber's Mobile Directory Number (MDN) for CDMA networks or Mobile Subscriber Integrated Services Digital Network Number (MSISDN) for GSM networks. In some embodiments, the client device 205 configured with the application 351-1 may also send provisioning information that includes the device's unique equipment identity 304. When necessary, the infrastructure 102 could request the subscriber's unique subscriber identity from the home location register associated with the MDN or MSISDN. The infrastructure 102 may store the provisioning information in one or more data repositories 140. In some embodiments, after the infrastructure 102 receives the provisioning information, it may send a confirmation message to the application 351-1, as indicated by interfaces 314(a) and 314(b).

As discussed herein, in some embodiments, the infrastructure 102 may provide particularized content objects through the application 351-1. In some embodiments, particularized content objects may be displayed through the one or more additional applications 308 of the client device 205, such as a browser, an SMS application, a push notification, an email application, a social media application, etc. In some embodiments, the application 351-1 could include a toolkit with client-side utility for interfacing with the one or more additional applications to facilitate tracking and/or call handling responsive to presented particularized content objects. Various embodiments may present particularized content objects in any one or combination of ways. In some embodiments, the one or more additional applications 308 could include a toolkit for interfacing with the application 351-1. In some embodiments, the application 351-1 could be grafted into the one or more additional applications to provide tracking and/or call handling functionalities. In some embodiments, the application 351-1 could use one or more API translation profiles configured to allow interface with the one or more additional applications 308.

The end-user may select a user-selectable call option presented with the client device 205 responsive to a particularized content object presented via the client device 205 either via the application 351-1 or via another application, in accordance with various embodiments. In some embodiments, the user-selectable call option and the particularized content object may be integrated, for example without limitation, with a particularized content object with a click-to-call option. In some embodiments, responsive to the user selection, a call may be placed to a provider communication device 207, as indicated by interactions 316(a) and 316(b).

Responsive to the user selection, the client device 205 configured with the application 351-1 may send one or more communications corresponding to the particularized content object, via a data network, to the infrastructure 102, as indicated by interactions 310(a) and 310(b). By way of example without limitation, the one or more communications may include one or more IP messages sent via one or more IP networks, such as network(s) 108-3. The one or more messages may convey tracking information. The tracking information could indicate call information. By way of example without limitation, the call information could correspond to the telephone number, the subscriber identity, the device identification, the IMSI, and/or any suitable information associated with the client device 205.

In some embodiments, particularized content objects are presented to a user via the application 351-1 such that the application 351-1 is configured to gather tracking information about those particularized content objects. In some embodiments, calls are placed or at least initiated via the application 351-1 such that the application 351-1 is configured to gather tracking information about those calls. In some embodiments, the application 351-1 receives, pulls, extracts, and/or listens to information from one or more applications 308 of the client device 205 to gather tracking information, where particularized content objects are presented via the one or more applications 308 and/or calls are placed or at least initiated via the one or more applications 308. In some embodiments, tracking information may include call information gathered from a phone application 308 of the client device 205.

The call information could include information indicating a successfully connected call, a call duration, an indication that a call was not connected, information indicating a call was missed by the callee, an indication that a busy tone was received, an indication that a call was dropped, and/or the like. The call information could include a callee communication reference. For example without limitation, callee communication reference information could include one or more of a telephone number, IP address, etc. of the provider/service provider/representative linked to the particularized content object and/or the like.

In some embodiments, the application 351-1 may be configured to gather call information about call-backs from provider representatives. Having logged the callee communication reference, the application 351-1 could identify an incoming call from the previously called representative. In various embodiments, in the same or similar manner with respect to tracking information for calls initiated by the user, any suitable tracking information about the call-back may be collected.

In some embodiments, tracking information may be inferred, for example, in the absence of explicit tracking information. For example without limitation, the application 351-1 and/or the infrastructure 102 may infer from a short call duration that a call was missed by a representative of a provider. The application 351-1 and/or the infrastructure 102 may infer from subsequent user selections of the application 351-1 and/or other applications 308 within a short time period after the initial user selection that a call was potentially missed by a representative of a provider. Accordingly, the application 351-1 may send one or more communications via a data network that include any suitable tracking information to inform the infrastructure 102, which may include application server(s), network switch(es), etc., about user action relating to particularized content objects.

In various embodiments, tracking information may include any suitable about particular particularized content objects. Tracking information could include, for example without limitation, any reference information for the particularized content object and/or other information identifying a particularized content object, a provider, etc. In some embodiments, tracking information could include information relating to content of particularized content objects, for example without limitation, content details such as a value and/or offer associated with a particularized content object; a date associated with a particularized content object, such as an expiration date, an effective offer date or date range; products and/or services to which a particularized content object is directed; and/or the like.

In some embodiments, tracking information could include information relating to time information associated with a particularized content object. For example without limitation, tracking information could include any information relating a time when a particularized content object was presented to a user. In some embodiments, tracking information could include information relating to particularized content object presentation details. For example without limitation, tracking information could include any information relating to the time, manner, and/or place of presentation of a particularized content object. Tracking information could include any information indicating the intermediary of a particularized content object. In some embodiments, tracking information could include location information relating to location of the client device 205. In some embodiments, certain features discussed with reference to client device 205 could likewise apply to the provider communication device 207, which could have installed thereon an application 351 to facilitate the features.

In some embodiments, the infrastructure 102-1 receives, places, and/or routes telephone calls over packet switched networks. In some embodiments, the infrastructure 102 may provide packet-switched connections between callers and provider representatives, which correspond to the destinations of click-to-call requests. In some embodiments, the infrastructure 102 can place and/or receive direct VoIP calls to/from the callers/provider representatives. In some embodiments, the infrastructure 102 may use the data network 108-3 completely (along with one or more access points 306 via 3G/4G/Wi-Fi, e.g.), as opposed to through the PSTN 108-2, thereby excluding other carriers from handling the call. With the servers/switches of the infrastructure 102 routing calls via the data network 108-3, complete call tracking may be achieved without the need of a call tracking number. Accordingly, certain embodiments may allow for tracking of a great number of providers, where the tracking not limited by a telephone number inventory.

In some embodiments, the client device 205 configured with the application 351-1 may provide a softphone dedicated to the device that facilitates communications with provider representatives and the infrastructure 102, as well as call tracking, via the data network 108-3. In some embodiments, the client device 205 configured with the application 351-1 may send provisioning information to the infrastructure 102-3 that may indicate communication reference information 302 and/or identification information 304, as discussed herein. The communication reference information 302 may be stored in the application 351-1 and/or the infrastructure 102-3. In some embodiments, communication reference information 302 could correspond to dedicated reference information for a softphone dedicated to the device.

In some embodiments, to make a voice connection responsive to a click-to-call selection by the user of the client device 205, one or more IP messages may be sent via one or more access points to one or more servers/switches of the infrastructure 102, as indicated by interactions 307(*a*) and 307(*b*). The one or more IP messages may indicate the communication reference information 302, the identification information 304, and/or another identifier (which could be an authentication token/key, in some embodiments) from which phone number information of the client device 205 may be identified and/or determined. The one or more IP messages could indicate the phone number information for a provider representative corresponding to the particularized content object selected. Alternatively, an identifier of the provider representative and/or particularized content object could be indicated, and the infrastructure 102 could determine the phone number information for the corresponding provider representative, e.g., based on information stored for the provider. In some embodiments, one or more SIP requests may be sent via one or more access points to one or more servers/switches of the infrastructure 102. By routing of the messaging to the infrastructure 102, other telecommunication carriers could be excluded.

In some embodiments, the infrastructure 102 can place separate VoIP calls over the IP network(s) 108-3 to the provider representative (311(*a*), (*b*)) and the caller (313(*a*), (*b*)), and then bridge the calls (315). Accordingly, each of the provider representative and the caller receives an inbound call (311(*a*), (*b*)) placed via the packet switched network 108-3, and the infrastructure 102 joins the separate calls. In some embodiments, the two calls are merged responsive to the each of the caller and the provider representative accepting the call.

In some embodiments, to make a voice connection responsive to a click-to-call selection by the user of the client device 205, the infrastructure 102 can route a VoIP call established with the caller over the IP network(s) 108-3 to the provider representative. Accordingly, only the provider representative receives an inbound call. For example without limitation, a SIP request from the client device 205 could be reconfigured and redirected based at least in part on the phone number of the provider representative. A SIP request could be configured so that response messaging is routed to the client device 205 and/or the infrastructure 102. In some embodiments, the call from the caller is connected to the provider representative responsive to the provider representative accepting the call.

In various embodiments, the infrastructure 102 may interface with the caller and/or the provider representative using one or more suitable types of internet telephony systems, such as, for example, SIP-based internet telephony, H.323-based internet telephony, and/or the like. Accordingly, various embodiments of the infrastructure 102 may support multiple, different types of internet telephony systems. In some embodiments, the infrastructure 102 may include one or more servers 242-1 and one or more controllers 242-2, which may be SIP servers and session border controllers, in order to interface with the IP network(s) 108-3, control messaging, and facilitate set-up, voice conversation, and tear-down of VoIP calls to or from the infrastructure 102. The one or more controllers 242-2 could handle processing and routing of incoming requests from the client device 205.

In various embodiments, the application 351-1 and/or the infrastructure 102 may track information about calls, which information may include any suitable about particular particularized content objects, as discussed herein. For example without limitation, the application 351-1 and/or the infrastructure 102 may be configured to track information relating to particularized content objects and calls to facilitate the gathering, processing, evaluating, and presenting of information for a provider interface, as discussed in the following. In some embodiments, certain features discussed with reference to client device 205 could likewise apply to the provider communication device 207, which could have installed thereon an application 351 to facilitate the features.

Figure 5:
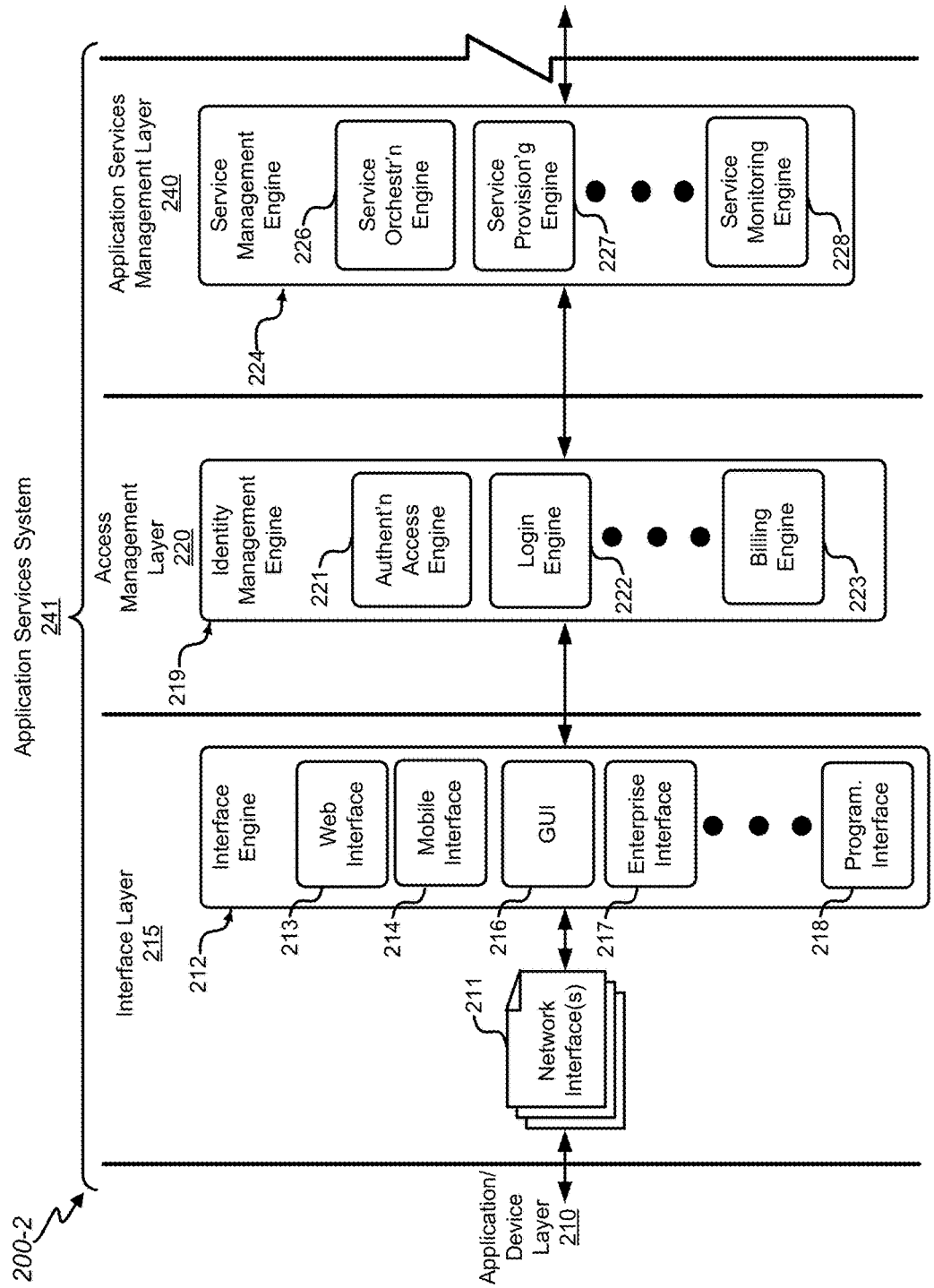
FIG. 5 shows a diagram of another portion of the architecture stack of the interaction infrastructure including certain aspects of the application services system, in accordance with certain embodiments of the present disclosure.

FIG. 5 shows a diagram of a portion 200-2 of the architecture stack 200 of the interaction infrastructure 102, in accordance with certain embodiments of the present disclosure. The portion 200-2 at least partially includes the interface layer 215, the access management layer 220, and the application services management layer 240. In some embodiments, the application services system 241 may correspond at least partially to the interface layer 215, the access management layer 220, and the application services management layer 240. While engines, repositories, and other components are described separately in this disclosure, it should be appreciated that the components may be combined and/or implemented differently in any combination to provide certain features in various embodiments. In various embodiments, different processes running on one or more shared resources may implement some of the components.

The interaction processing infrastructure 102 may include one or more network interfaces 211 communicatively coupled to one or more servers, which may include communication servers, web servers, gateways, application servers, database servers, and/or one or more other types of servers. The network interface(s) 211 may include any suitable input/output module or other system/device operable to serve as an interface between one or more components of the interaction infrastructure 102 and the network 108. The interaction infrastructure 102 may use the network interfaces 211 to communicate over the network 108 using any suitable transmission protocol and/or standard.

The interface layer 215 may include one or more interface engines 212. The interface engine 212 may be configured to generate one or more interfaces 105, 107, 111, 114 (e.g., web interfaces 213, mobile app interfaces 214, graphical user interfaces 216, enterprise application interfaces 217, programmatic interfaces 218, and/or the like) to enable data to flow to client devices 205, 207 via respective applications 206, 208. In various embodiments, the interfaces of interface engine 212 may be embodied in hardware and/or software. The interface engine 212 may include logic to send, present, and receive information, with one or more of the interfaces to/from one or more end users, service providers, and/or data sources. The interface engine 212 may utilize one or more network interfaces to transceive information through the network 108. The interaction infrastructure 102 may pull and/or push information from those entities.

Generally, interfaces may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices. Output may be provided via one or more output devices (e.g., a display or speaker). The web interfaces 213 and mobile interfaces 214 may include any suitable web interface and mobile interface configured to interact with elements of the interaction infrastructure 102. The graphical user interfaces 216 may include any suitable graphical user interface configured to interact with elements of the interaction infrastructure 102. The enterprise interface 217 may include internal interfaces for accessing element of the interaction infrastructure 102 via an internal network of an enterprise. The programmatic interfaces 218 may include one or a combination of an API, a programmatic user interface, and/or other similar interfaces for defining core functions for accessing elements of the interaction infrastructure 102. A programmatic interface 218, for example, may specify software components in terms of associated operations.

Elements of the interface layer 215, for example, the interface engine 212, may communicate with calls and inputs directed to and/or received from the access management layer 220. In some embodiments, the access management layer 220 may include one or more identity management engines 219. Generally, the identity management engine 219 can be configured to provide identity services, such as access management and authorization services for end users and/or providers serviced by the interaction infrastructure 102. In some embodiments, the identity management engine 219 may control information about end users and providers that utilize the services provided by the interaction infrastructure 102. The control information may include information that authenticates the identities of end users and/or providers and that specifies authorized actions with respect to various system resources and services.

In some embodiments, the identity management engine 219 may include logic for implementing account features in various embodiments. By way of example without limitation, the identity management engine 219 may include logic one or more aspects of: handling user registration; managing account creation, updates, authentication, handling; and/or the like. The identity management engine 219 may be configured for acquiring, processing, formatting, and/or storing authentication information in the one or more authentication information repositories 257 (described further below).

In some embodiments, the identity management engine 219 may include a plurality of engines configured to manage different aspects of interacting with elements of the interaction infrastructure 102, such as user interactions with applications serviced by the interaction infrastructure 102. The engines may include, for example, an authentication access engine 221, a login engine 222, and a billing engine 223. The different engines of the identity management engine 219 can define routines, protocols, standards, and/or the like for interacting with elements of the interaction infrastructure 102. The authentication access engine 221 may evaluate rules and conditions under which users may access elements of the interaction infrastructure 102. These rules and conditions may be user-defined (e.g., by an administrator or reviewer), learned over time, and/or may be dynamically updated and/or evaluated based on characteristics of the user or the user's device attempting to access the interaction infrastructure 102. The login engine 222 may evaluate the rules and conditions under which users are able to log in to the interaction system or access applications associated with the interaction system. Thus, while authentication access engine 221 may evaluate the rules to determine which users may access the interaction infrastructure 102, the login engine 222 may evaluate the particular credentials, profiles, etc. associated with each authenticated user.

The application services management layer 240 may include one or more service management engines 224. The service management engines 224 may include one or more service orchestration engines 226, one or more service provisioning engines 227, and/or one or more service monitoring engines 228. By way of example without limitation, in some embodiments, a client device 205 or 207 running an application 206 or 208 may interact with the interaction infrastructure 102 by transmitting a service request 201 to the interaction infrastructure 102 for one or more services provided by the interaction infrastructure 102. In some embodiments, the service request 201 may be received via an interface facilitated by the interface engine 212. The service request 201 may be processed by the service management engine 224 and, consequent to the processing, information identifying one or more services and, in some embodiments, information uniquely identifying a user. The service orchestration engine 226 may utilize the information to orchestrate the provisioning of services and resources responsive to the service request 201. In some embodiments, the service orchestration engine 226 may orchestrate the provisioning of services and resources using the service provisioning engine 227. In certain embodiments, the service orchestration engine 226 may enable the management of processes associated with each service request 201 and may apply entity logic to determine whether and how a service 202 should be provisioned. The service orchestration engine 226 may send a request to the service provisioning engine 227 to prompt the service provisioning engine 227 to allocate resources and configure those resources needed for the service 202. The service 202 may be tracked by the service monitoring engine 228. In some instances, the service monitoring engine 228 may be configured to collect usage statistics for the services 202.

Figure 6:
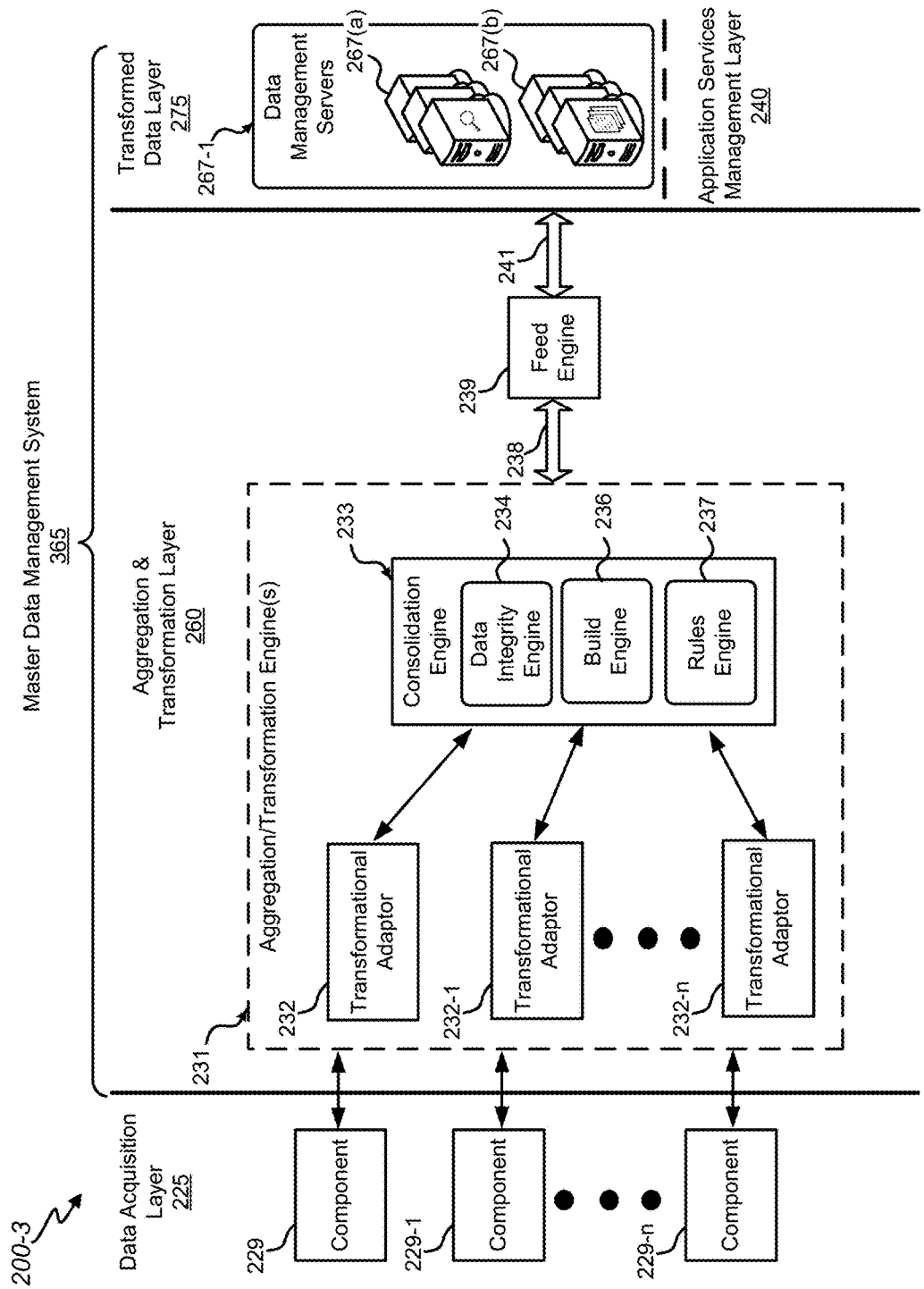
FIG. 6 shows a diagram of another portion of the architecture stack of the interaction infrastructure including certain aspects of a master data management system, in accordance with certain embodiments of the present disclosure.

FIG. 6 shows a diagram of another portion 200-3 of the architecture stack 200 of the interaction infrastructure 102, in accordance with certain embodiments of the present disclosure. In particular, the portion 200-3 at least in partially includes the data acquisition layer 225, the aggregation and transformation layer 260, and the transformed data layer 275. The data acquisition layer 225 may receive data from components 229. In various embodiments, the components 229 may correspond to any one or combination of data sources disclosed herein and/or the like, with aggregation being facilitated in some embodiments with any one or combination of interfaces 105, 107, 111, 114 and/or client devices 205, 207. In some embodiments, the components 229 may include complimentary layers to facilitate data transmission, such as a transmission layer, generation layer, and/or a receiving layer to communicate and/or receive data via the data acquisition layer 225. In various embodiments, the input from the components 229 may correspond to any one or combination of raw data, unstructured data, structured data, information, and/or content which may include media content, text, documents, files, instructions, code, executable files, images, video, audio, and/or any other suitable content suitable for embodiments of the present disclosure. For example, data from 20, 200, or any number of different sources may be merged together with data generated internally, data previously received, data from third parties, etc. The data could relate to end users, providers, entities, geographic locations, demographic information, and/or the like. For example, the aggregation and transformation layer 260 may identify which data and records are about the same entity and may merge attributes from different sources into one composite object that can be used by the application services as a basis for services provided.

The aggregation and transformation layer 260 may provide a pipeline that processes data input from the components 229, applies rules, transforms the data, feeds the transformed data to the transformed data layer 275 and/or the application services management layer 240. The aggregation and transformation layer 260 may include one or more aggregation and/or transformation engines 231. In various embodiments, the aggregation and/or transformation engine 231 may correspond to an integral engine or separate engines working in conjunction. The aggregation/transformation engine 231 may transform, translate, or otherwise adjust data collected.

In some embodiments, two or more of the components 229 may generate data according to different formats. The data can then be transformed, translated, or otherwise adjusted by the engine 231. For example, acquired data may be converted from a first format to a second format using one or more conversion rules, which may be user-defined, heuristic, and/or machine-learned. In some embodiments, the transformation engine 231 may perform similar operations with respect to other data generated by elements of the interaction infrastructure 102.

In some embodiments, the aggregation and/or transformation engines 231 may include one or more transformational adaptors 232. In some embodiments, one or more transformational adaptors 232 may be associated with the components 229 to effect the transformations. The transformational adaptors 232 may be implemented, in various embodiments, in hardware and/or software. In some embodiments, a transformational adaptor 232 may include a hardware device and/or software component that transforms, translates, converts, or otherwise adjusts the acquired data. In various embodiments, the adjustment operations may be executed within the data acquisition layer 225 and/or the transformation layer 260.

A consolidation engine 233 may process manifold data sets that may, for instance, come from different sources or the same source, for example, by way of one or more updates to data previously provided by a particular source, and the consolidation engine 233 may consolidate the data sets to form a composite data set. The consolidation may include organizing, categorizing, qualifying, and/or comparing the sets of information; detecting, identifying, and/or handling errors/discrepancies; and/or otherwise processing the data sets. In some embodiments, the consolidation engine 233 may identify subset of entities that are more important than the rest, may process data to identify relations to at least one entity of the subset of entities, and may process data having such relation first. In some embodiments, the consolidation engine 233 may only consolidate the data having such relation and may disregard and/or dispose of data that does not possess such relation.

With certain embodiments, a data integrity engine 234 with one or more processors may check data sets to ensure quality of the data. The data integrity engine 234 may assess each piece of information relating to an aspect (e.g., data relating to a listing of information for an entity, such name, location, reviews, ratings, etc.) and may assign a weight to the information according to a score. Any suitable scoring system may be used. Missing information, for example, could have a lower score than non-missing information; and the missing information could be scored even lower, the more important the information is to the aspect. Information may be weighted according to the source. For example, in some instances, information relating to a company that is gathered from the company's website may be weighted higher or lower relative to information gathered from a third party's website; tracking data gathered from an end-user device, for example, may be considered more reliable than corresponding/conflicting information from a third party directory service. Scoring profiles (e.g., compiled for end users, providers, entities, etc.) based the information based upon the underlying reliability of information may avoid provisioning of misdirected, redundant, unwanted, and/or unnecessary services.

In certain embodiments, the data integrity engine 234 may examine items of information and assign scores according to how important such information is to services, generally. The data integrity engine 234 may take into account service categories. Data pertinent to service categories may be prepared as a basis for provisioning services corresponding to particular categories. In certain embodiments, the data integrity engine 234 may adjust scoring of information in view of a specific services and/or specific categories of services. In certain embodiments, the data integrity engine 234 may examine items of information in view of a specific services and/or specific categories of services upfront, thereby rendering subsequent readjustment unnecessary. Based on the scoring, certain data may be discarded or flagged for possible follow-up and/or prompting for further information and/or clarifying information may be identified, generated, and/or provided. Accordingly, composite content can be made more reliably with possible follow-up and/or prompting for a data source to link to for more missing information.

In various embodiments, a rules engine 237 may be configured to create and manage entity rules, condition-response rules, alert/reports rules, data-formatting rules, data-sharing rules, transmission rules, aggregation rules, user authorization rules, and other similar rules. Such rules may be user-defined, fixed, heuristics, learned by elements of the interaction infrastructure 102, and any combination of the foregoing. In some embodiments, the rules engine 237 may be included in the consolidation engine 233. In some embodiments, the rules engine 237 may be separate from the consolidation engine 233.

A build engine 236 may assess quality of the data and/or the data sources. The build engine 236 may build one best data set that relates to a particular entity. In some embodiments, the build engine 236 may build multiple high-quality data sets that relate to a particular entity, but are tailored for different purposes (e.g., different locations, intermediary channels, medial channels, and/or the like).

A feed engine 239 may be configured to process received input 238 from the aggregation/transformation engine 231. In some embodiments, the feed engine 239 may be integral with the aggregation/transformation engine 231. The feed engine 239 may generate one or more feeds 241 transferred to the transformed data layer 275 (e.g., for storage) and/or the application services management layer 240 (e.g., for more immediate use, by the content provisioning management layer 255 or another application service). In some embodiments, the feed engine 239 may generate a single feeder 241—a universal feed object—to feed the transformed data layer 275 and/or the application services management layer 240. The feed engine 239 may feed transformed data (which may include transformed information and/or transformed content in some embodiments).

In some embodiments, the feed engine 239 may implement a feeding process that feeds transformed data (which may include information and/or content in some embodiments) based on a last finishing point of a previous feeding process. The feed engine 239, in some embodiments, may push the transformed data/content/information into one or more temporary indexes. In some embodiments, the feed engine 239 may further transform the transformed data/content/information into a feed object with a data-interchange format that facilitates parsing. The feed engine 239 and/or the aggregation/transformation engine 231 may translate the data into understandable data, information, and/or content. The transformed data, information, and/or content may be directed to certain tables and/or data stores 268 based on the type of and/or an entity category to which the data, information, and/or content relates. For example, in some embodiments, the master data management system 265 may manages provider content and feeds into search indexes and the content provisioning system.

The feeding process may include multiple processes, in some embodiments. For example, the feed engine 239 may spin out two processes: one process for communicating with a search server system 267(a); and one process for communicating with a document server system 267(b). The search server system 267(a) and/or the document server system 267(b) may process the temporary index and determine which data is absent from the data stores 268. Consequent to determining which data is needed, the data may be fed to the data stores 268.

In some embodiments, the data may be feed to the search server system 267(a) and/or the document server system 267(b) on a periodic basis (e.g., every 15 minutes or any other time period). The search server system 267(a), in some embodiments, may only retain in its search indexes information needed for retrieving content objects (e.g., documents) and ranking the content objects. Thus, with such embodiments, other information not necessary for retrieval and ranking (e.g., images corresponding to an entity). The document server system 267(b) may have every entity attribute indexed for information retrieval. This bifurcation may allow for the interaction infrastructure 102 to perform super-fast retrieval. The search server system 267(a), in some embodiments, may perform matching, sorting, and/or the like, and hence may be CPU heavy. The document server system 267(b), in some embodiments, may be a disk I/O intense system and can handle those kinds of loads.

Figure 7:
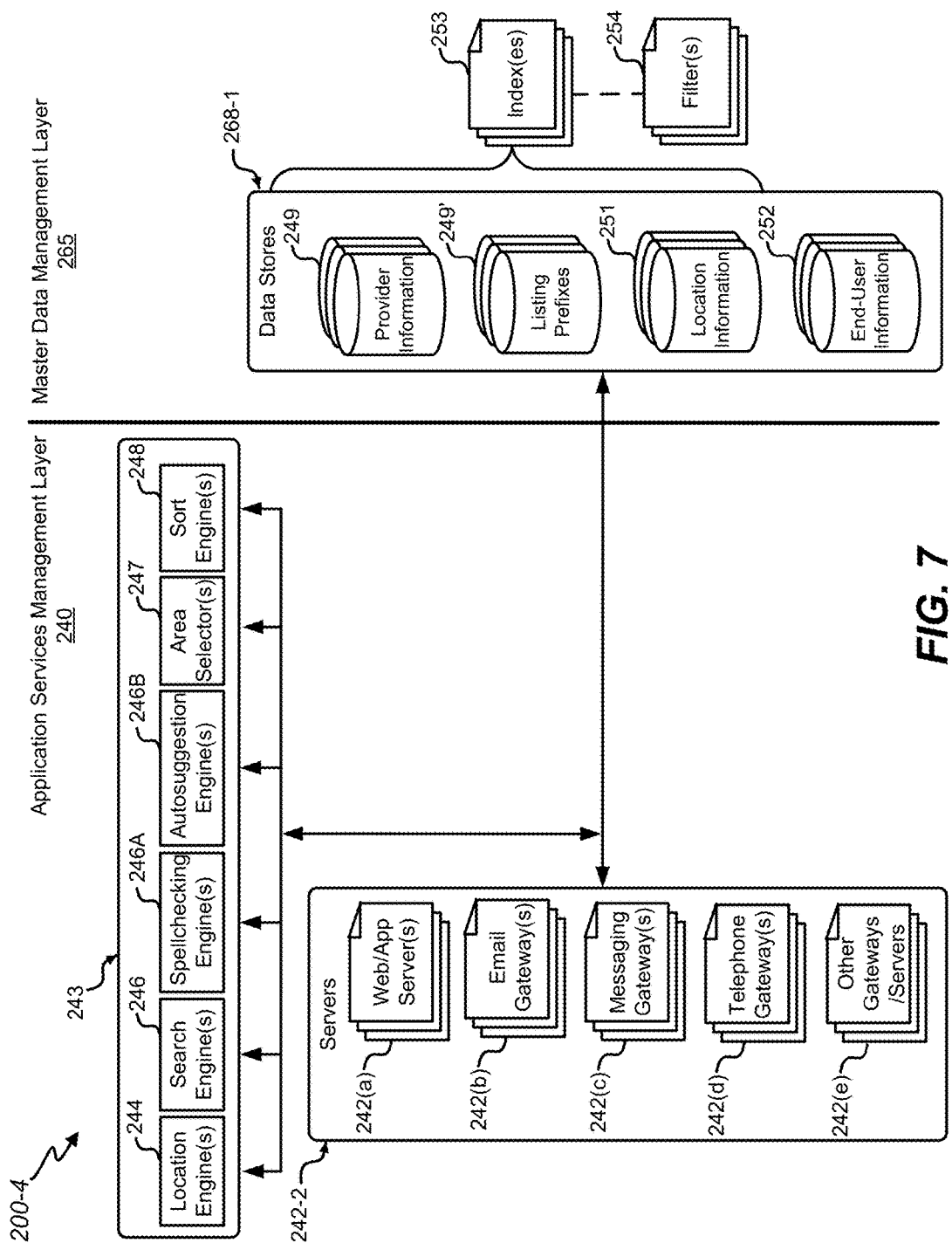
FIG. 7 shows a diagram of another portion of the architecture stack of the interaction infrastructure including certain aspects of the application services management and master data management layers, in accordance with certain embodiments of the present disclosure.

FIG. 7 shows a diagram of another portion 200-4 of the architecture stack 200 of the interaction infrastructure 102, in accordance with certain embodiments of the present disclosure. The portion 200-4 may, in some embodiments, correspond to portions of the application services management layer 240 and the master data management layer 265; and, in accordance with some embodiments, at least part of the application services management layer 240 may at least partially correspond to the search engine services layer 245. As depicted in FIG. 7, the server system 242 may include one or more communication servers. The server system 242 may include one or more web and/or application servers 242(a), one or more email gateways 242(b), one or more instant messaging gateways 242(c), one or more telephone gateways 242(d), one or more other gateways 242(e), such as television gateways, and/or one or more other types of servers, such as an application gateway (not shown) to interface with different servers. Some embodiments may use one type of communication server 242, such as a web server 242(a), to receive search requests and another type of communication server 242 to provide the search results. Some embodiments may use different types of communication servers 242 to service different types of client devices 205, 207.

The web and/or application server(s) 242(a) (referenced hereafter as a web server 242(a)) may include one or more web server and/or one or more application servers, such as mobile app servers. In some embodiments, a web 242(a) may communicate with a client device 205, 207 via Hyper- Text Transfer Protocol (HTTP) and/or other types of communication protocols, such as File Transfer Protocol (FTP), Wireless Application Protocol (WAP), etc. A web and/or application server(s) server 242(a) may provide static web pages, dynamic web pages, and/or web services. In some embodiments, a web server 242(a) may provide web applications to a client device 205, 207 for execution in a web browser running on the client device 205, 207; and the web applications may include scripts, such as Java, JavaScript, etc., for execution within an isolated environment in a browser. In some embodiments, the web server 242(a) may provide rich-client applications to the client device 205, 207; and the rich-client application may be programmed in traditional programming languages to have full access to functions of the operating system running on the client device 205, 207.

In some embodiments, the communication servers 242 provide a user interface for user interaction with content objects. For example, the web servers 242(a) may provide a user interface via static web pages, dynamic web pages, and/or web services, etc. For example, the web servers 242(a) may provide content objects with links to detail information pages of the provider information 249, such as a map, entity hours, driving directions, etc. The web servers 242(a) may provide user interfaces for the users to rate the content, provide reviews, view reviews from other users, etc. The web servers 242(a) may provide user interfaces to make reservations or to make purchases via the content objects. The web servers 242(a) can track various different types of user interactions with the content objects to determine or estimate the level of user interest in the content. The web servers 242(a) may provide rich client applications for execution in the mobile computing device to provide the user interfaces.

The communications server(s) 242 may be communicatively coupled to one or more information handling engines 243 that may provide functionality when executed by one or more servers to provide enhanced service handling features described herein. In some embodiments, one or more of the engines 243 and/or other modules may be servers communicating with other server(s) of the interaction infrastructure 102. The server communication may be over a network, such as an internal network, a local area network, a wide area network, an intranet, Internet, and/or the like. Any one or combination of the various servers may run on common or separate computers. In some embodiments, there may be one or more layers of application servers between communication servers and the data stores 268 to process the entity logic and data access of the rich client applications.

The information handling engines 243 may include one or more of a location engine(s) 244, a search engine(s) 246, a geo-aware spellchecking engine(s) 246A, a geo-aware autosuggestion engine(s) 246B, an area selector(s) 247, and/or a sort engine(s) 248 to process the search request and present search results based on the information stored in one or more data repositories 268. Other engines 243 may include and/or utilize the search engine 246 in various embodiments. In some embodiments, the search engine 246 may include logic for implementing searching the data stores 268 according to a search request. The searching may be in response to information received over the network 108 from a user. Responsive to a query, the search engine 246 may search, retrieve, modify, and/or cause transfer of particular information from one or more information repositories.

The one or more data repositories 268 may include provider information 249 about commercial entities or public end-user information, or other types of searchable end-user information. The one or more provider information repositories 249 may retain any local provider information (e.g., listings of provider information) suitable for embodiments of this disclosure, such as entity, product, and service information. In certain embodiments, the local provider information may correspond to directory information of the kind that may be available via Yellow Pages services and the like.

Provider information 249 may have street addresses or other location parameters, such as longitude and latitude coordinates, stored as locations in one or more location information repositories 251. The provider information 249 may include addresses, telephone numbers, descriptive content, notifications, and/or end-user information, etc. Provider information 249 may be associated with locations 251. The locations 251 may be part of the provider information 249, or associated with the provider information 249. In some embodiments, the provider information 249 may include information related to entity entities at corresponding locations 251. The entities may be entities or people. Some of the entities may pay fees to promote their content. Some of the entities may have free promotion. In some embodiments, the provider information 249 may be accessible to the public or to registered members.

In some embodiments, the data repository(ies) 268 may include one or more end-user information repositories 252. In some embodiments, a client device 205, 207 may store end-user information 252. In some embodiments, both the client device 205, 207 and the online data repository(ies) 268 store the end-user information 252 for a particular end user. In some embodiments, when there is a data communication connection between the client device 205, 207 and the online data repository(ies) 268, the client device 205, 207 and the online data repository(ies) 268 may synchronize their copies of the end-user information 252 for the end user. The end-user information 252 may be associated with the corresponding end users. In some embodiments, an end user may create corresponding end-user information 252. The web servers 242(a) may generally limit the access to the end-user information 252 to those who created the corresponding end-user information 252.

In various embodiments, the data repository(ies) 268 may be implemented in various ways. For example, one or more data processing systems may store the information related to the provider information 249, the locations 251, and the end-user information 252. For example, one or more relational or object-oriented databases, or flat files on one or more computers or networked storage devices, may store the information related to the provider information 249, the locations 251, and the end-user information 252. In some embodiments, a centralized system stores the information about the provider information 249, the locations 251, and the end-user information 252; alternatively, a distributed/cloud system, network-based system, such as being implemented with a peer-to-peer network, or Internet, may store the information about the provider information 249, the locations 251, and the end-user information 252.

In various embodiments, one or more of the location engine 244, the search engine 246, the geo-aware spellchecking engine 246A, the geo-aware autosuggestion engine 246B, the area selector 247, the sort engine 248, and/or other modules may be stored in the one or more memories and may include one or more software applications, executable with the processors, for receiving and processing data requests. In some embodiments, one or more of the location engine 244, the search engine 246, the geo-aware spellchecking engine 246A, the geo-aware autosuggestion engine 246B, the area selector 247, the sort engine 248, and/or other modules may be servers communicating with the communication server(s) 242. The server communication may be over a network, such as a local area network, a wide area network, an intranet, Internet, and/or the like. Any one or combination of the various servers may run on common or separate computers. In some embodiments, there may be one or more layers of application servers between the communication server 242 and the data stores 268 to process the entity logic and data access of the rich client applications. Alternatively, application servers may be integrated with the communication servers 242, such as the web servers 242(a). Certain embodiments are not limited to a particular type of connections among the communication servers 242, the location engine 244, the search engine 246, the geo-aware spellchecking engine 246A, the geo-aware autosuggestion engine 246B, the area selector 247, the sort engine 248, the data repository(ies) 268, and/or other modules.

In some embodiments, one computer system implements one or more of the servers 242, the location engine 244, the search engine 246, the geo-aware spellchecking engine 246A, the geo-aware autosuggestion engine 246B, the area selector 247, and the sort engine 248. Alternatively, different processes running on one or more shared computers may implement some of the components 242, 244, 246, 246A, 246B, 247, and/or 248. For example, one computing module, thread, or process may implement multiple of the components. In some embodiments, special purpose data processing systems implement the one or more of the components, such as using Application-Specific Integrated Circuit (ASIC) or Field-Programmable Gate Array (FPGA). In some embodiments, processes running according to software instructions on general purpose data processing systems, such as general purpose personal computers or server computers, can implement the components. Thus, the implementations are not limited to hardware, software, or particular combinations of hardware and software.

One or more of the location engine 244, the search engine 246, the spellchecking engine 246A, the geo-aware spellchecking engine 246A, the geo-aware autosuggestion engine 246B, the sort engine 248, and/or other modules may be configured to perform any of the steps of methods according to the present disclosure. In some embodiments, the location engine(s) 244 may include one or more engines and may use GPS coordinates, cellular tower triangulation techniques, Wi-Fi-based location information, carrier-provided location information, and/or other location determination systems to identify a location of the client device 205, 207. In some embodiments, the location engine 244 determines a location of interest to the end user related to a search request. In some embodiments, the location engine 244 determines a location of interest to the end user related to a phone call initiated with the client device 205, 207. The location of interest may be based on a location of the client device 205, 207. In some embodiments, the end user may explicitly specify the location of interest in a search request; and the location engine 244 extracts the location of interest from the search request. In some embodiments, a location of interest may be based on end-user information 252 stored for a particular end user and associated with identification information of the end user or the client device 205, 207. In some embodiments, the end user may specify some or all of the end-user information 252.

In some embodiments, the location engine 244 may automatically identify the location of interest based on determining the current location of the client device 205, 207 that is used to submit a search request and/or initiate a phone call. For example, the location engine 244 may determine the location of the client device 205, 207 based on a connection point the client device 205, 207 used to access the network 108 (e.g., based on the location of a wireless network access point, a base station of a cellular communication system, or a connection point to a wired network). In some embodiments, the client device 205, 207 automatically determines its current position (e.g., via a satellite positioning system, or a cellular positioning system) and transmits the determined or estimated position to the web server 242(a) with the search request, or provides the position in response to a request from the location engine 244.

In some embodiments, the search engine 246 may retrieve content from the data stores 268 according to a search request. In some embodiments, the search engine 246 may include or otherwise be configured to use the geo-aware spellchecking engine 246A, and/or the geo-aware autosuggestion engine 246B. In some embodiments, the geo-aware spellchecking engine(s) 246A may be used with the string corresponding to the search request to identify corrections for misspellings in search strings and/or to otherwise account for spelling variations in order to provide results with a greater degree of relevance. In some embodiments, the geo-aware spellchecking engine(s) 246A may be used with the string corresponding to the search request to identify corrections for misspellings in search strings and/or to otherwise account for spelling variations in order to provide results with a greater degree of relevance. In some embodiments, the geo-aware autosuggestion engine 246B may be used with the geo-aware spellchecking engine(s) 246A, may include the geo-aware spellchecking engine(s) 246A, and/or may be otherwise configured to account for geo-aware spelling variations and to provide such geo-aware features in conjunction with the geo-aware suggestion features described herein.

In some embodiments, the sort engine 248 may rank content objects pertaining to providers in the search results according to the distance between the location of interest and the locations 251 corresponding to the provider, or according to current levels of user interest in the retrieved content. The web servers 242(a) may track various different types of user interactions with the content objects to determine or estimate the level of user interest in the content objects. The sort engine 248 may rank the content objects according to other criteria, in accordance with other embodiments described herein. In various embodiments, the search engine 246 may be configured to search for and/or correlate user data, provider data, location data, and/or other data, in accordance with various embodiments described herein. In some embodiments, the sort engine 248 may be used to provide sorting features in conjunction with the geo-aware suggestion features described herein.

The client device 205 may indicate a geographic location when submitting the query. Alternatively, the system may determine an indication of the geographic location of the client device 205 based on the submitted query. In various embodiments, the area selector 247 may be configured to select areas of interest, in accordance with various embodiments described herein. In some embodiments, the area selector 247 may select a first geographic area based on the location of interest identified by the location engine 244. The search engine 246 may then retrieve a first set of content objects (which could include service provider information in some embodiments) that have corresponding location(s) within the selected first geographic area and that satisfies the search criteria. In some embodiments, if sufficient results are not found for the first geographic area, a second geographic area may be selected in an iterative process, which second area may or may not include the first geographic area, for searching. The first geographic area could correspond to a service area in some embodiments. In some embodiments, the search engine 246 may search for providers in a target area to obtain a set of search results; the area selector 247 may select geographic areas and selects groups of results that are within the selected geographic areas respectively. In some embodiments, the geo-aware autosuggestion engine 246B may be used with the area selector 247, may include the area selector 247, and/or may be otherwise configured to provide for such area selection features in conjunction with the geo-aware suggestion features described herein.

In some embodiments, the client device 205, 207 includes a web browser which allows the end user to submit a search request to one of the web servers 242(a) for location dependent information, such as a listing 252 of a provider. Alternatively or additionally in some embodiments, the client device 205, 207 includes a mobile application which allows the end user to submit a search request to one of the web servers 242(a) for location dependent information. Alternatively, the client device 205, 207 may provide the search request via other communication channels, such as email, short message service (SMS), instant messaging (IM), telephone connection, etc. For example, the client device 205, 207 may provide the search request to an email gateway 242(b) via email, or to an IM gateway 242(c) via instant messaging, or to a telephone gateway 242(c) via a telephone call, or to a television gateway 242(e) via an interactive television system. Some embodiments may use other types of gateways, such as gateways for SMS. Thus, the disclosure is not limited to the examples or combinations illustrated.

Certain embodiments may provide for associating listing information 249, location information 251, and prefixes 249' for the listings of provider information. One or more indexes 253 for the associated provider information 249, location information 251, and prefixes 249' may be built, updated, and maintained in some embodiments. In some embodiments, one or more inverted indexes 253 may be implemented. The one or more inverted indexes 253 may store mapping for the associated provider information 249, location information 251, and prefixes 249'. The one or more inverted indexes 253 may allow for faster information retrieval with search engine(s) 246 according certain embodiments.

In some embodiments, particular words may be stored in indexes 253. In some embodiments, each word may be linked to one or more documents, collections, files, fields, database structure/elements, or other forms of listing information that contain those words. In some embodiments, one or more inverted lists for each n-gram corresponding to the words may be created and may be associated with the words. For example, consider the string of "Max Bar & Grill," which can be decomposed into 2-gram sets such as {'ma', 'ax', 'x#', '#b', ... } where # stands for a space; into 3-gram sets such as {'max', 'ax#', 'x#b', ... }; and/or into other n-grams sets. In some embodiments, the decomposition may include word-level decomposition. Using the same example string of "Max Bar & Grill," various n-gram sets could include {'max', 'bar', 'grill', 'max bar', 'bar &', '& gril', 'max grill', 'bar & grill', ... }, for example.

An inverted list for a given n-gram may include any and/or all instances of strings from a plurality of strings that contain the n-gram. In some embodiments, a list may include identifiers of strings, in lieu of actual strings, for mapping to actual strings. This may improve efficiency. The string identifiers could be unique identifiers.

In some embodiments, the indexes 253 may allow for approximate string matching at least partially based on decomposition of strings, such as into n-grams or words, and building inverted lists based on the decompositions. In some embodiments, inverted lists may be based on tokens or other identifiers associated with the n-grams or words. In some embodiments, similarity of strings may be measured in terms of similarity of the respective n-grams, words, and/or identifiers. In some embodiments, the indexes 253 may include a multiplicity of possible variations for various strings. For example, the example string of "Max Bar & Grill" can have multiple corresponding strings at the word level, such as "mac's bar & grill," "mack's bar & grill," "mac's bar 'n grill," "max bar 'n grill," "macs bar & grill," "maxbar grill," "maxbargrill," etc. Thus, misspellings and spelling variations may be anticipated. Stemming may be used to allow for variations such as "sport bar" instead of "sports bar." Including misspellings and spelling variations may allow for the capture of the relevant information. The same example string of "Max Bar & Grill" can have multiple corresponding strings at the character level for various n-gram sets in some embodiments. Accordingly, the indexes 253 may allow for prefix matching that is not too strict and, more generally, the indexes 253 may allow for fuzzy search engine capabilities.

Various embodiments may employ various similarity measures that may be tailored to facilitate linking to the indexes and/or retrieval of documents and/or listing information retained in any other suitable form, collection, file, field, database structure/element, etc. For example, TF/IDF (term frequency/inverse document frequency) may be used to assess the significance of a particular word/n-gram with respect to a particular document and/or with respect to particular strings. The IDF for each n-gram in one or more strings, such as strings within a database, dataset, or table within a database, may be determined. The IDF of a token or string is the inverse of the total number of times that this token or string appears in a data collection, such as a database. In some embodiments, an IDF may indicate a weight for weighted similarity measures.

In some embodiments, the search engine may employ similarity measures between multiple strings to allow for fuzzy searching. The search engine may process one or more characters corresponding to user input of a search string and parse the search string into sets of n-grams compared the search string with index information. For example, the characters of an incomplete user-entered search string could be "macs b". The characters could be processed and decomposed into n-grams similar to the examples given above. The sets of characters could be compared to index entries to assess similarity using any suitable algorithm. Some embodiments may identify intersections between multiple sets and assigned a similarity score based on the extent of n-gram intersections between the search string and index entries, with a greater extent of an intersection of common characters indicating a greater degree of potential similarity between corresponding sets. For example, the search string "macs b" may be identified as a having a high extent of intersection with one or more index entries for "Max Bar & Grill," which may include the variant "macs bar & grill."

In some embodiments, the string length may be taken into account as a qualification for similar measures in order to allow for anticipatory/predictive auto-suggestion features discussed herein. In other words, the shorter length of the incomplete search string "macs b" with respect to the longer length of the index entries for "Max Bar & Grill" may be accounted for when assessing similarity. The disparity of lengths may not prevent identification of similarity. Hence, the high extent of intersection with n-grams of similar length and ordering associated with the n-grams of the first portion(s) of "Max Bar & Grill" may be identified even though the incomplete search string "macs b" may not have a high extent of intersection with subsequent portion(s) of "Max Bar & Grill." However, comparable string lengths may also be considered in assigning greater similarity scores. For example, the incomplete search string "macs b" may have high similarity with index entries for "Max Bar & Grill," but also with index entries for "Mac's Bar." In such instances, the aspect of comparable lengths of the search string and "Mac's Bar" may be recognized as indicating even greater similarity and thus the similarity score between the two may be higher than the similarity score between the search string and "Max Bar & Grill."

In some embodiments, a similar order of the intersecting sets may be taken as an additional indication of similarity. For example, a user-entered search string with "grill macs" may have a certain extent of character intersection with index entries corresponding to one entity, "Max Bar & Grill," and may have a certain extent of characters section with index entries corresponding to another entity, "Grill Max," however the orders of the intersecting sets may be recognized as being different with respect to these example cases. The ordering of n-grams of the search string "grill macs" has a greater correspondence to the ordering of n-grams of "Grill Max" than it does with respect to "Max Bar & Grill." Accordingly, the search string "grill macs" may be accorded a greater similarity score with respect to "Grill Max" and a lesser similarity score with respect to "Max Bar & Grill."

The above examples consider an entity name, however various embodiments may employ the same methods with respect to other types of listing information. For example, category and/or keyword strings can be decomposed in similar manner. Furthermore, entity names may be associated with various categories and/or keywords. For example, in some embodiments, sets corresponding to a given entity may include associated categories and/or keywords. Shingles of words associated with listings, service areas, and popular queries may be stored. In some embodiments, sets corresponding to a given entity may be linked to other sets of categories and/or keywords, for example, via pointers and/or other look-up tables. It should be understood that any suitable relational database approach may be used to associate the various sets and/or members thereof.

As addressed above, certain embodiments may provide a spellchecker service that is geo-sensitive. For example, for a search in the area of Monrovia, Calif., the geo-aware spellchecker 246A may recognize that an entry of "Plummer" should not be corrected to "Plumber." To facilitate the geo-sensitive spellchecking, words corresponding to listings, and variations of the words, may be stored and linked to corresponding location information. The linking may be provided by way of the one or more indexes 253, with the word variations and locations being stored in inverted index(es) in some embodiments. Accordingly, with the word variations, the indexes 253 may store corrections for misspelled search strings in order to account for spelling variations. However, not all corrections make sense for a particular area, as in the example given above. To address that reality, the indexes 253 may be configured such that the linked location information allows for spellchecking tailored to a location of interest. The geo-aware spellchecker 246A may determine whether one or more corrections or an original query makes more sense in a particular area. Based on that determination, corrections which do not make sense in that area may be filtered out. Accordingly, the accuracy of spelling corrections may be improved, and false positives may be minimized.

The geo-aware spellchecker 246A may receive the search string and may identify one or more potential corrections for the search string. The geo-aware spellchecker 246A may look up the search string and the one or more potential corrections in the index(es) 253, comparing the search string and the one or more potential corrections to listing information for the identified location. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed to check the search string first, then the most likely applicable potential correction, then the next most likely applicable potential correction, and so on until a positive indication is found in the index(es) 253. In some embodiments, the geo-aware spellchecker 246A may identify one or more potential corrections for the search string first in a geo-oblivious manner, and then analyze the potential corrections for applicability to an identified location. In some embodiments, the geo-aware spellchecker 246A may only identify a limited set of one or more potential corrections for the search string that are applicable to an identified location.

Certain embodiments may provide a clustering-based approach to facilitate the geo-sensitive spellchecking Words corresponding to listings, and variations of the words, may be stored and linked to corresponding location information, where the location information may include location identifiers, such as latitude and longitude coordinates, for the listings. For example, entity names may be stored with coordinates for the entities. Then, clusters may be formed based on the location information. For example, when displayed on a map, entities with a given entity name (such as a chain of restaurants) may have multiple locations. Using any suitable clustering algorithm, one or more boundaries may be drawn or otherwise defined to surround one or more clusters of the entities.

The corresponding clusters of data may be used for verification of a search string and one or more potential corrections for the search string. The geo-aware spellchecker 246A may receive the search string and may identify one or more potential corrections for the search string. The geo-aware spellchecker 246A may look up the search string and the one or more potential corrections in the clustered data, comparing the search string and the one or more potential corrections to listing information in the cluster that corresponds to the identified location. Stated otherwise, the geo-aware spellchecker 246A may check if a word and/or n-gram is found in the cluster. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed with the cluster, as discussed above.

As addressed above, certain embodiments may provide an autosuggestion service that is geo-sensitive. The autosuggestion service may provide type-ahead suggestions that are geographically relevant. As a user types a search query, the user may be presented with the type-ahead suggestions that are relevant to user's current geography and/or another geography of interest. Though reference is made herein to type-ahead suggestions and in some embodiments one or more suggestions could appear in the query field as a type-ahead suggestion, the term type-ahead suggestion could include other manners of presentation, such as over at least a portion of the query field, or beside the query field so that a user may accept a suggestion via selection of a space key, selection of an enter key, or any other suitable manner of selection. In some embodiments, the search engine 246 may be configured with the geo-aware autosuggester 246B to effect a geo-aware autosuggest search engine. In some embodiments, the search engine 246 may include the geo-aware autosuggester 246B. In some embodiments, the search engine 246 may not include, but may be configured to work in conjunction with, the geo-aware autosuggester 246B. In various embodiments, the geo-aware autosuggester 246B may be integral with or independent of the search engine 246. In various embodiments, a geo-aware autosuggester 246B could be implemented separately or without the spellchecking module 246A. In some embodiments, the geo-aware spellchecking module 246A could be configured as a geo-aware autosuggester 246B such that autosuggestion features are an extension of spellchecking features.

The geo-aware autosuggester 246B could receive a series of search string characters and perform a lookup with the reception of each character or set of multiple characters. The lookup could be performed with one or more indexes 253. In some embodiments, one or more filters 254 could be used in conjunction with the one or more indexes 253. To facilitate the geo-aware autosuggestion, words corresponding to suggestions/listings, and variations of the words in some embodiments, may be stored and linked to corresponding location information. For example, suggestions/listings corresponding sets of words and/or n-grams may be linked to location information in the indexes 253.

The autosuggestion service may provide suggestions that are relevant to a geographical area(s) of interest. The suggestions may correspond to listings that in close proximity to an area of interest, as providing suggestions that are too far away from the area of interest may negatively impact the user experience. In providing suggestions, the autosuggestion service may allow for a quick response time so that suggestions are provided between key presses of a user. By way of example, the autosuggestion service may provide suggestions on the order of milliseconds or tens of millisecond in response to each character input. Given such constraints, it may be advantageous to divide geographical areas into multiple smaller areas. A code may be assigned to each small area, and that area code may be assigned to the suggestions relevant to that area.

Accordingly, the location information may include location identifiers. Linked information may be distinguished, segregated, and/or categorized based on location in any suitable manner, with any suitable location identifiers being used to link information to corresponding areas. In various embodiments, the location could have any suitable level of specificity, e.g., including a county, a municipality, zip code, school district, entity directory service area, and/or the like. For example, a zip code, a collection of zip codes, one or more listing service directory codes (which may correspond to particular telephone directory service areas, which service areas could be defined by zip code(s)), and/or the like may be used as a basis for linking information to a location.

Figure 8:
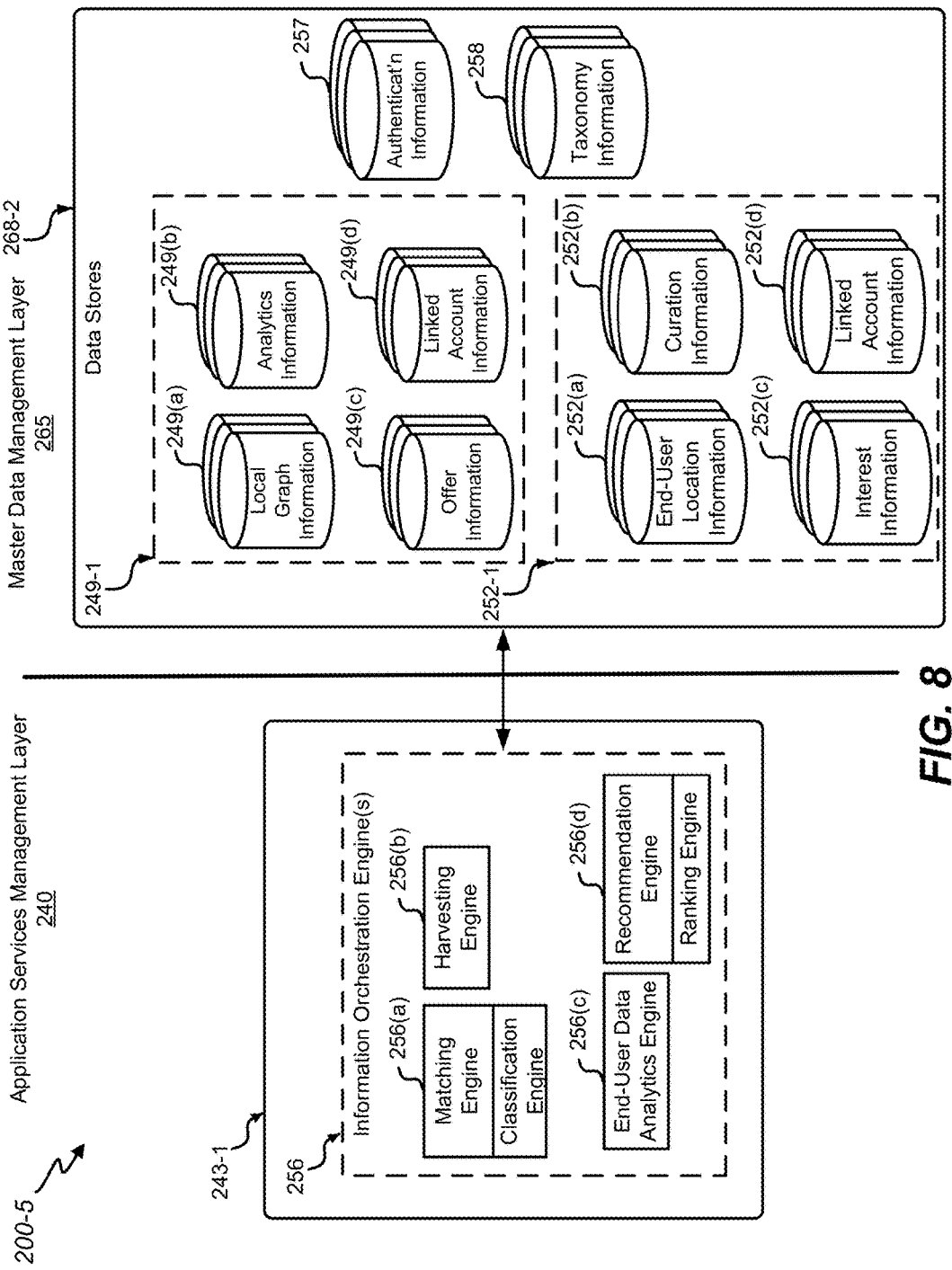
FIG. 8 shows a diagram of another portion of the architecture stack of the interaction infrastructure including certain aspects of an information orchestration layer, in accordance with certain embodiments of the present disclosure.

FIG. 8 shows a diagram of another portion 200-5 of the architecture stack 200 of the interaction infrastructure 102, in accordance with certain embodiments of the present disclosure. The portion 200-5 may, in some embodiments, correspond to portions of the application services management layer 240 and the master data management layer 265; and, in accordance with some embodiments, at least part of the application services management layer 240 may at least partially correspond to the customized orchestration layer 250.

The customized orchestration layer 250 may include one or more of the information handling engines 243. The engines 243 may include one or more information orchestration engine(s) 256. In some embodiments, the information orchestration engine(s) 256 may include logic for implementing any features of personalized orchestration of entity information and/or user-specific services in various embodiments disclosed herein. In some embodiments, the information orchestration engine(s) 256 may facilitate an application on the end-user device to provide any such features. In some embodiments, the information orchestration engine(s) 256 may be incorporated in the application.

In certain embodiments, the information orchestration engine(s) 256 may be configured to compile keyword criteria, for example, in an ontology, and could include an ontology reasoner or semantic reasoning module to make logical inferences from a set of facts in the ontology. Accordingly, the information orchestration engine(s) 256 may correspond to a reasoning engine configured to effect one or more features described herein. A pattern-based reasoner could be employed to use various statistical techniques in analyzing interest data in order to make inferences based on the analysis. A transitive reasoner could be employed to infer relationships from a set of relationships related to interest data. In certain embodiments, the information orchestration engine(s) 256 may include logic for implementing workflow features in various embodiments.

In some embodiments, the information orchestration engine(s) 256 may include logic to implement and/or otherwise facilitate any taxonomy, classification, categorization, correlation, mapping, qualification, scoring, organization, and/or the like features discussed herein. In some embodiments, the information orchestration engine(s) 256 may include a matching engine 256(*a*) configured to facilitate one or more such features. For example, the matching engine 256(*a*) may be or include a classification engine configured to classify each of a plurality of entities into at least one category of a set of categories that represent classifications of entities based at least in part on one or more sets of attributes defined for classifying various entities. For example, information with respect to a particular entity may be analyzed in order to identify one or more entity attributes. The matching engine 256(*a*) can receive entity information, identify attributes of the entity based at least in part on the entity information, and match the entity to one or more categories based on category information retained in a repository. The entity may be matched to one or more categories that each represents classifications of entity sharing common attributes. In some embodiments, one or more taxonomies that map particular profile information to particular categories may be used in correlating entity profile information with one or more categories. The entity could be classified according to products and/or services that the entity provides. The entity could be classified according to location, for example, a segment that the entity serves and/or a physical site of the entity. The entity could be linked to location identifier(s) (such as a directory code(s) relevant to the entity listing of the suggestion); geo coordinates corresponding to the entity (e.g., latitude and longitude); and/or the like.

As another example, the matching engine 256(a) may be or include a classification engine configured to classify each of a plurality of end users into at least one category of a set of categories that represent classifications of end users based at least in part on one or more sets of attributes defined for classifying various end users. As a further example, the matching engine 256(a) may be configured to process first information enabling unique identification of a particular end user, process second information about a first location corresponding to the end user, and match the end user to a first category from the set of categories.

In some embodiments, the matching engine 256(a) may be configured to match the user to one or more entities based at least in part on correlating categories. The matching could, in some embodiments, be based at least partially on comparing user attributes/categories with entity attributes/categories. For example, they may be matched according to preferences, certain biographical information, demographic information, interests, location information, etc.

Any suitable correlation process may be employed. A scoring system could be correlated to the category scheme in some embodiments, such that certain scores correspond to matches of certain categories. Some embodiments may score a match with a numerical expression, for example, a match score, with higher scores being assigned to higher correlations of user attributes/categories with entity attributes/categories. A high correlation may be identified using any suitable qualification scheme (e.g., a score threshold, a score ranking, etc.).

In some embodiments, the information orchestration engine(s) 256 may include one or more harvesting engines 256(b). In some embodiments, the harvesting engine 256(b) may include logic for implementing information logging features in various embodiments. In some embodiments, the harvesting engine 256(b) may be configured to gather data about an identified end user from one or more data sources. By way of example without limitation, the harvesting engine 256(b) could process data pulled and/or pushed from various entities. The harvesting engine 256(b) could handle process, extracting, formatting, and/or storing/recording data including data for indicia of interest, preference data, taxonomy data, mapping data, and/or the like. In some embodiments, the harvesting engine 256(b) may work in conjunction with the service monitoring engine 228; in some embodiments, the harvesting engine 256(b) may correspond in whole or in part to the service monitoring engine 228. The harvested data may then be analyzed to determine one or more attributes of the first end user.

In some embodiments, the information orchestration engine(s) 256 may include interest data analytics modules may include logic to retrieve, process, derive, compile, aggregate, handle, store, report, and/or present information relating to interest data. In some embodiments, the information orchestration engine(s) 256 may include one or more end-user data analytics engines 256(c) configured to facilitate one or more such features. In some embodiments, one or more data analytics engines 256(c) may include logic to retrieve, process, derive, compile, aggregate, handle, store, report, and/or present information relating to end-user data. The performance analytics engine(s) 256(c) may be configured to present any desirable information in any desirable manner. With respect to a particular provider, the logging engine(s) 256(b) and end-user data analytics engine(s) 256(c) may facilitate various features of one or more provider interfaces, in accordance with certain embodiments herein.

In some embodiments, the information orchestration engine(s) 256 may include one or more recommendation engines 256(d). The recommendation engine 256(d) may be configured to analyze end-user information 252 for particular end users and aggregated, classified provider information 249 to identify a set of one or more recommendations (e.g., of offers, entities to add to a collection, etc.). The recommendation engine 256(d) may generate one or more recommendations. Certain embodiments may identify recommendations based at least partially on similarities of characteristics of a first end user and characteristics of other users having associations with entities (e.g., having added the entities to their collections). Any suitable algorithm for assessing similarity may be employed. Some embodiments may identify intersections between multiple sets of characteristics. Having set intersections identified, the intersections may be compared. A greater extent of an intersection may be an indication of a greater degree of similarity between the users. In some embodiments, the sets may be ranked according to the extent of the intersections.

In some embodiments, the data stores 268 may include one or more authentication information repositories 257 may retain any authentication information suitable to facilitate security for embodiments of this disclosure. The authentication information repositories 257 may include database(s), database management system(s), server(s) to facilitate management/provision/transfer of authentication information, and/or the like. The repositories 257 may retain authentication information of one or more particular end users, providers, and/or other data sources. The authentication information may include information to check credentials of end users, providers, and/or other data sources that may use one of their corresponding interfaces to seek access, transfer information, and/or make entity-related transactions with the interaction infrastructure 102. The authentication information may be used to provide security for transactions, restrict the access granted to a certain set of information and/or features, implement certain control and/or features for certain parties, and/or the like.

In some embodiments, the one or more data stores 268 may include one or more taxonomy information repositories 258 to retain any suitable information associated with taxonomy feature in accordance with various embodiments disclosed herein. For example, one or more taxonomy information repositories 258 may retain mapping information, classification information, scoring criteria, and/or the like. Information retained in one or more taxonomy information repositories 258 may be used to classify user interest data/indicia, classify entities, map user interests, entities, and/or interest categories, and/or otherwise correlate and organize information in accordance with various embodiments disclosed herein.

As described above, the one or more provider information repositories 249 may retain provider information of particular providers. The repositories 249 may retain any information related to providers, including entities and people, which may have street addresses or other location parameters, such as longitude and latitude coordinates, maps, driving directions, and/or the like, stored as locations in one or more location information repositories 251. For example, one or more provider information repositories 249 may retain any information related to provider identification information, provider profiles, provider certification information, entity description, product descriptions, service descriptions, ratings/reviews/comments/preference indicia associated with providers, provider websites, provider authentication information, provider statuses, provider relationships, organization details, payment methods, accounting information, credit information, asset information, collateral information, address information, contact information, entity hours, availability, user account information, descriptive content, notifications, and/or the like.

In some embodiments, provider information may include local graph information 249(*a*). The local graph information 249(*a*) may include mapping information about a provider's connections to collections, windows, end users, and/or the like via the orchestration service. The local graph information 249(*a*) may include classification information about a provider and relation to user interest data and entity categories. Generally, the local graph information 249(*a*) may include any information to facilitate provider inclusion in the orchestration platform in accordance with various embodiments described herein.

Provider information may include analytics information 249(*b*). The analytics information 249(*b*) may include any performance information related to particular providers, including any end-user data analytics related to particular providers. Provider information may include offer information 249(*c*) retained for particular providers. The offer information 249(*c*) may include offers that particular providers have created, entity rules associated with provisioning offers to end users, and/or the like. Provider information may include linked account information 249(*d*). The linked account information 249(*d*) may include information about a provider's account(s) that are linked with the orchestration system, such authentication information for linked accounts, which accounts may include email accounts, short messaging accounts, online social/entity networking accounts, and/or the like. The analytics information 249(*b*), the offer information 249(*c*), and the linked account information 249(*d*) may include any information to facilitate various features of one or more provider interfaces, in accordance with certain embodiments herein. con The one or more end-user information repositories 252 may retain any suitable information associated with users in accordance with various embodiments disclosed herein. The end-user information may include end-user identification information, payment methods, accounting information, contact information, user account information, and/or the like. One or more end-user information repositories 252 may retain any information related to end-user location information 252(*a*), curation information 252(*b*), interest information 252(*c*) related to end user (which may include information related to indicia of interest), linked account information 252(*d*), and/or the like. The curation information 252(*b*) may include local graph information, which may include information about providers of interest, providers that have been added to a user's collection, geo-specific criteria for end user collections/profile, entity information otherwise associated with the end user (which may include collection followings, e.g.), notes by the end user, photos and/or other images associated with the end user, preferences of the end user, arrangement/organizational particulars for entity information associated with the end user, end-user requests, and/or any suitable information to facilitate any one or combination of the personal curation features described herein. The linked account information 252(*d*) may include information about an end user's account(s) that are linked with the orchestration system, end-user notification profiles, end-user authentication information, and/or any information to facilitate various features of one or more end-user interfaces, in accordance with certain embodiments herein.

In some embodiments, a client device 205, 207 may store end-user information 252. In some embodiments, both the client device 205, 207 and the online data stores 268 may store the end-user information 252 for a particular end user. In some embodiments, when there is a data communication connection between the client device 205, 207 and the online data stores 268, the client device 205, 207 and the online data stores 268 may synchronize their copies of the end-user information 252 for the end user.

Figure 9:
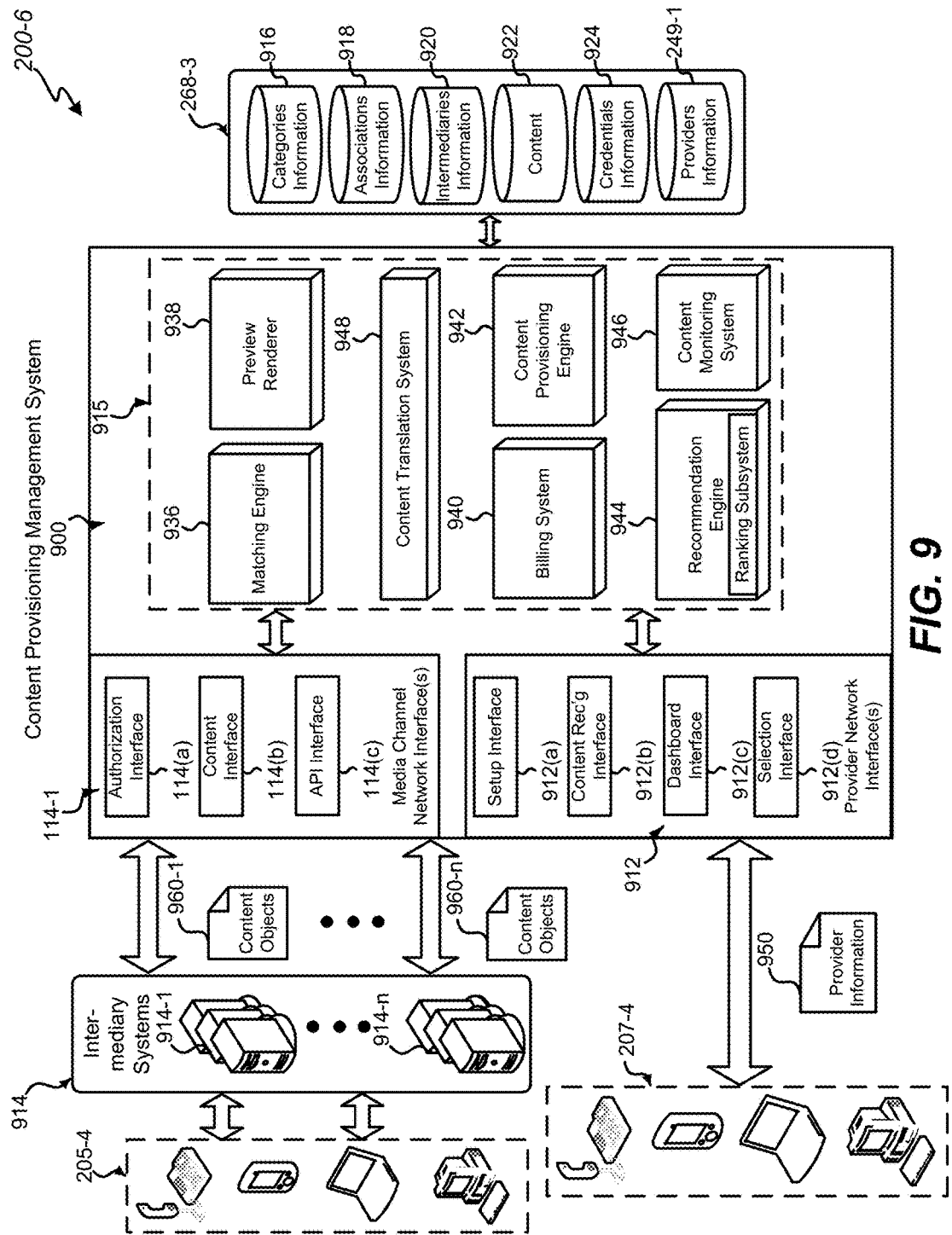
FIG. 9 shows a diagram of another portion of the architecture stack of the interaction infrastructure including certain aspects of a content provisioning management system, in accordance with certain embodiments of the present disclosure.

FIG. 9 shows a diagram of another portion 200-6 of the architecture stack 200 of the interaction infrastructure 102, in accordance with certain embodiments of the present disclosure. The portion 200-6 may, in some embodiments, correspond to portions of the application services management layer 240 and the master data management layer 265. In accordance with some embodiments, portion 200-6 may at least partially correspond to the content provisioning management layer 255.

In some embodiments, a content provisioning management system 900 may provide a single interface for a provider to manage content transmitted by intermediary systems 914 to client devices 205 on behalf of a provider. In some embodiments, the content provisioning management system 900 can use categories to customize recommendations to the provider in managing content provided to intermediary systems 914.

The provider may make decisions that can include implementing recommendations provided by the content provisioning management system 900. By using the content provisioning management system 900, the provider does not need to manage each intermediary relationship separately. Further, the provider can be provided more summary information about end user sentiment and/or activity, than could be observed through separate intermediary interactions.

The content provisioning management system 900 can provide a central point to manage information between the provider devices 207, intermediary systems 914, and end-user devices 205. The content provisioning management system 900 monitors and analyzes particularized content served by intermediary systems 914. Some content served by intermediary systems 914 is provided by end-user devices 205, for example, in form of end-user ratings, review, and/or other feedback. The content provisioning management system 900 may provide information about content provided by intermediary systems 914 to the provider devices 207. The content provisioning management system 900 can receive information from the provider devices 207 and translate the information to particularized content objects that can be transmitted to the intermediary systems 914 for use by intermediary systems 914.

The content provisioning management system 900 can analyze the content objects distributed by intermediary systems 914. Based on the analysis, the content provisioning management system 900 can provide recommendations, statistics, identify areas of weakness and/or identify areas of competence. In some embodiments, the content provisioning management system 900 can implement recommendations.

Intermediary systems 914 can distribute content that is accessed by end-user devices 205. In some embodiments, end-user devices 205 provide content to intermediary systems 914 to serve. Some intermediary systems 914 can allow interaction with content through APIs, such as receiving and/or transmitting content and/or notifications. As intermediary systems 914 attract end users, it can be desirable for a provider to interact with end-user devices 205 through intermediary systems 914.

In some embodiments, the content provisioning management system 900 may be configured to match providers to intermediary systems 914 and select particular intermediary systems 914 for serving content 960 of particular providers. In some embodiments, the content provisioning management system 900 can assign intermediary systems 914 to categories. Some intermediaries can be assigned to specific categories. Other intermediaries can be considered generically applicable. In some embodiments, the content provisioning management system 900 can recommend to providers both generic intermediaries and category-specific intermediaries.

When used herein, a category may correspond to a grouping of providers that share common characteristics. Categories can include other categories (sometimes referred to as subcategories). Categories do not have to be mutually exclusive, as a provider can be assigned more than one category.

Provider specifications may be received from the provider device 207. A provider may provide unique identification information to content provisioning management system 900. The provider may specify a specific geographic area for the services provided by the provider device 207. The content provisioning management system 900 may provide distribution information (e.g., about creating a provider listing) for one or more intermediaries to a provider device 207. In some embodiments, the content provisioning management system 900 may determine a category to which the provider belongs. And, based on the category selected, the content provisioning management system 900 may recommend distribution information (e.g., creating a provider listing) for one or more intermediaries.

After receiving a selection of intermediaries, the content provisioning management system 900 may determine a superset of content to request from the provider device 207. Having received client information 950, the content provisioning management system 900 can translate the client information 950 to content 960-1 to 960-$n$ compatible with each intermediary system 960-1 to 960-$n$. Content 960-1 to 960-$n$ can then be transmitted to matching intermediary systems 960-1 to 960-$n$.

The content provisioning management system 900 may include provider network interface 912, engines 915, datastores 268, and intermediary network interface 114-1. In various embodiments, the one or more engines 915 may be implemented by one or more servers. In other embodiments, each engine 915 may comprise a set of servers that interact with other servers (e.g., datastores 268, engines 915, provider network interfaces 912, media channel network interfaces 114) through API calls.

The provider network interface 912 can communicate with provider devices 207 and receive client content 206-1 to 206-$n$. The provider network interface 912 may include interfaces to enable the management system functionality. The provider network interface 912 may include a setup interface 912(*a*) that enables the content provisioning management system 900 to receive unique identifying information of a provider. The provider network interface 912 may include a content receiving interface 912(*b*) that enables receipt of provider information 950. The provider network interface 912 may include a dashboard interface 912(*c*) that enables provisioning of information about content served to provide devices 207 to enable monitoring of intermediary content and changing intermediary content (e.g., add a new address, provide a new posting, etc.). The provider network interface 912 may include a selection interface 912(*d*) that provides recommendations of intermediaries and receives selections of intermediaries. The provider network interface 912 may include other provider network interfaces 912 and can communicate using various protocols and APIs.

The content provisioning management system 900 can include engines 218 that process information from datastores 208, provider network interface 912 and intermediary network interface 250. The content provisioning management system 900 may include a recommendation engine 244. The recommendation engine 944 may be configured to provide a list of intermediaries retrieved from the associations datastore 918 and intermediaries datastore 920. A ranking subsystem 944 can order the list of intermediaries for recommendation to the provider.

In some embodiments, the content provisioning management system 900 may include a matching engine 936 that may receive unique provider information and match the provider to a category from a category datastore 916. The category datastore 916 may include information about categories and characteristics of providers that may be identified as part of the category. Based on the matched category, the recommendation engine 944 can provide a list of intermediaries associated with the category and generic intermediaries retrieved from the associations datastore 918 and intermediaries datastore 920. The association datastore 918 may include information about provider associations with intermediaries. In some embodiments, the association datastore 918 may include information about provider associations with categories, as well. The intermediaries datastore 920 may include information about intermediaries including content accepted, ranking information, etc. In some embodiments, the intermediary datastore 920 may include category affinities, as well. The ranking subsystem 944 can order the list of intermediaries for recommendation to the provider.

A content provisioning engine 942 may receive a selection of intermediaries from provider device 207 and determine a superset of provider information 950 to receive. The content provisioning engine 942 may receive provider information 950 and may store it in a content repository 922. The content repository 922 may include provider information 950 as well as translated content from content translation system 948. The content provisioning engine 942 may generate content objects 960 based on the provider information 950. In some embodiments, the content provisioning engine 942 may cause the provider information 950 to be translated through translation system 948. The translation system 948 may generate content 960 that matches content requirements (e.g., protocol, format, content type, and/or the like) of the intermediary system 914 in order to distribute the content 960.

A preview renderer 938 may use the provider information 950 to generate a preview of how provider content would appear if served by a particular intermediary system 914. When a preview is approved by a provider, the content provisioning engine 942 may transmit one or more content objects 960 to one or more intermediary systems 914. If needed, content provisioning engine 242 may create accounts with one or more intermediary systems 914 on behalf of a provider, may store credentials in credential store 924. The credential datastore 924 may include credentials that are used on behalf of providers to access one or more accounts of intermediary systems 914. Credentials may include username/passwords, tokens, certificates, etc. The content provisioning engine 942 may use credentials to provide content objects 960 to serve via the intermediary systems 914. Content monitoring system 946 may monitor the intermediary systems 914 for changes to distributed content. Content changes may be reported back to provider device 207 by the content monitoring system 946 with recommendations on fixing any problems. The content provisioning engine 942 may implement recommendations by content monitoring system 246.

A billing system 940 may track usage, billing, and/or authorization to use the management system. The billing system 940 may bill providers based on a number of intermediaries per month, each intermediary interaction, for each service utilized and/or a monthly fee. The billing system 940 may operate in conjunction with payment processors to enable billing and payment for services.

The media channel network interface 114-1 may communicate with intermediary systems 914. The media channel network interface 114-1 may include an authorization interface 114(*a*) that uses credentials from credential datastore 916 to access intermediary systems 914 on behalf of providers. A content interface 114(*b*) may be configured to send and receive content objects 960 to/from intermediary systems 914 on behalf of providers. An API interface 114(*c*) may access intermediary systems 914 using APIs and provide API access to the content provisioning management system 900 by intermediary systems 914.

In one example, a car parts store representative uses a web-browser client 207-2 to connect to the content provisioning management system 900. The representative uses the setup interface 912(*a*) to provide a provider name, address, and product/service details. The recommendation engine 944 may provide the representative with a list of intermediaries (e.g., Facebook.com™, Google Local Listings™, Yellowpages.com™, and LinkedIn.com™) from intermediary datastore 920. In some embodiments, the matching engine 936 may determine that the car parts store is part of an automotive category based on characteristics from category datastore 916, and the recommendation engine 944 may provide the representative with a list of intermediaries that match the category of automotive (e.g., autosbarter.com) as well as generic intermediaries from intermediary datastore 920. After the representative makes the selection, the billing system 940 may require payment for the services requested (e.g., 10 intermediaries per month). The content provisioning engine 242 may determine a superset of content needed for the 10 intermediaries selected, including hours, photographs, contact information, description and a list of representative products. The content provisioning engine 942 may receive the provider information 950, store it in the content repository 920, and cause the preview renderer 938 to provide a preview of the content to the client device 207. The content provisioning engine 942 may generate content based on the information 950 which may include cause any non-conforming content to be translated through the content translation system 948 (e.g., resizing and reformatting pictures, translating formats of documents, selecting portions of provided information and inserting them into content objects, etc.). The content provisioning engine 942 may receive credentials for access to intermediary systems 914 from the client device 207 or may create them on behalf of the provider and store the credentials in the credential store 224. Using the credentials, the content provisioning engine 942 may use the authorization interface 114(*a*), the content interface 114(*b*), and/or the API interface 114(*c*) to deliver content 960 to intermediary systems 914. The content monitoring system 946 may monitor intermediary activities, responses, and may ensure that the content continues to be correctly provisioned. Corrections may be sent to the content provisioning engine 942 to be corrected.

In some embodiments, the content provisioning management system 900 may alternatively or additionally be configured to direct content 960 directly to client devices 205 without the intermediary of the intermediary systems 914. For example, content objects 960 may be directed to the client devices 205 as results to queries, end-user-initiated and/or system-initiated, serviced by the search engine services layer 245. As another example, content objects 960 may be directed to the client devices 205 as results to queries and/or recommendations, end-user-initiated and/or system-initiated, serviced by the customized orchestration layer 250, which may or may not use the search engine services layer 245 in various embodiments. In various embodiments, content objects 960 may be generated for presentation with various types of media channels (e.g., web page, WAP page, short message, television programs, news articles, etc.).

In some embodiments, one or more of the datastores 268, for example, provider information datastore 249, the content datastore 922, and/or the like, may contain phone numbers of target phones. Typically, the target phones belong to providers. In some embodiments, communication references may be embedded in the content 960 and provided to the client devices 205. The communication references may allow routing of calls from client devices 205 at least partially based on location in accordance with certain embodiments of this disclosure. In some embodiments, a communication reference may be a phone number. The phone number could indicate a category of providers. In some embodiments, a communication reference may facilitate a click-to-call feature.

In embodiments where a client device 205 is a mobile device, content 960 may be transferred to the device 205 through wireless communication connections, such as cellular communication links, wireless access points for wireless local area network, etc. In some embodiments, a client device 205 may be able to initiate a phone call (e.g., automatically dialing according to the encoded phone number embedded in the content information when a user selects the number). In some embodiments, dialing a phone number corresponding to a communication reference may connect the phone call to the call management system 1000, which described further below in reference to FIG. 10. The call management system 1000 may include one or more routers 1014, which may include switching equipment. The router 1014 may include one or both of a router and a decoder. In some embodiments, based at least partially on the communication reference selected, such as a phone number dialed and/or a call button selected, the router 1014 may determine one or more corresponding target communication references using the datastores 268 and may connect the phone call to one or more target provider devices 207 through the network(s) 108. The network 108 may include a telephone network that may be circuit switched, package switched, or partially circuit switched and partially package switched. For example, the telephone network may partially use the Internet to carry the phone call (e.g., through VoIP). For example, a connection between a client device 205 and the call management system 1000 may be carried using VoIP; and the connection between a router and a decoder of the router 1014 may be carried using a land-line based, circuit-switched telephone network.

Figure 10:
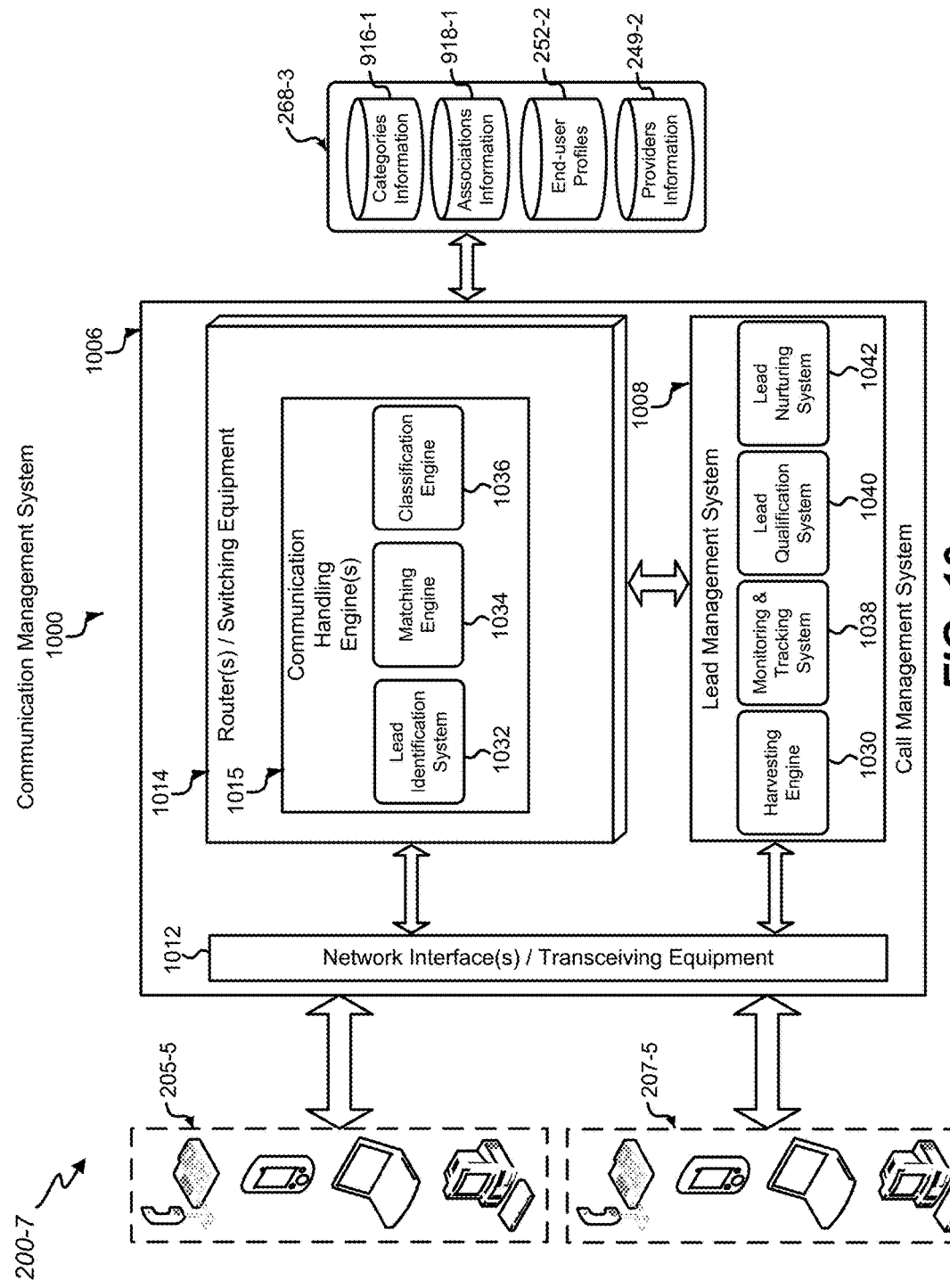
FIG. 10 shows a diagram of another portion of the architecture stack of the interaction infrastructure including certain aspects of a communication management system, in accordance with certain embodiments of the present disclosure.

FIG. 10 shows a diagram of another portion 200-7 of the architecture stack 200 of the interaction infrastructure 102, in accordance with certain embodiments of the present disclosure. The portion 200-7 may, in some embodiments, correspond to portions of the application services management layer 240 and the master data management layer 265 and, in accordance with some embodiments, may at least partially correspond to the communication management layer 260.

The communication management system 1000 may be configured to allow for routing communications between different client devices 205 and 207 and for qualifying communications in real time. The communication management system 1000 may include a call management system 1006 and a lead management system 1008. The communication management system 1000 may include may include logic to implement and/or otherwise facilitate any call handling features disclosed herein. By way of example without limitation, the communication management system 1000 may include one or more call handling modules that may be configured to one or more of decode, route, and/or redirect calls to/from subscribers and provider representatives. Similarly, the communication management system 1000 may include one or more message handling modules that may include logic to implement and/or otherwise facilitate any message handling features disclosed herein. While systems, engines, repositories, and other components are described separately herein, it should be appreciated that the components may be combined and/or implemented differently in any combination to provide certain features in various embodiments. In various embodiments, different processes running on one or more shared computers may implement some of the components.

The communication management system 1000 may be, correspond to, and/or include one or more servers that, in various embodiments, may include one or more switches and/or media gateways, such as telephone, messaging, email, application, and/or other types of gateways. The communication management system 1000 may be configured to determine which communications from end users (e.g., calls) go to which providers (and/or vice versa). The communication management system 1000 may include one or more network interfaces 1012, one or more processors and memory. In various embodiments, one or more of the processor(s), memory, and/or network interface(s) 1012 may correspond to the one or more servers. The network interface(s) 1012 may include any suitable input/output module or other system/device operable to serve as an interface between one or more components of the infrastructure 102 and the one or more networks 108. The network interfaces 1012 may be used to communicate over the networks 108 using any suitable transmission protocol and/or standard. The one or more network interfaces 1012 may be configured to facilitate communication between end-user interfaces 205 and provider interfaces 207. In some embodiments, for example, the communications between end-user interface(s) 205 and provider interface(s) 207 could correspond to communication between a set of callers and a set of receivers, respectively.

The communication management system 1000 may include one or more of engines and/or modules that may be stored in the one or more memories and may include one or more software applications, executable with the processors, for receiving and processing requests. The one or more engines and/or other modules may be configured to perform any of the steps of methods described in the present disclosure. The one or more of engines may include routing engine(s) 1014 that may include logic to implement and/or otherwise facilitate any communication handling features discussed herein. By way of example without limitation, the routing engine 1014 may be configured to one or more of decode, route, and/or redirect calls to/from end users and providers. The communication management system 1000 may make real-time decisions in order to improve end-user experience and provider service. Accordingly, certain embodiments may provide real-time, dynamic routing as a generalized solution.

The routing engine 1014 may include a communication handling engine 1015, in some embodiments. In some embodiments, the routing engine 1014 may be separate from the communication handling engine 1015. The communication handling engine 1015 may include one or more telephony switches in communication with one or more datastores and the network interface 1012. The communication handling engine 1015 may be configured to receive inbound calls from callers, determine caller data pertinent to the calls, perform information analysis of the caller data, gather additional caller data as needed, and match callers to providers. Accordingly, the communication handling engine 1015 may be or include a call handling engine. In some embodiments, the communication handling engine 1015 may include a message handling engine to provide message handling features disclosed herein.

In some embodiments, when a call transmission responsive to a content object is received, the call may be connected to the transceiving equipment 1012. The transceiving equipment 1012 may be connected to the router/switching equipment 1014, which selectively connects incoming connections from client devices 205 and outgoing connections to provider device 207. In some embodiments, the transceiving equipment 1012 and the router/switching equipment 1014 are circuit-switched, including Private Branch Exchange (PBX) and a dedicated voice network. In some embodiments, the transceiving equipment 1012 and the router/switching equipment 1014 may be packet-switched, including Internet Protocol (IP) based PBX, a data communication network and a gateway.

In some embodiments, the data stores 268 may include category information repository 1016, association information repository 1018, and lead profile information repository 252-2, which may retain any suitable information to facilitate certain features disclosed herein. Types of information are disclosed further herein with further description of embodiments using features directed to categories, associations of callers and/or providers with certain categories, associations of callers with providers, providers profiles, lead profiles and qualifications, and/or the like.

A reverse proxy may be used to monitor calls. Phone numbers may be tracked both on the end-user side and on the provider side. This stored information may be used to route calls from particular callers to particular providers. Phone numbers may be tracked to differentiate good, bad, proximate, and unknown leads. The database 252-2 storing lead information allows for a more complete picture regarding the leads that may be used for routing end users. Where a particular provider is not available, the end user could be routed to others. A reference number for the callee may be used to track how the end user interacts with the callee. In some embodiments, a general vanity number (e.g., 1-800-dentist) may be used, for example. In some embodiments, an icon on a webpage, mobile app, etc. may be provided for user selection to be connected to a first available provider that may satisfy the user's request. Accordingly, with certain embodiments, an end user may not see a number. With some embodiments, a user may provide his phone number, and then the communication management system 1000, functioning as a routing system, may call that number to join the call with a provider.

The communication management system 1000 may include a harvesting engine 1030 configured to harvest information about callers, caller areas, and/or providers. In some embodiments, the harvesting engine 1030 may correspond to the harvesting engine 256(*b*); in some embodiments, the harvesting engine 1030 may be separate and distinct from the harvesting engine 256(*b*). The harvesting engine 1030 may be configured to perform any one or combination of features directed to facilitating data capture regarding callers, caller areas, and/or providers disclosed herein. For example, the harvesting engine 1030 may gather and process caller data, which may be specific to a particular caller and/or may be generally related to the caller. In some embodiments, the harvesting engine 1030 may determine additional information needed based on caller data for a given caller. The harvesting engine 1030 may gather the additional information. The caller data may be gathered from one or more data stores of the system, such as a lead profile information repository 252-2, and/or one or more data sources via the data acquisition interface(s) 111, which could be third-party data sources.

Particular callers may be qualified based at least in part on the caller data gathered. The caller data may be analyzed with respect to individual callers. The communication management system 1000 may be configured to classify callers into one or more categories based at least in part on caller data.

The call management system 1006 may include a lead identification system 1032 configured to facilitate any one or combination of the lead identification features disclosed herein. For example, responsive to an incoming transmission from a client device 205 corresponding to a lead, the lead identification system 1032 may determine lead information. As indicated further herein with reference to FIG. 10, the lead information may include call information 1104, internal information 1108, area information 1112, specific information 1114, and/or the like. The lead information may be determined from one or more internal data repositories 268 and/or one or more data sources via interfaces 111. In some embodiments, the lead identification system 1032 may include one or more session module controllers that may identify a caller and a callee (e.g., based on the ring-to number), and may initiate SIP processes so then a free switch may determine to which number to route the call.

The communication management system 1000 may include a matching engine 1034 configured to perform any one or combination of features directed to matching or otherwise correlating information about callers, caller areas, and/or providers disclosed herein. For example, in some embodiments, the matching engine 1034 may receive caller information, identify attributes of the caller based at least in part on lead profile information, and match the caller to one or more categories from a category information repository 1016. As another example, in some embodiments, the matching engine 1034 could match a caller to one or more providers based at least in part on correlating categories from the category information repository 1016.

The communication management system 1000 may include a classification engine 1036 configured to perform any one or combination of features directed to classifying or otherwise categorizing callers, caller areas, providers, and/or provider service areas disclosed herein. In some embodiments, the matching engine 1034 may include the classification engine 1036; in other embodiments, the two engines may be separate but work in conjunction with one another.

The communication handling engine 1015 and/or the lead management system 1008 may include a monitoring and tracking system 1038 configured to monitor any suitable aspects pertaining to callers and/or providers. For example, the monitoring system 1038 may monitor calls routed to particular providers in order to assess the success of routing the lead. In some embodiments, the monitoring system 1038 may be configured to identify whether a caller is successfully connected with a provider, whether the call is missed, whether the call is dropped/disconnected/receives a busy tone, whether the call is routed to voicemail, and/or whether a voicemail is left. In some embodiments, the monitoring system 1038 may include Automatic Number Identification (ANI) logic and Caller Name Service (CNS) to identify callers.

In some embodiments, the monitoring system 1038 may be configured to track the length of calls or other calls aspects. In some embodiments, the monitoring system 1038 may be configured to record and/or transcribe calls. In some embodiments, the monitoring system 1038 may be configured to identify and capture keywords from calls. The monitoring system 1038 may be configured to facilitate other tracking features disclosed herein, such as keeping track of confirmed leads, potential leads, confirmed spammers, and conditionally confirmed spammers. The database 252 may include and/or serve as a filtering database to store information on indicia of spam callers, such as originating numbers of spam callers. The monitoring system 1038 may build the dataset of the filtering database 252 based at least in part on who is actually calling one or more providers. The monitoring system 1038 could monitor which numbers fail to overcome the filter processes to start filtering the spam calls automatically for multiple providers serviced by the platform. In some embodiments, the monitoring system 1038 could monitor which numbers successfully overcome the filter processes to build the data set of the filtering database 252 with information on confirmed leads/non-spammers.

In some embodiments, the filtering database 252 may include known numbers and/or codes of confirmed leads. For example, online leads may be tracked with unique codes, communication references, extensions, etc. that are given to the phone system. End users that use a client application of the platform (say, a mobile app) may be identified by phone number and/or other identification reference.

In some embodiments, the monitoring system 1038 may build the filtering database 252 with information about known spammers from data sources via the data acquisition interface(s) 111 (e.g., a website sourcing a list of telemarketer numbers). Many spammers make calls that show up as coming from certain numbers, and oftentimes the numbers are not valid. In some embodiments, the tracking system 1038 may build the filtering database 252 with information about invalid numbers as some spammers spoof numbers with invalid numbers (e.g., invalid area codes, incomplete numbers, unavailable numbers such as 1011, etc.) to allow for number validation. Accordingly, certain embodiments may provide for filtering based on detection of invalid numbers as an indication of spoofing.

The management system 1000 may operate as a lead routing system configured to facilitate any one or combination of the lead routing features disclosed herein. The lead management system 1008 may be configured to facilitate lead management features exposed to providers disclosed herein. A lead qualification system 1040, which could include the matching engine 1034 and/or classification engine 1036 in some embodiments, may qualify the lead. For example, the lead qualification system 1040 may score the lead based at least in part on categories 1016. The lead qualification system 1040 may include logic to implement and/or otherwise facilitate any lead qualification features discussed herein. By way of example without limitation, the lead qualification system 1040 may be configured to one or more of qualify a lead according to a graduated lead scale, categorize a lead according to a category scheme, score a lead according to a lead scoring scheme, and/or the like. Various aspects of lead qualification according to various embodiments are discussed further herein. In certain embodiments, the lead qualification system 1040 may be configured to compile keyword criteria, for example, in an ontology. The lead qualification system 1040 could include an ontology reasoner or semantic reasoning module to make logical inferences from a set of facts in the ontology. Accordingly, the lead qualification system 1040 may correspond to a reasoning engine configured to effect one or more lead qualification features. A pattern-based reasoner could be employed to use various statistical techniques in analyzing call/lead data in order to make inferences based on the analysis. A transitive reasoner could be employed to infer relationships from a set of relationships related to call/lead data.

The management system 1008 may include a lead nurturing system 1042 configured to facilitate any one or combination of the post-routing lead handling features disclosed herein. For example, the lead management system 1008 may route information between a provider mobile app and the backend system for tracking of lead nurturing. In various embodiments, the lead management system 1008 may allow the system to be exposed through a provider mobile app, an online provider portal, and/or through alternate messaging means such as email. In some embodiments, the lead nurturing system 1042 may generate a nurturing scheme based at least in part on the scoring and/or category information and may transmit notifications to provider devices 207 regarding the scheme and acquire input from the providers regarding the scheme options. The lead management system 1008 may manage the nurturing communication with the lead with content objects being transmitted via email, calls, push notifications, etc. to the lead device(s) 205 and/or the like.

Figure 11:
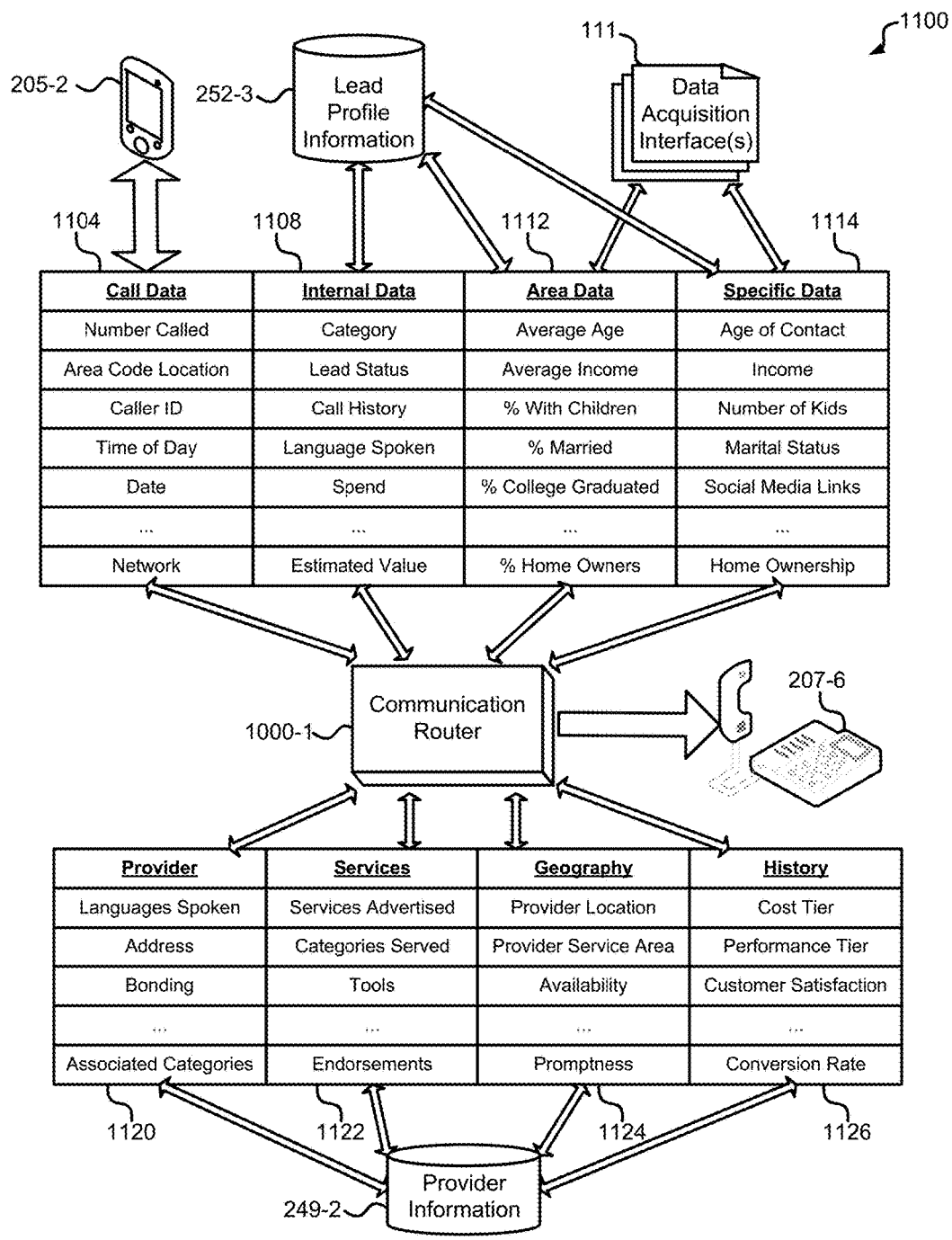
FIG. 11 illustrates certain aspects of lead routing data flow, in accordance with certain embodiments of the present disclosure.

FIG. 11 illustrates certain aspects of routing data flow 1100, in accordance with certain embodiments of the present disclosure. The communication management system 900 operating as a router 900-1 may be configured to gather caller data, which may be specific to a particular caller and/or may be generally related to the caller (e.g., information about the caller's location). The caller data may be gathered from one or more data repositories of the system, such as an end-user profile information repository 252, and/or one or more data sources via data acquisition interface(s) 111, which could be third-party data sources. Any suitable categories may be employed for characterization of callers.

The caller data may include call data 1104, such as information about any one or combination of the number called, area code, caller ID, time of day, data, network, and/or the like. The communication router 1000-1 may identify characteristics corresponding to calls based at least in part on a set of call data 1104. The communication router 1000-1 may determine additional information based at least in part on the call data 1104. The additional set of information may include additional characteristics corresponding to the calls. In some embodiments, the additional information may include additional information, such as call data 1104 and/or another type of data such as data 1108, 1112, 1114, and/or the like.

The caller data may include internal information 1108, such as information about any one or combination of characterizations, qualifications, attributes, etc. determined by the management system 900. By way of example, such information may concern any one or combination of categories, lead status, call history, language, spend, value, and/or the like associated with the caller. Though the example depicts certain other types of information as separate from the internal information 1108, the internal information 1108 may include other types of information.

The caller data may include caller-specific data 1114, such as demographic data. The caller data gathering may further include capturing other end-user-specific data. Any suitable end-user specific information could be harvested in order to allow for characterization of a particular caller. Using the phone number, the area from where call originates, population density, average income, age information for the area, history of calls from area to particular categories in particular time periods, and/or the like, the communication router 1000-1 may determine people in the area are facing a particular problem, have a particular need, preference, interest, and/or inclination. Thus, the caller data may include area data 1112 pertinent to the location identified for the caller.

The communication router 900-1 may identify a need of a caller and then match the caller to a provider. In various embodiments, any one or combination of various types of provider information may be used to match a caller with a provider. The provider information may include provider information 1120. The provider information may include services information 1122. The provider information may include geographical information 1124. The provider information may include history information 1126. Accordingly, data may be captured on the provider side to provide bases for routing calls.

Certain embodiments may provide for identifying the status of a lead after the lead has been routed to a provider. Certain embodiments may add end-user relation management features post lead routing. After the caller goes with a service provider, the lead status may be updated accordingly (to "kill the lead" or graduate it to needing more follow-up or nurturing). Where there has not been follow-up, others may be notified or reminders may be set. If several providers were contacted with the lead, once one provider captures the lead, any others working on the lead would be notified.

Thus, certain embodiments may provide for efficient methods of tracking and nurturing prospective and existing end users on behalf of a provider. Certain embodiments provide strong tools to track end users for provider that interface via phone calls. The system may provide visibility on how a lead is propagating through multiple provider queues. With leads being routed to multiple providers according to some embodiments, there is a need to have an ability to determine when a lead has been converted so that the lead may be taken out of the equation, i.e., so that lead may be taken out of the queue for other providers. Certain embodiments provide valuable aid to providers by identifying their leads, helping the providers know who their leads are, track the leads, and convert the leads.

Figure 12:
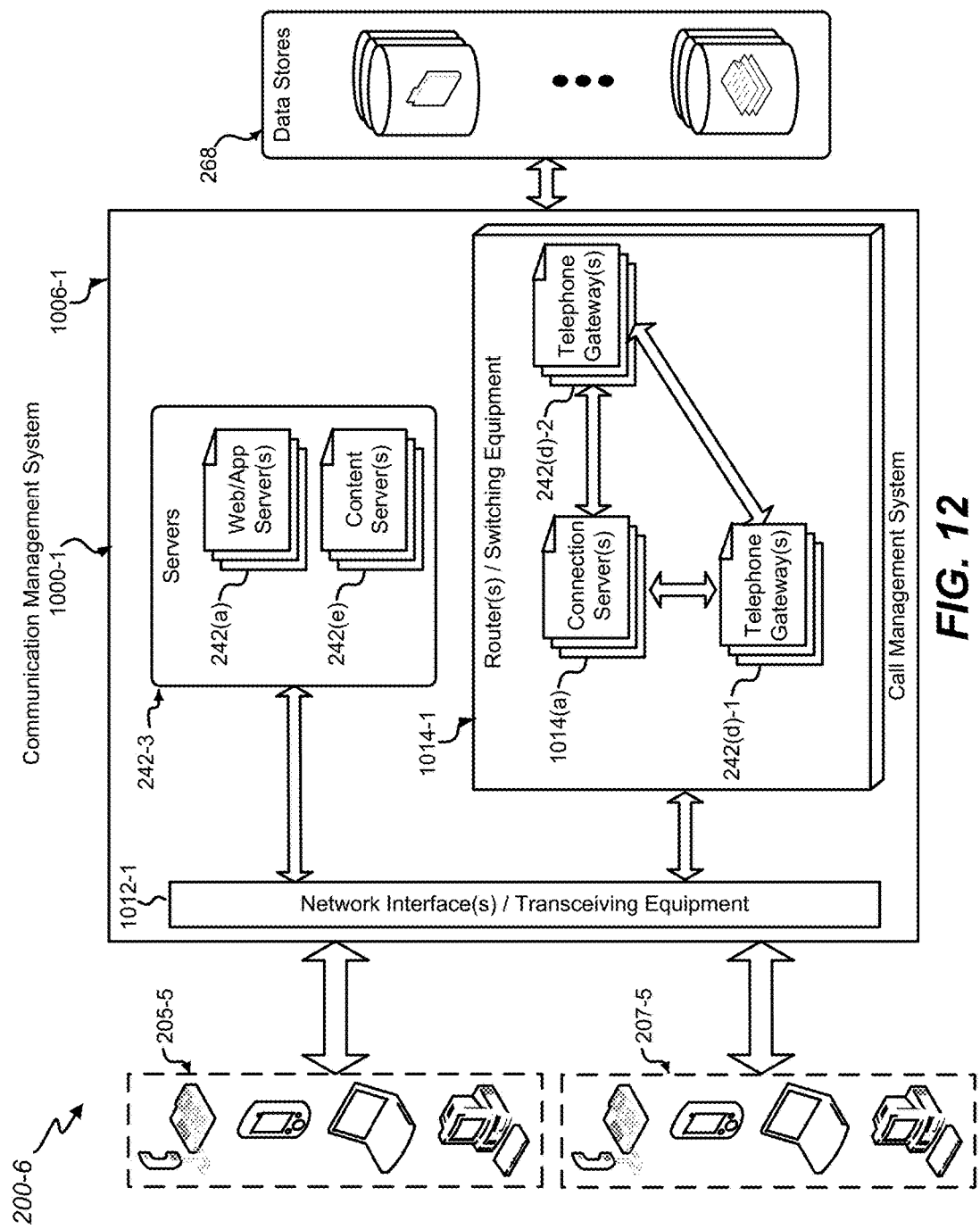
FIG. 12 shows a diagram of aspects of the communication management system, in accordance with certain embodiments of the present disclosure.

FIG. 12 shows a diagram of aspects of the communication management system 900-1, in accordance with certain embodiments of the present disclosure. In some embodiments, a client device 205 may receive content objects, particularized to certain providers and generated by the application services system 241 based on provider information from the data store 268, via a web and/or application server 242(a) of the application services system 241. In various embodiments, the client device 205 may query the web/app server 242(a) directly or indirectly. In some embodiments, the web server 242(a) or a content server 242(e) may selectively serve content objects obtained from different sources/databases. In some embodiments, one or more of the servers 242 may be included in the communication management system 900, as illustrated in the example depicted. In some embodiments, one or more of the servers 242 may be included in other portions of the infrastructure 102.

In some embodiments, the router(s) and/or switching equipment 1014 may include one or more connection servers 1014(a). In some embodiments, the connection server(s) 1014(a) may be configured to implement one or more engines and/or otherwise facilitate one or more features of the router router(s)/switching equipment 1014.

In some embodiments, when the client device 205 requests the connection server 1014(a) to provide a connection to the provider device 207 via the reference of the connection server 1014(a), the connection server 1014(a) determines whether the client device 205 is within the service area of the provider device 207 before connecting the client device 205 to the provider device 207. In some embodiments, if the location of the client device 205 is outside the service area of the provider, the connection server 1014(a) provides alternative providers who provide services similar to those of the provider and whose service areas cover the location of the client device 205.

In some embodiments, the content objects served by the web/app server 242(a) contain telephonic references, which may be used by the client device 205 to call the connection server 1014(a). The connection server 1014(a) identifies the telephone contact information of the corresponding providers based on the telephonic references called by the client device 205 and then further connects the call to the provider(s).

In some embodiments, the client device 205 may be softphone-implemented at least in part via software, such as an instant messenger, a VoIP client application running on a computer, an applet embedded in a web page, a handheld device, a cellular phone, a cordless phone, a Bluetooth phone, a WiFi phone, etc. In some embodiments, the client device 205 may be implemented via hardwire circuitry, such Application-Specific Integrated Circuit (ASIC); in some embodiments, the client device 205) may be implemented partially via special purpose hardwire circuitry and partially via software, such as Application-Specific Integrated Circuit (ASIC) or Field-Programmable Gate Array (FPGA) with software/firmware; and in some embodiments, the client device 205 may be implemented using a set of general purpose hardwire components that are under the control of software. In some embodiments, the client device 205 is a Plain Old Telephone Set (POTS).

In some embodiments, the telephonic references in the content objects that are retrieved directly or indirectly via the web/app server 242(a) are SIP URIs which contain encrypted information, such as the telephone number of the provider, an identifier of the caller, information about the query (in embodiments where the content is responsive to a query, which may be end user generated or system-generated, such as intermediary system generated), the service geographic area of the provider corresponding to the particularized content object, and/or the position of the content object in the sorted list of the search result, etc. The connection server 1014(a) decrypts the SIP URI that is used to call the connection server 1014(a) to further connect the call to the provider.

In some embodiments, the query of the client device 205 is submitted to the web/app server 242(a) with an identifier of the caller, such as a telephone number of the caller, a user identifier of a telephonic apparatus, an internet address of the telephonic apparatus, a softphone user ID, a number unique to the softphone user ID among different softphone user IDs, etc. In some embodiments, the identifier of the caller is encrypted in the SIP URI. When the client device 205 calls the connection server 1014(a) using the SIP URI, the connection server 1014(a) may determine whether the call is made from the same apparatus or caller that submitted the query. For example, the connection server 1014(a) may prevent other telephonic apparatuses or callers that did not perform the query from calling the provider device 207 using the result of the query. The connection provider may also use the identifier information of the caller to determine whether a query is generated by a machine in an automated fashion and to determine whether the query and/or the calls from the caller should be blocked. For example, after a provider complains about a call from a caller, the connection server may block the queries and/or calls from the caller (e.g., for a period of time) to that provider, a subset of providers or all providers.

In some embodiments, the client device 205 may be capable of making a VoIP call but using a protocol different from the protocol used by the gateway (e.g., SIP); and a gateway 242(d)-1 is used to interface the client device 205 and the connection server 1014(a). In some embodiments, the client device 205 may be capable of making a SIP call using the SIP URI to reach the connection server 1014(a) without the gateway 242(d)-1. In some embodiments, the client device 205 makes a call over a PSTN; and a telecommunication carrier bridges the call from the PSTN to the connection provider on a data network.

In some embodiments, the provider device 207 uses a telephone that is connected on the PSTN; and the connection server 1014(a) uses the gateway 242(d)-2 to reach provider device 207. In some embodiments, the gateway 242(d)-2 is operated by a telecommunication carrier of the connection provider. In some embodiments, the connection server 1014 (a) uses the gateways (242(d)-1 and 242(d)-2) to set up the call and direct the gateways (242(d)-1 and 242(d)-2) to make a direct media connection that does not go through the connection server 1014(a) to provide the telephone connection between the client device 205 and the provider device 207. In some embodiments, the provider device 207 uses a telephone that is connected on a data network; and the gateway 242(d)-2 is used to bridge the protocol used by the telephone of the provider device 207 and the protocol used by the connection server 1014(a). In some embodiments, the telephone of the provider device 207 and the connection server 1014(a) may use the same protocol; and the connection server 1014(a) may call the telephone of the provider device 207 directly (e.g., via SIP) without a gateway 242 (d)-2.

In some embodiments, the client device 205(a) obtains content objects particularized to providers directly or indirectly via a web server 242(a) of the connection provider. Content obtained from other sources may also be selectively presented with the content objects obtained from the data store 268 in response to a search request from the caller, in some embodiments.

In some embodiments, the connection server 1014(a) encrypts information related to the search, the provider's telephonic contact information, the caller's identification information, the ID of the server 242, etc. in the SIP URI which may be called by the client device 205 to reach the connection server 1014(a). Alternatively, other types of telephonic references may be used, such as telephone numbers with extensions, VoIP user identifiers, etc. In some embodiments, the telephonic reference may be a link to the web server 242(a), which may be visited to cause the connection server 1014(a) to callback the client device 205 at the client device 205.

The information may be encrypted/encoded in the telephonic references provided in the content objects. In some embodiments, the telephonic references may be used in a database to look up the associated information such as the provider's telephonic contact information, the keywords used in the search, caller's identification information, the ID of the distributor of the client device 205(a) or a ID of a partner whose web server caused the user terminal to visit the web server 242(a) for the search, promotions/electronic coupons provided with the content object, etc.

In some embodiments, the SIP URI provided in the content object via the web server 242(a) may be used to call the connection server 1014(a) for a telephone connection to the provider device 207. The SIP URI contains information in an encrypted string (e.g., sip:<Encrypted String>@sip.yp.com), such as information about the provider, information about the user who performed the query, information about the intermediary system that distributes the hardware and/or the software of the telephone apparatus and/or who distributes the content objects to the client device 205, and information about the query, such as a search term used in the query, the timestamp of the search, the order number of the content object in the result set, an identification of the content object, promotions/electronic coupons provided with the content object, etc. The telephone apparatus 205(b) is connected to the connection server 1014(a) at the SIP "end point," before being further connected by the connection server 1014(a) to the provider device 207.

In some embodiments, the client device 205(a) is configured to have the capability to store or bookmark the SIP URI provided in the content object. For example, the SIP URI may be stored in association with the content object or provider in a contact book maintained on the client device 205(a). In some embodiments, a gateway 242(d) is used to bridge the call from the telephone apparatus 205(b) that is in one VoIP domain (e.g., based on a proprietary protocol for VoIP) and the connection server 1014(a) that is in another VoIP domain (e.g., based on an open standard VoIP protocol).

In some embodiments, the SIP URI is provided as a communication reference which may be used directly by the telephone apparatus 205(b) to call the gateway 242(d) which further connects the call to the connection server 1014(a). For example, when the telephone apparatus is configured generally to initiate calls to traditional telephone numbers or VoIP user IDs (e.g., via a proprietary protocol), the telephone apparatus may be configured to treat the SIP URI as a VoIP user ID associated with the gateway. In some embodiments, a portion of the SIP URI (e.g., the encrypted string) may be used as VoIP user ID to reach the gateway.

In some embodiments, the web server 242(a) provides the particularized content object with a traditional telephone number instead of the SIP URI. The traditional telephone number may or may not include an extension. The telephone apparatus 205(b) uses the gateway 242(d) to access PSTN and reach the connection server 1014(a) via a telecommunication carrier which bridges the call from the PSTN to the connection server 1014(a). The telecommunication carrier may provide the call to the connection server 1014(a) via a SIP call. In some embodiments, the extension is to be dialed by the telephonic apparatus after the telephonic connection between the client device 205 and the connection server 1014(a) is established. In another embodiment, the extension is to be dialed by the gateway 242(d). In a further embodiment, the gateway 242(d) places a SIP call to the connection server 1014(a), bypassing the telecommunication carrier of the connection provider; and the extension is used to construct the SIP URI of the call (or be included in the SIP INVITE message sent from the gateway 242(d)).

In some embodiments, the gateway 242(d) used to bridge the call to the PSTN may prevent the connection server 1014(a) from identifying the caller via ANI service. To provide information to identify the caller, the gateway 242(d) may be further configured to provide the information about the caller to the connection server 1014(a) via call ID information or via extension. In some embodiments, the gateway 242(d) may bypass the telecommunication carrier and connect the call to the connection provider via a SIP call and provide the information about the caller in the FROM header of the SIP INVITE message.

In some embodiments, when a gateway 242(d) is used to bridge one protocol used by the telephone apparatus (e.g., a proprietary protocol) and another protocol used by the connection server (e.g., SIP), the telephone network is configured to route the call to the gateway that is nearest to the connection server to reduce the distance over the Internet between the gateway and the connection server. The client device 205 may use other gateways to reach other callees.

In some embodiments, the client device 205(a) is configured to identify a geographic area to the connection server 1014(a) when submitting a query; and the connection provider may return particularized content objects/listings based on the geographic area and/or selectively block the calls from end users who are outside the service area of the providers. In some embodiments, the client device 205 is configured to identify a geographic area to the connection server 1014(a) when initiating a call to the connection server 1014(a); and the connection server 1014(a) may selectively block the calls from end users who are outside the service area of the providers or provide opportunities to connect to alternative providers (e.g., through prompts provided and input received via a human operator or an Interactive Voice Response (IVR) system).

According to embodiments, a flexible and personalized recommendation service can be provided. The recommendation service may be implanted using any suitable technologies such as the Java Search Infrastructure (JSI). The recommendation service can be configured to provide recommendations on providers (e.g., business listings) and/or categories of providers that might be appealing to a user based on information gathered about the user including gender, demographics, the user's interests or preferences, the user's prior interactions with aspects of the interaction infrastructure discussed herein (e.g. user's prior searches, selections, clicks, etc.), user's geographic location, other context information such time of day, day of week, month, year, seasonality information (e.g., season of the year, major yearly events or holidays such as Valentine's Day, Thanksgiving Day, Christmas, etc.), and the like.

In some embodiments, the data utilized by the recommendation service can include multiple datasets gathered by the interaction infrastructure. Some of such data may be explicitly requested from users (e.g. via surveys, questionnaires, forms). Some of the data may be manually curated. Some of the data can be derived through data-mining, statistical analysis, machine learning, or other automated or semi-automated processes performed on other user data such as a user's search behavior, click-through behavior, and the like.

In some embodiments, some of these datasets can be provided as input to one or more recommendation modules implementing the recommendation service. Each of the recommendation modules can be configured to provide a set of candid providers (e.g., business listings) and/or candidate categories. The candidate providers and/or candidate categories from various recommendation modules can be blended or otherwise combined to generate the final providers and/or final categories to be recommended to users. A category refers to a type of a provider based on the service and/or product offered by that the provider. For instance, a category for Macy's may be "Department Store. In some embodiments, each of the recommendation modules corresponds to a particular factor or consideration in generating the recommendation. As such, each recommendation module may be configured to provide recommended providers and/or categories based primarily on a particular dataset or a particular combination of datasets. For example, a geo recommendation module may be configured to generate recommendations based primarily on the geographic location of a user. To this end, the geo recommendation module may utilize user specific data (e.g., user searches, clicks) and/or non-user specific data (e.g., provider popularity or rating, transaction volume ranking) that has been correlated with or associated with geographic locations. A seasonality module may be configured to generate recommendations based primarily on the current seasonality. The seasonality recommendation module may utilize user-specific and/or non-user specific data that has been correlated with or associated with seasonality information. For instance, the seasonality data may indicate that certain providers or categories of providers are more popular among users (e.g., more frequently searched and/or clicked) or generate higher transaction volumes than other providers or categories of providers during certain time of the year. As an example, jewelers, florists, and sit-down restaurants may be more popular near or on Valentine's Day and Mother's Day. As another example, electronics and toys may be more popular near or on Christmas and New Year.

The candidate recommendations (e.g., candidate recommendations and/or candidate categories) provided by the recommendation modules may be weighted, blended, combined, sorted, or otherwise processed by one or more blending modules implementing the recommendation service so as to provide final recommendations (e.g., final providers and/or final categories). Typically, the final recommendations are a subset of the candidate recommendations that are determined to be more likely to be useful, relevant, or valuable to users.

In some embodiments, specific weights (also referred to as distributions) are associated with candidate providers and/or candidate categories generated by each module depending on a weight associated with a data source of that module and/or user behaviors, if any, associated with that module. For example, user data may be given more weight than non-user data. As an example, a module which utilizes prior searches conducted by a user to suggest candidate providers and/or candidate categories may be determined to carry a higher weight than a module which simply utilizes the user's location to recommend popular providers close to that location. Weight associated with a module can be established through a combination of different factors or heuristics. One such heuristic is how tightly the data used to generate recommendations is tied to a specific user for whom the recommendations are being suggested.

In some embodiments, blending modules comprise a category blending module and a provider blending module. The category blending module can be configured to receive candidate providers and candidate categories (if any) from recommendation modules, aggregate all the candidate categories including those associated with the candidate providers, assigns weights to the candidate categories, sort the candidate categories by their weight and/or some other metrics, and provide the top N categories as the final recommended categories (where N may be a predetermined positive integer). The provider blending module can be configured to receive candidate providers from recommendation modules. Additionally, the provider blending module may be configured to receive the sorted final categories provided by the category blending module discussed above. The provider blending module can be configured to assign weights to the candidate providers based at least in part on the modules that provided the candidate providers and/or on the weights of the categories to which candidate providers belong. Based at least in part on the weights associated with the candidate providers, the provider blending module may be configured to provide sort the candidate providers, and provide the top M providers as the final recommended providers (where M may be a predetermined positive integer).

In some embodiments, the recommended providers are diversified across different categories based on a category diversity ranking. This category diversity ranking ensures that recommended providers come from a diverse set of categories. For example, when recommending providers in a location and/or at a specific date and time, it may be undesirable to have only recommendations of restaurants. To do so, a diversity score is assigned to each provider and/or category by taking into consideration the density of the providers for the particular category in the particular geographic location, the distance of user's location or the city where the user is looking A higher density may lead to a lower diversity score.

In various embodiments, the recommendation service can be easily customized to provide recommendations to a wide variety of applications such as the home page, search results, and the like. Various aspects of the recommendation service can be customized for a particular application, including the datasets used to generate recommendations, the combination of recommendation modules used to provide candidate recommendations, the parameters (e.g., in configuration files) used to control operations of the recommendation modules and/or blending modules (e.g., the weight associated with categories, providers, modules, and/or data sources), the objects being recommended (e.g., coupons or deals offered by providers rather than the providers themselves), and the like.

Figure 13:
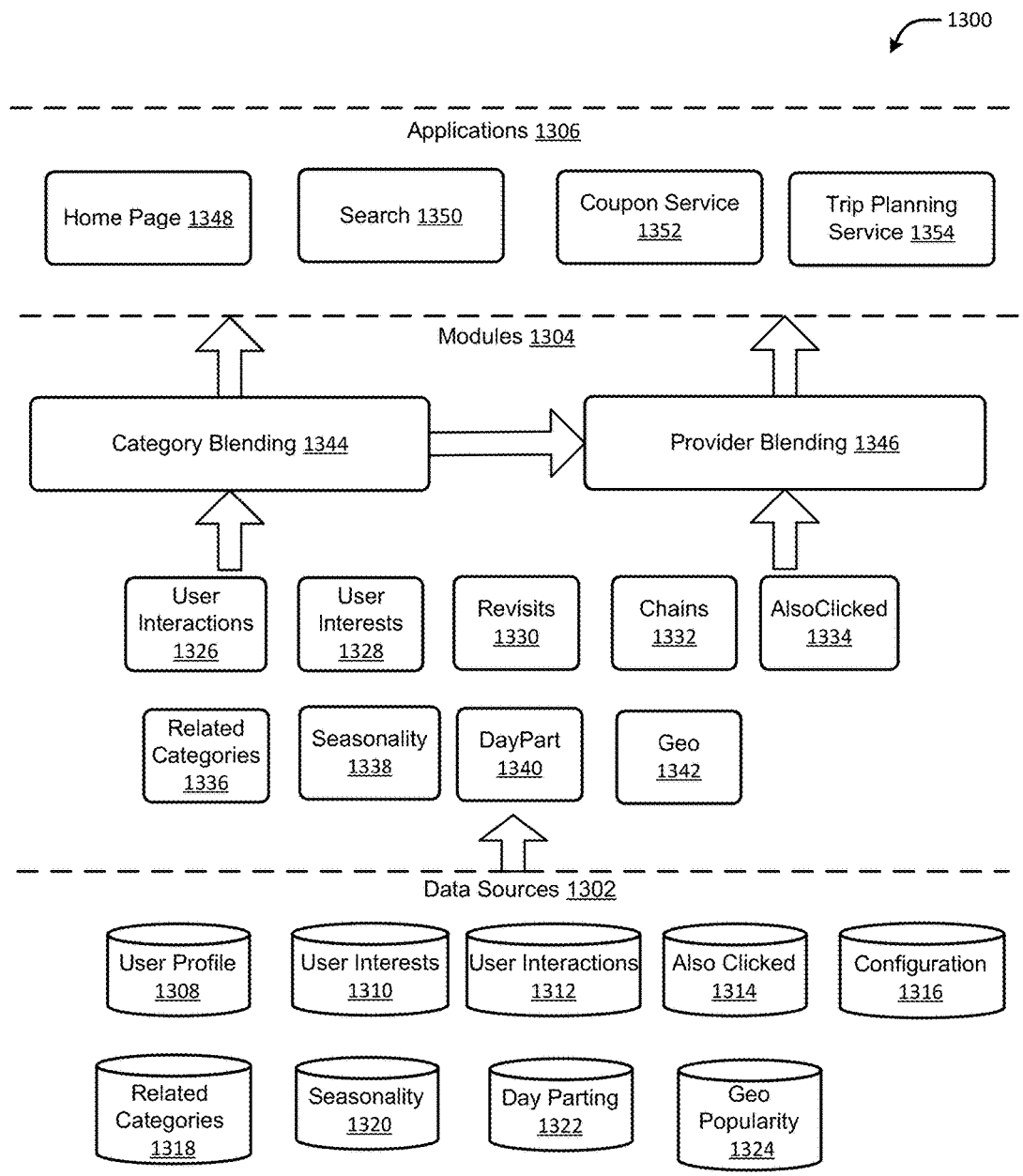
FIG. 13 illustrates example components used to implement a recommendation service, in accordance with embodiments.

FIG. 13 illustrates example components used to implement a recommendation service 1300, in accordance with embodiments. The recommendation service 1300 can be configured to obtain data from one or more data sources 1302. The data can be processed by one or more modules 1304 to generate recommendations. The recommendations may be used by one or more applications 1306. In various embodiments, components of the recommendation service 1300 can be implemented by various components of the previous figures. For instance, the data sources 1302 can be implemented by one or more data store 268 and/or data management servers 267 of FIG. 4, data management servers 267-2 of FIG. 6, master data management layer 265, data stores 268 of FIG. 12, or the like. The modules 1304 can be implemented by one or more application services servers 242 of FIG. 4, servers 242-2 of FIG. 7, information orchestration engine(s) 256 of FIG. 8 (e.g., the recommendation engine 256(d)), or the like. The applications 1306 can be implemented by the application/device layer 210 of FIG. 2, the applications 206, 206-1, 208, 208-1 of FIG. 4, the information orchestration engine(s) 256 of FIG. 8, and/or other services provided by the information orchestration system discussed herein.

The data sources 1302 can include one or more databases, data stores, tables, or datasets that are used by the recommendation service to make recommendations. The data sources 1302 can include user profile data 1308, user interests data 1310, user interactions data 1312, also clicked data 1314, configuration data 1316, related categories data 1318, seasonality data 1320, day parting data 1322, geo popularity data 1324, and the like. Some or all of the data in the data sources can be curated.

The user profile data 1308 can include user's demographic information such as the user's age, sex, occupation, address, and the like. The user profile data 1308 can also include the user's social network information including friends, contacts, and/or posts on one or more social networks.

The user interests data 1310 can include data that maps or associates a user's preferences to categories and/or providers that may be relevant to the user. The following table shows some example mappings between preference codes and categories. For example, the categories "Automobile Accessories" and "Automobile Inspection Stations and Services" can be associated with a car owner (as indicated by the "car_owner" preference code); whereas the categories "Home Design and Planning," "Handyman Services," "Home Improvements," "General Contractors," and "Homeowners Insurance" can be associated with a home owner (as indicated by the "home_owner" preference code). The priority can be used for blending distribution, where a higher priority can be given higher weight during the blending process.

| Preference Code | Category Text | Category Code | Priority | Preference Text |
|---|---|---|---|---|
| car_owner | Automobile Accessories | 8004429 | 100 | Car Owners |
| car_owner | Automobile Inspection Stations and Services | 8000229 | 90 | Car Owners |
| home_owner | Home Design and Planning | 8009128 | 30 | Home Owners |
| home_owner | Handyman Services | 8001542 | 90 | Home Owners |
| home_owner | Home Improvements | 8001590 | 80 | Home Owners |
| home_owner | General Contractors | 8009592 | 80 | Home Owners |
| home_owner | Homeowners Insurance | 8006000 | 70 | Home Owners |

The user interactions data 1312 can include data tracking a user's interactions with the interaction infrastructure discussed herein. For example, the data may comprise user searches, preferences, calls, clicks, views, or other user interface behavioral data, listings added to the users collections (e.g., as favorites), and the like. In some embodiments, the user interaction data can be used to blend, boost, and/or filter data received from other data sources. Some example user interaction data that can be collected is provided below:

Searches:
{"query": "Angelos 7 Barber Shop","geo": "Los Angeles, Calif.","ts": 1443039771509,"geotype": "city","geoinfo": {"city": "Los Angeles","state": "CA"},"heading_codes": { }}, {"query": "Downtown Dental Los Angeles","geo": "Los Angeles, Calif.","ts": 1443039673192,"geotype": "city","geoinfo": {"city": "Los Angeles","state": "CA"}, "heading_codes": { }}, Calls:
{"ypid": 5990750,"ts": 1440185095900,"phone": "8182410687","heading_codes": {"Primary": "8004199"}, "original_ypid": 5990750}, {"ypid": 14794,"ts": 1438283560574,"phone": "8182426608","heading≤codes": {"Primary": "8004279"},"original_ypid": 14794}, Listings (Providers):
{"ypid": 503863960,"ts": 1436906570107,"tagids": ["food-"],"heading_codes": {"Primary": "8004199"},"original_ypid": 503863960}, {"ypid": 457970326,"ts": 1436900219610,"chainId": "102808","chainid": "102808", "tagids": ["food"],"heading_codes": {"Primary": "8004199"},"original_ypid": 457970326}, Clicks:
{"ts": 1443040127604,"ypid": 480291347,"heading_codes": {"Primary": "8005337"},"original_ypid": 480291347}, {"ts": 1442870375265,"ypid": 507695775, "heading_codes": {"Primary": "8009474"},"original_ypid": 507695775}, Preferences:
{"interests": ["car_owner","out_on_town","travel"],"extended": {"seenMybookFirstAddNotice": "1"}}

The also clicked data 1314 can include data on other providers or categories that are viewed by (e.g., by clicking on a link thereof) a user within a predetermined period (e.g., in the same user session) after viewing a specific provider or category of providers. Such data can be extracted from click logs that track such information. Some exemplary also clicked data is provided in the table below. For example, the table below indicates that after viewing a provider with a listing Id of 1000022 and a category code of 8015990, users also viewed providers with listing Ids 723224, 7252174, 1401028, and 462747688.

| Listing Id | Category Code | Clicked Listings |
|---|---|---|
| 10000022 | 8015990 | 723224\|7252174\|1401028\|462747688= |
| 10000055 | 8009412 | 460600618\|480210727\|469353320= |
| 10000073 | 8008820 | 1508431\|473834511\|11304368 |
| 10000154 | 8001795 | 11516569\|30799903\|6409571 |

The related categories data 1318 can include data mapping categories to other complementary or otherwise related categories. For example, related categories for restaurants may include movie theatres, bars, clubs, and the like, because these may be deemed complementary to restaurants. In other words, people may be more likely to consume products and/or services provided by the providers in the related categories along with or complementary to the products and/or services provided by a provider in the given category.

In some embodiments, the related categories for the same category may vary depending on the geolocation and the characteristics of the population near or at the geolocation (e.g., demographics such as average age, occupation, income). For instance, in Los Angeles, where the city is more sprawled out, related categories for bars may include taxi services. In New York, where the city is less sprawled out, related categories for bars may not include taxi services. As another example, in a college town where there are a lot of young people, related categories for restaurants may include bars and clubs. In a city with older people, related categories for restaurants may include coffee shops and bowling alleys.

In some implementations, the data for related categories can be derived based on data from click logs that tracks the categories of providers that users click on or otherwise interact with within a predetermined period of time from the time (e.g., in the same user session) the users search for or receive search results for a given category of providers. In some implementations, the click logs can also be used to determine the weights associated with categories, providers, and the like during the blending process. Some exemplary related category data is provided below:

| HeadingCode1, Clicks | HeadingCode2, Clicks |
|---|---|
| 8003674, 341774 | 8015871, 365197 |
| 8003674, 341774 | 8009151, 336821 |
| 8001494, 525201 | 8003744, 295601 |
| 8001494, 525201 | 9100004, 274894 | level associated with other categories such as Supermarkets & Super Stores (e.g., 85), resulting in a higher likelihood that the Consumer Electronics category will rank higher in the overall blending and will be recommended to users during the New Year time period. The boost levels may be determined manually based on people's behaviors during the given time frame. Alternatively, the boost levels may be determined automatically or semi-automatically based on data mining, statistical analysis, or machine learning algorithms. The ramp up and ramp down periods can be used to prevent undue boost to categories and/or providers once the seasonality period is over. For example, as show in the example seasonality data for the New Year period below, Consumer Electronics providers are progressively given higher boost/weights leading up to Christmas. These listings lose their extra boost soon after New Year with the extra boost dropping to zero by the end of the ramp down period. In some embodiments, the boost level is increased during a ramp up period leading up to the seasonality period and decreased during a ramp down period after the seasonality period. In some embodiments, the increase during the ramp up period may be gradual and/or in small increments. The decrease during the ramp down period may be less gradual and/or in larger increments. In some other embodiments, the opposite may be true.

| Ramp up date | Event Date | Category Code | Category Text | Boost | Season | Event Date | Ramp down date |
|---|---|---|---|---|---|---|---|
| 27 Dec. 2014 | 31 Dec. 2014 | 8001140 | Consumer Electronics | 95 | New Year | 31 Dec. 2015 | 4 Jan. 2015 |
| 27 Dec. 2014 | 31 Dec. 2014 | 8000853 | Computer & Equipment Dealers | 90 | New Year | 31 Dec. 2015 | 4 Jan. 2015 |
| 27 Dec. 2014 | 31 Dec. 2014 | 8001323 | Health Clubs | 100 | New Year | 31 Dec. 2015 | 4 Jan. 2015 |
| 27 Dec. 2014 | 31 Dec. 2014 | 8000217 | New Car Dealers | 95 | New Year | 31 Dec. 2015 | 4 Jan. 2015 |
| 27 Dec. 2014 | 31 Dec. 2014 | 8000218 | Used Car Dealers | 90 | New Year | 31 Dec. 2015 | 4 Jan. 2015 |
| 27 Dec. 2014 | 31 Dec. 2014 | 8009160 | Jewelers | 100 | New Year | 31 Dec. 2015 | 4 Jan. 2015 |
| 27 Dec. 2014 | 31 Dec. 2014 | 8009684 | Diamonds | 100 | New Year | 31 Dec. 2015 | 4 Jan. 2015 |
| 27 Dec. 2014 | 31 Dec. 2014 | 8000807 | Clothing Stores | 100 | New Year | 31 Dec. 2015 | 4 Jan. 2015 |
| 27 Dec. 2014 | 31 Dec. 2014 | 8008971 | Department Stores | 95 | New Year | 31 Dec. 2015 | 4 Jan. 2015 |
| 27 Dec. 2014 | 31 Dec. 2014 | 8015871 | Supermarkets & Super Stores | 85 | New Year | 31 Dec. 2015 | 4 Jan. 2015 |
| 27 Dec. 2014 | 31 Dec. 2014 | 8009413 | Shopping Centers & Malls | 95 | New Year | 31 Dec. 2015 | 4 Jan. 2015 |
| 27 Dec. 2014 | 31 Dec. 2014 | 8004763 | Grocery Stores | 85 | New Year | 31 Dec. 2015 | 4 Jan. 2015 |

The seasonality data 1320 can include data that maps providers and/or categories of providers to a given time period of a year (seasonality period). Each mapping between a seasonality period and a category/provider can also include a boost level, a ramp up period, and a ramp down period. The boost level may be used to indicate how much the importance or relevancy of the given category/provider is to be increased or boosted relative to other categories/providers for the same time period. For example, for the New Year time period (between December 27 and December 31), the boost level associated with the category of Consumer Electronics can be very high (e.g., 95) compared with the boost The day parting data 1322 can include data that maps providers and/or categories of providers to a day parting period (e.g., time of a day and/or a day of a week). A day may be divided into a plurality of shifts, each shift encompassing a given period of time in the day. For example, a first shift may be between 12 am and 4 am in the morning. The second shift may be between 4 am and 8 am in the morning, and so on. For each day of the week and a time of day (the day parting period), the day parting data may indicate the categories or providers associated with the day parting period and priorities (weights) associated those categories or providers. Different weight distributions may be associated with different day parting period. For example, as illustrated in the example day parting data below, during the first shift on Mondays, donut shops may have a higher priority (e.g., 100) than taxis (e.g., 90). During the second shift on Mondays, coffee shops may have a higher priority (e.g., 100) than motels (e.g., 70). The priorities may be used by the corresponding modules (e.g., day parting module and/or blending modules) to rank the recommendations.

| Day of the week | Shift of the day | Category Code | Category Text | Priority |
|---|---|---|---|---|
| Mon | 1 | 8009475 | Taxis | 90 |
| Mon | 1 | 8004239 | Fast Food Restaurants | 100 |
| Mon | 1 | 8007678 | Donut Shops | 100 |
| Mon | 2 | 8009252 | Motels | 70 |
| Mon | 2 | 8004239 | Fast Food Restaurants | 90 |
| Mon | 2 | 8004238 | Coffee & Espresso Restaurants | 100 |
| Mon | 2 | 8004206 | Coffee Shops | 100 |
| Mon | 2 | 8005337 | Breakfast, Brunch & Lunch Restaurants | 80 |
| Mon | 2 | 8008819 | Bakeries | 100 |

The geo popularity data 1324 can indicate the popularity of certain providers or categories of providers at or near certain geographic locations. The popularity data may be derived based on user interaction data such as the total number of user clicks or views for a given category or provider within a predetermined period of time. For example, in the sample data below, in the directory code 300273 (an indication of geographic location), the category 8009371 has 1457 clicks. The categories or providers with higher clicks may be deemed more popular that categories or providers with less clicks. In some embodiments, the popularity of the categories or providers can be used by the blending algorithm to rank the categories or providers. For instance, in an implementation, the more popular a category has (e.g., with a higher number of clicks), the more providers are selected from the category to form the recommendations.

| DirectoryCode | HeadingCode | Clicks | Site | Ds |
|---|---|---|---|---|
| 300273 | 8009371 | 1457 | webyp | 20130804 |
| 300273 | 8004998 | 1156 | webyp | 20130804 |
| 300273 | 8008832 | 1151 | webyp | 20130804 |
| 300273 | 8000218 | 1113 | webyp | 20130804 |
| 300273 | 8008970 | 1066 | webyp | 20130804 |

The configuration data 1316 can include data that control the behaviors and operations of at least some of the modules 1304 and/or applications 1306. The configuration data 1316 may be stored in configuration files, database tables, or any suitable storage medium. The configuration data may dictate the distribution (weight) parameters, the ranking, filters, boosting types, labels, and the like. Changing or customization of the modules and/or applications can be achieved by changing the configuration data.

Three sets of example configuration data are provided below, for an also clicked module, a "You May Like" module or application, and a "Top Recommendations" module or application, respectively.

AlsoClicked
  AlsoClickedRecommendation.baseScore: 15000
  AlsoClickedRecommendation.decayPerDay: 0.8
  AlsoClickedRecommendation.distribution: 36
  AlsoClickedRecommendation.type: listing
  AlsoClickedRecommendation.recommendationLimit: 10
  AlsoClickedRecommendation.listingLimit: 30
  AlsoClickedRecommendation.maxListingsToBlend: 10
  AlsoClickedRecommendation.minListingsToBlend: 5
  AlsoClickedRecommendation.label: "Also Clicked"
  AlsoClickedRecommendation.reason: "Since you showed interest in % s"
  AlsoClickedRecommendation.sortOrder:
  AlsoClickedRecommendation.filters:
  AlsoClickedRecommendation.boostedScoreType: LatestActivity
  AlsoClickedRecommendation.enabled: True
YouMayLike:
  YouMayLike.baseScore: 1000
  YouMayLike.decayPerDay: 1
  YouMayLike.distribution: −1
  YouMayLike.type: listing
  YouMayLike.recommendationLimit: 10
  YouMayLike.listingLimit: 30
  YouMayLike.maxListingsToBlend: 0
  YouMayLike.minListingsToBlend: 0
  YouMayLike.label: "You Might Like"
  YouMayLike.reason: "You Might Like"
  YouMayLike.sortOrder:
  YouMayLike.filters:
  YouMayLike.boostedScoreType: LatestActivity
  YouMayLike.sd: "newandtrending"
TopRecommendations
  topRecommendations.recommendationLimit: 10
  topRecommendations.listingLimit: 30
  topRecommendations.label: "You Might Like"
  topRecommendations.reason: "You Might Like"
  topRecommendations.enabled: True
  topRecommendations.sd: "newandtrending"

The baseScore parameter may indicate a base or default score (e.g., 15000) for the corresponding module and/or for a recommended item (e.g., provider or category) made by the module. The base score of a recommendation may be updated based on other parameters (e.g., the decayPerDay parameter, the boostedScoreType parameter) to obtain a final score. The final score may be compared with the scores of recommended items by other modules during a ranking process to determine the final recommendations.

The decayPerDay parameter may indicate a factor or rate (e.g., 0.8) at which the score and/or weight, or importance of the corresponding module and/or the recommendations made by the module decay. A decay factor of 1 indicates that the score or weight of the module never decays. The decayPerDay parameter of less than 1 can be used to give higher weight to more recent data. By adjusting the decayPerDay parameter, modules can be configured to decay at different rates that correspond to actual observed patterns.

The distribution parameter may indicate a weight associated with the corresponding module. The distribution for the module can be used to derive a distribution or weight associated with a category or provider that is recommended by the corresponding module. A distribution of −1 may indicate that the configuration data is for an application and not for a module. The type parameter may indicate the type of data that is received as input and/or provided as output by the corresponding module.

The recommendationLimit parameter may indicate an upper limit on the number of recommended items (e.g., the number of recommended providers or categories) that can be generated by the corresponding module. The listingLimit may indicate an upper limit on the number of items that can be displayed for the module or application.

The maxListingsToBlend parameter may indicate the maximum number of recommended items that can be selected, from the total recommendations made by the corresponding module, to be blended into the final recommendations. The maxListingsToBlend can be equal to or less than the recommendationLimit.

The minListingsToBlend parameter may indicate the minimum number of recommended items that must be selected, from the total recommendations made by the corresponding module, to be blended into the final recommendations. In various embodiments, the minListingsToBlend and the maxListingsToBlend can be used to ensure that the recommended items come from a diverse set of modules and/or datasets.

Figure 14:
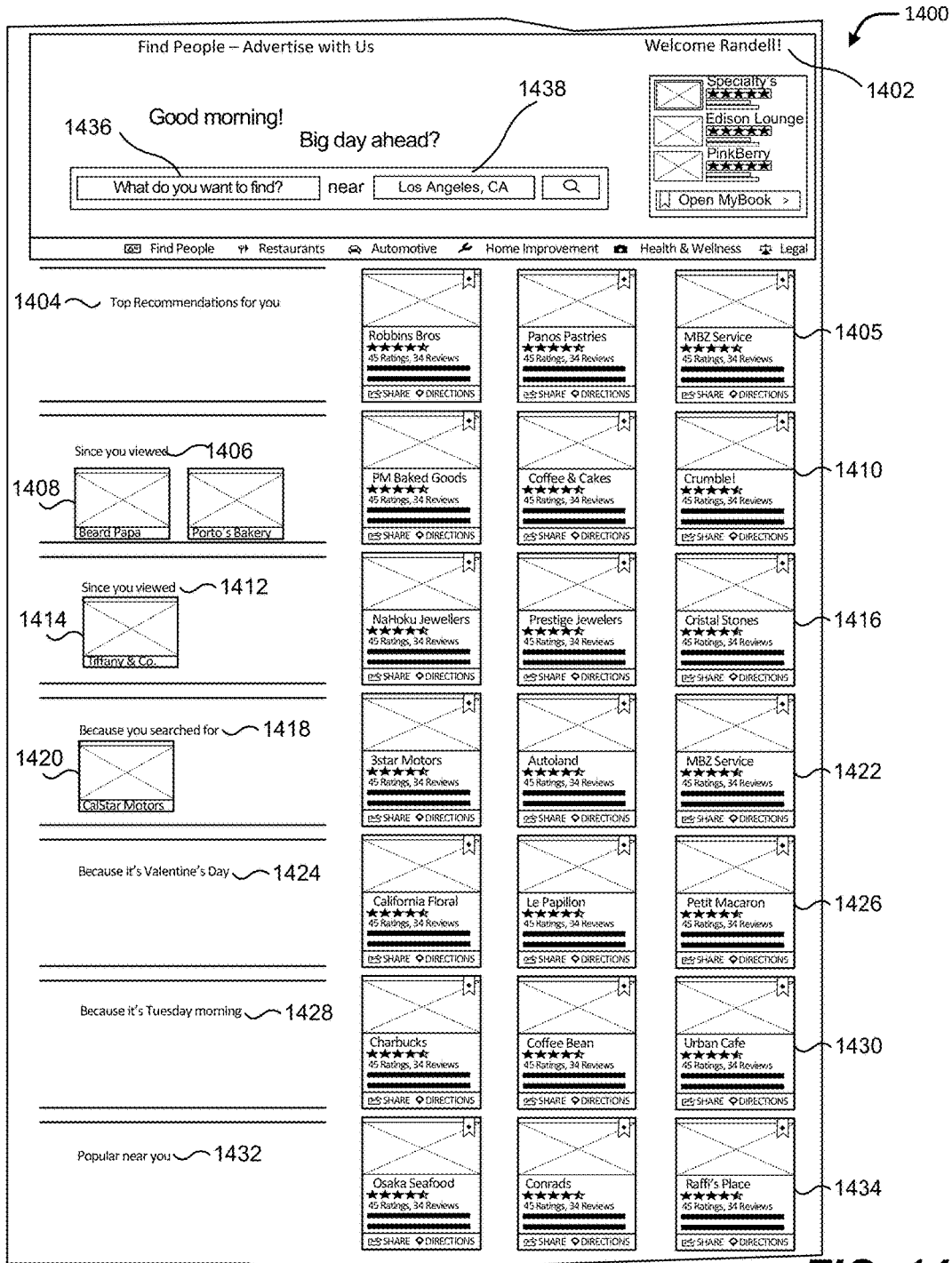
FIG. 14 illustrates an example user interface for providing recommendations, in accordance with embodiments.

The label parameter indicates a label text associated with the corresponding module. The reason parameter indicates a reason text associated with the corresponding module, such as shown in FIG. 14.

The sortOrder parameter may indicate an order by which the items recommended by the corresponding module are sorted. The filters parameter may indicate one or more conditions used to filter the recommended items. Sample sortOrder parameters are provided below for a seasonality module (SeasonalityCatRecommendation), day parting module (DayPartCatRecommendation), and geo module (GeoCatRecommendation), respectively. For example, the recommendations generated by a seasonality module (SeasonalityCatRecommendation) is ordered by the cat_dist attribute in ascending order, by the citypage attribute in descending order, and by the fb_popularity (popularity on a social network) in descending order.

SeasonalityCatRecommendation.sortOrder:
cat_dist asc
citypage desc
fb_popularity desc
DayPartCatRecommendation.sortOrder:
cat_dist asc
citypage desc
fb_popularity desc
GeoCatRecommendation.sortOrder:
cat_dist asc
citypage desc
fb_popularity desc The boostedScoreType may indicate an attribute based on which the score may be boosted. For instance, the boosting of the score may be based on the LatestActivity attribute of the data obtained by the corresponding module. The more recent the latest activity is, the higher the score may be boosted.

The enabled parameter may indicate whether the corresponding module is enabled. In some embodiments, different modules may be enabled and/or disabled depending on the customization of the recommendation service. For example, a first combination of recommendation modules may be enabled in order to customize the recommendation service for a first application. A second different combination of recommendation modules may be enabled in order to customize the recommendation service for a second different application.

The modules 1304 can include one or more modules configured to generate recommendations based on the data provided by the data sources 1302. In some embodiments, the modules 1304 can be implemented by one or more recommendation servers. The modules 1304 can include one or more recommendation modules and blending modules.

The recommendation modules can be configured to generate candidate recommendations based on the data provided by various data sources. In some embodiments, each of the recommendation modules corresponds to a particular factor or consideration in generating the recommendation. As such, each recommendation module may be configured to provide recommended providers and/or categories based primarily on a particular dataset or a particular combination of datasets. The recommendation modules can include user interactions module 1326, user interests module 1328, revisits module 1330, chains module 1332, also clicked module 1334, related categories module 1336, seasonality module 1338, day parting module 1340, and geo module 1342.

Some of the modules can be configured to make recommendations based on user information as gathered by the interaction infrastructure (e.g., by the orchestration platform discussed above). Such user information can include users' previously-saved favorite providers and/or categories, searches conducted by users, provider details pages (or more information pages) that users have viewed, providers that the users have contacted (e.g., called or messaged) via the interaction infrastructure, and the like. Accordingly, if the user is new to the interaction infrastructure and have no or little user information, these modules may make very few or no recommendations. In some embodiments, such modules that depend on user information can include the user interactions module 1326, the user interests module 1328, the revisits module 1330, the chains module 1332, the also clicked module 1334, and the related categories module 1336.

Additionally or alternatively, some of the modules may be configured to make recommendations based on non-user information. Such non-user information may be readily available without using user related data. Such non-user information can include date, time of day, the geolocation information, and the like. In some embodiments, such modules that depend on the non-user information can include the seasonality module 1338, the day parting module 1340, and the geo module 1342. In some embodiments, some of the modules (e.g., the blending modules 1344, 1346 or a recommendation module) may be configured to make recommendations based on both the user information and the non-user information.

The user interactions module 1326 can be configured to make recommendations based at least in part on the user profile data (e.g., the user profile data 1308). For example, the user interactions module 1426 can be configured to recommend providers that have been previously stored by the users as favorites. Recommendation can occur if the user is in the same geographic location.

The user interests module 1328 can be configured to recommend providers based at least in part on user interests data (e.g., user interest data 1310). For example, the recommendations may be such that they fall in the categories chosen by a user in his or her My Interests page (e.g., Service, Health, home, Auto, Food, Shopping etc.).

The revisits module 1330 can be configured to recommend providers based at least in part on user interactions data (e.g., user interactions data 1312). For example, the recommended providers may include those with which the users have already interacted using the interaction infrastructure. These may include providers that the users have searched for, viewed more detailed information of (e.g., by clicking on a link to a more information page), providers the users have called via the interactive infrastructure, and the like. Recommendations can be made if the user is in the same geographic locations as these recommended providers.

The chains module 1332 can be configured to recommend providers that belong to the same chains as the providers that the user has expressed interests in, for example, based at least in part on user profile data, user interests data, user interactions data, seasonality data, day parting data, geo data, and the like.

The also clicked module 1334 can be configured to recommend providers based at least in part on also clicked data (e.g., also clicked data 1314). For example, the recommended providers can include those that were viewed or clicked by a user while the user was searching for a different listings. For example, when a user searched for auto repair, he might also clicked on car dealers. The also clicked data can be mined and used to make recommendations based at least in part on the user's profile data, user interests data, and/or user interactions data. In an implementation, the also clicked module 1334 can be configured to recommend providers based at least in part on what the user has searched for, which providers' details the user has viewed, providers in the user's Favorites page, and the like. Example pseudo code for the also clicked module 1334 is provided below:
1. Get 30 recommendations.
2. Determine the number of recommendations to blend. If recommendation scores are greater than 100, get maximum of 10 listing. If the number of listings is less than 5, then backfill the recommendations with those having scores less than 100.
3. Find the providers matching the recommendations and sort on also clicked scores.
4. Filter out obscene listings The related categories module 1336 can be configured to recommend categories of providers based at least in part on the related categories data (e.g., related categories data 1318). Based on the related categories data, the related categories module 1336 can be configured to identify categories that are complementary or otherwise related to the category of providers the user is searching for. In some embodiments, the related categories may be limited to lifestyle categories. For example, restaurants and movies may be related to each other; restaurants and bowling alleys may be related to each other; and so on. The recommendations may be further based on user information such as user profile data, user interests data, user interactions data, also clicked data, and other data. Example pseudo code for the related categories module 1336 is provided below:
1. Get 30 recommendations.
2. Determine the number N of recommendations to blend using formula, $N=\log(C1)+\log(C2)+\log(C1')+\log(C2')\ldots$, where $C1, C2, C1', C2', \ldots$ are number of clicks in the last six months on these categories.
3. Select the top 2 categories in occurrence in searches, clicks, my listings, calls, and other user interactions data with threshold>=threshold (e.g., 25%), where $C1', C2', \ldots$ are the topmost complementary categories to $C1, C2, \ldots$, respectively.
5. Find the providers falling within the corresponding categories; sort and blend the providers by category diversity.

The seasonality module 1338 can be configured to recommend providers based at least in part on the seasonality data (e.g., seasonality data 1320). Data can be mined to determine popular providers during certain time of the year. In an implementation, the most popular providers in a particular geographic location may be collected for some or all weeks of a year, the weeks of the year, the weeks may be mapped to major holidays (e.g., US holidays) to identify top or most popular providers during the major holidays. The data may be further extrapolated to identify the categories of the providers. The identified categories may be curated to represent the categories that are more relevant to the users. The seasonality module 1338 can be configured to recommend providers that belong to these curated categories depending the time of the year when the recommendations are made. Example pseudo code for the seasonality module 1338 is provided below:
1. Get 30 recommendations.
2. Determine the number of recommendations to blend using formula, $\log(c1)+\log(c2)+\log(c3)$, where $C1,C2,C3$ are number of clicks in one day for these categories.
3. Select top three categories for the day with score>THRESHOLD, C1, C2, C3
4. Find the providers within the corresponding categories; sort and blend the providers by category diversity.

The day parting module 1340 can be configured to make recommendations based at least in part on day parting data (e.g., day parting data 1322). Data can be mined to identify the popular providers during different times of a day. Such data can be collected for some or all days of a year. Categories for the top providers can be curated to identify popular categories during certain time of a day. For example, it may be determined that breakfast restaurants are popular early in the morning, taxis are popular late in the evening, and so on. The recommendations can be selected from providers belonging to these curated categories. Example pseudo code for the day parting module 1340 is provided below:
1. Get 30 recommendations.
2. Determine the number of recommendations to blend using formula, $\log(c1)+\log(c2)+\log(c3)$, where $C1,C2,C3$ are number of clicks in that 4 hour block on these categories.
3. Selection Top 3 categories for that 4 hour block with score>THRESHOLD, of C1, C2, C3
4. Find the businesses with the corresponding categories; sort and blend the providers by category diversity.

The geo module 1342 can be configured to make recommendations based at least in part on geo popularity data (e.g., geo popularity data 1324). Geo data can be mined from user activities on the interaction infrastructure such as on a website or mobile application. The top providers at or near a geo location can be identified and grouped by their categories. The final categories can be curated to give weight to the lifestyle categories. The recommendations can be selected from providers belonging to these curated categories. Example pseudo code for the geo module 1342 is provided below:
1. Get 30 recommendations.
2. Determine the number of recommendations to blend using formula, $\log(c1)+\log(c2)+\log(c3)$, where C1, C2, C3 are number of clicks in that geo in last 6 months on these categories.
3. Selection Top 3 categories for that geo for 6 months with Clicks>10000, C1, C2, C3.
4. Find the businesses with the corresponding categories; sort and blend the providers by category diversity.

The blending modules can be configured to generate final recommendations based on the candidate recommendations generated by the recommendation modules discussed above. The blending modules can include category blending module 1344 and provider blending module 1346.

In some embodiments, the recommendation modules discussed above can be configured to provide input to and/or receive output from each other. For instance, the results from the other recommendation modules may be used by the related categories module 1336 to determine relationships between categories of providers. The results from the related categories module can be used by the other modules to filter or to expand their recommended providers. As another example, the ranking of providers by popularity at a certain geographic location as provided by the geo module 1342 can be used to affect the ranking of providers in other modules.

The category blending module 1344 can be configured to recommend categories based on the candidate recommendations generated by the recommendation modules discussed above. To this end, the category blending module 1344 can be configured to gather the candidate categories recommended by the recommendation modules. Where candidate recommendations involve candidate providers, the categories associated with the candidate providers can be identified. Where the candidate recommendations involve candidate categories (e.g., as recommended by the related categories module 1336), the candidate categories can be used directly. In some cases, the candidate categories may be filtered, removed, or otherwise processed before being assigned weights. The candidate categories may be assigned different weights (also referred to as distributions) based at least in part on the weights associated with the modules and/or data sources from which the candidate categories were determined. The weights of the candidate categories can be further adjusted based on other considerations. The weighted candidate categories may then be ranked according to their respective weights and/or some other factors. From the ranked list of candidate categories, a predetermined number (e.g., 30) of top categories may be recommended by the category blending module 1344. As discussed above, aspects of the category blending module 1344 can be controlled by configuration data (e.g., configuration data 1316). For example, the configuration data for the category blending module 1344 may dictate the recommendation modules and/or data sources from which the candidate recommendations should be received from, the weighting algorithm for assigning weights to the candidate categories, the criteria for ranking the candidate categories, the maximum and/or minimum number of categories to recommend, and the like.

The provider blending module 1346 can be configured to recommend providers based on the candidate recommendations generated by the recommendation modules and/or the categories recommended by the category blending module 1344. Similar to the category blending module 1344, the provider blending module 1346 may be configured to assign weights to the candidate providers received from various recommendation modules based at least in part on the weights of the modules and/or data sources from which the candidate providers are received. Additionally or alternatively, the weights of the candidate providers can be determined based on a ranking of the corresponding categories associated with the candidate providers, as provided the category blending module 1346. The providers may ranked according to their weights and the a predetermined number (e.g., 30) of top providers may be recommended by the provider blending module 1346.

In some embodiments, the recommended providers are diversified across different categories. There may be a limit as to the maximum and/or minimum number of providers that can be picked from a particular category or from recommendations of a particular recommendation module (e.g., as dictated by configuration data). In some implementations, the diversification of the providers across different categories may be based on a category diversity ranking. To this end, a diversity score can be assigned to each provider and/or category by taking into consideration, for example, the density of the providers for the particular category in the particular geographic location, the distance of user's location or the city where the user is interested in. A higher density may lead to a lower diversity score. An example diversity ranking is provided below:
catscore(\"8009371    8004275    8004238    8004206    8002304\", \"Mount Pleasant\", \"TX\", \"\", product(geodist( ), 0.621371), \"city\") asc.

Example code for implementing the sort function is provided below:

```
public double doubleVal(int doc) {
    try {
        Document solrDocument = reader.reader( ).document(doc, fields);
        String hcs = solrDocument.get("heading_code_sv");
        String city =
            StringUtils.isNotEmpty(solrDocument.get("city")) ?
solrDocument.get("city").toLowerCase( ) : "";
        String state =
            StringUtils.isNotEmpty(solrDocument.get("state")) ?
solrDocument.get("state").toLowerCase( ) : "";
        String zip =
            StringUtils.isNotEmpty(solrDocument.get("zip")) ?
solrDocument.get("zip").toLowerCase( ) : "";
        givenDistance = Float.valueOf(distanceFV.strVal(doc));
        double retVal = 0;
        Integer listingsCount = 0; //Integer.MAX_VALUE;
        if(!StringUtils.isEmpty(hcs)) {
            List<String> listingHeadingCodes =
            Arrays.asList(hcs.split("\\|"));
            listingsCount = getListingsCount(givenHeadingCodes,
listingHeadingCodes);
            Float distance = this.givenDistance;
            if(overrideDistance(city, state, zip)) {
                distance = 0.0F;
            }
            retVal = Math.floor((Double.valueOf(listingsCount) *
Math.pow(distance, 2.0))/1000.0);
        }
        return retVal;
    } catch (Exception e) {
        return −1;
    }
}
```

Figure 15:
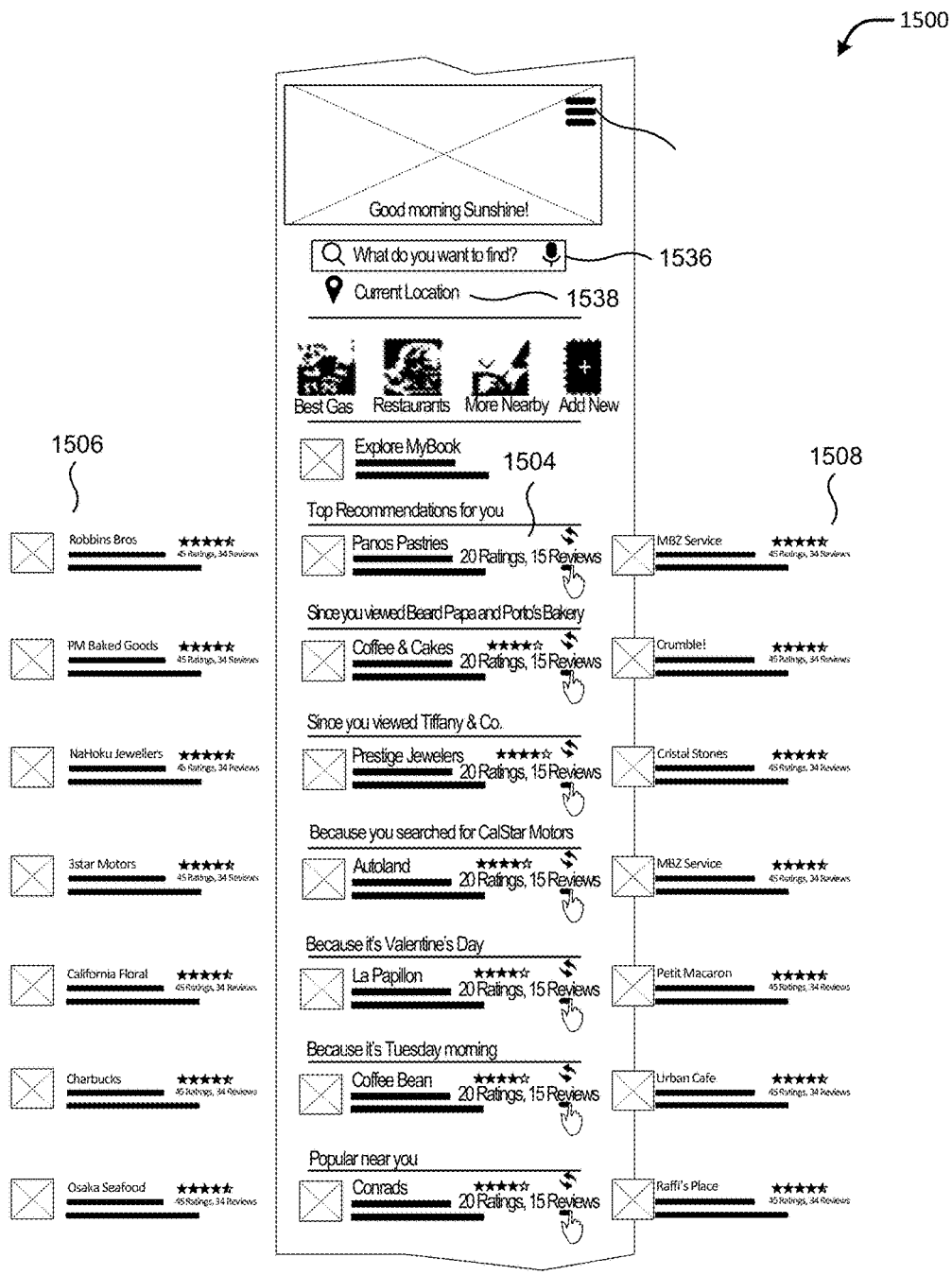
FIG. 15 illustrates another example user interface for providing recommendations, in accordance with embodiments.

The output of any of the modules 1304 (e.g., the category blending module 1344, the provider blending module 1346, or any of the recommendation modules) can be provided to and used by other applications. For instance, a coupon service 1352 can be configured to receive recommended providers (e.g., from the provider blending module 1346) and recommend coupons from some or all of the recommended providers in conjunction with other considerations such as geographic location. For instance, among the recommended providers, only those near or at a particular geographic location (e.g., a user's current location) may be selected, and coupons from only those selected providers may be retrieved and presented to the user. The coupons may be ordered by their respective distance to the location. In some implementations, the coupon service 1352 may be provided as an extension of the recommendation service and not as a separate service. FIGS. 14-15 provide example user interfaces that display the recommendations from these modules.

In some other examples, the categories as provided by the category blending module 1344 and/or the providers as recommended by the provider blending module 1346 can be used to display recommended categories and/or recommended providers for a home page 1348, for displaying search results by a search engine 1350 or for displaying recommended destinations by a trip planning service 1354.

In various embodiments, the recommendation service may be customized for various applications by changing the datasets used to generate recommendations, the combination of recommendation modules used to provide candidate recommendations, the parameters (e.g., in configuration files) used to control operations of the recommendation modules and/or blending modules (e.g., the weight associated with categories, providers, modules, and/or data sources), the objects being recommended (e.g., coupons or deals offered by providers rather than the providers themselves), and the like.

As an example, for a home page for a particular user, user specific data and/or modules (e.g., clicks, calls, searches) and generic data and/or modules (e.g., seasonality, dayparting, geo-popularity) may be used to make category and/or provider recommendations. In an example, the top three providers and top three coupons may be provided as recommendations on the home page.

As another example, for a city page not specific to a particular user, generic data and/or modules (e.g., daypart, geo and seasonality) may be used to recommend providers and/or categories. In some implementations, coupon data associated with the recommended providers and/or categories may also be provided on the city page.

As another example, for a search result page, the also clicked data and/or module and the related categories data and/or module can be used to recommend providers based on the search category or provider. Care may be taken so as not to recommend any providers that are already in the search results.

As another example, for a more information page (MIP) configured to show more details about a specific provider, recommendations may be made based on the category of the specific provider and the also clicked data for the provider. Care may be taken so as not to recommend the same provider on the more information page.

As another example, the recommendation service may be used by a trip planning application or service 1354 such as described in the U.S. Provisional Patent Application No. 62/096,162 filed Dec. 23, 2014, entitled "TRIP PLANNING FOR A TASK LIST," and the U.S. Provisional Patent Application No. 62/066,333 filed Oct. 20, 2014, entitled "TRIP PLANNING FOR A TASKS LIST," the entire disclosures of which are hereby incorporated by reference for all purposes. For example, the recommendation service may be used to suggest additional destinations for a trip planned for a task list based on a user's preferences and/or historical user data.

As discussed above, customization of the recommendation service may be achieved by changing the appropriate configuration data (e.g., in configuration files or databases). A configuration file may be defined and customized to dictate how different modules are combined and how the data is used to make recommendations. A snippet of the configuration file is shown below:

HomePage:
modules:
  Coupons
  AlsoClicked
  MyBook
  Revisit
  MyInterests
  Chains
  CompCat
  RelatedCategories
  Seasonality
  DayPart
  Geo
  User activities:
  searches
  calls
  clicks
  listings
  preferences
Override defaults for SERP endpoint below
SERP:
  modules:
  AlsoClicked
  CompCat
  topRecommendations.label: "Businesses you may also like"
  topRecommendations.reason: "Businesses you may also like"
Override defaults for MIP endpoint below
MIP:
  modules:
  AlsoClicked
  CompCat
  topRecommendations.label: "Businesses you may also like"
  topRecommendations.reason: "Businesses you may also like"
Citypage:
  modules:
  Geo
  Seasonality
  DayPart
  topRecommendations.label: "Top city page categories"
  topRecommendations.reason: "Top city page categories"
  SeasonalityCatRecommendation.label: "Seasonal"
  SeasonalityCatRecommendation.reason: "Best for this season"
  DayPartCatRecommendation.label: "DayPart"
  DayPartCatRecommendation.reason: "Popular during this time"
  SeasonalityCatRecommendation.sortOrder:
  cat_dist asc
  citypage desc
  fb_popularity desc
  DayPartCatRecommendation.sortOrder:
  cat_dist asc
  citypage desc
  fb_popularity desc
  GeoCatRecommendation.sortOrder:
  cat_dist asc
  citypage desc
  fb_popularity desc FIG. 14 illustrates an example user interface 1400 for providing recommendations, in accordance with embodiments. The user interface 1400 may be configured to be displayed by a web-based application such as a browser. The user interface 1400 can be configured to display customized recommendations for a particular user 1402 that is currently signed in. In some embodiments, the recommendations may be provided based on a search conducted by the user (e.g., in a Search Results page). The user may be allowed to enter a query for providers or categories of providers 1436 and/or a geographic location 1438 for the search. In some other embodiments, the recommendations may be provided to the user without the user conducting any search (e.g., in a Home page).

The recommendations can be grouped into several sections, each of which may be configured to display recommendations made by a particular module or a particular combination of modules of the recommendation service. As illustrated, the user interface 1400 can comprise a top recommendations section comprising a section label 1404 ("Top Recommendations for you") and a plurality of recommendations 1405. The top recommendations section can be configured to display results provided by the provider blending module 1346 of FIG. 13. In other words, the top recommendations section can be configured to display a weighted combination of recommendations from multiple sources. The number of top recommendations to be displayed can be configurable (e.g., by modifying a configuration file).

The user interface 1400 can comprise a viewed provider recommendations section comprising a section label 1406 ("Since you viewed"), one or more providers 1408 previously viewed by the user, and a plurality of recommendations 1410. The section label 1406 may provide a reason for displaying the recommendations 1410. The viewed provider recommendations section can be configured to display recommended providers based on providers that the users have previously expressed interest in. Thus, the recommendations may be based on any one of or any combination of the user's interests, favorite providers previously saved by the user, user's interactions with the interaction infrastructure (e.g., calls, clicks, views), and the like. The viewed provider recommendations section may be configured to display results from the user from any one of or any combination of the user interactions module 1326, the user interests module 1328, the revisits module 1330, the chains module 1332, the also clicked module 1334, and any other module based on user specific data.

The user interface 1400 can comprise a viewed category recommendations section comprising a section label 1412 ("Since you viewed"), one or more providers 1414 previously viewed by the user, and a plurality of recommendations 1416. The viewed category recommendations section can be configured to display recommended providers based on categories of providers that the users have previously expressed interest in. Thus, the recommendations may be based on any one of or any combination of recommended providers from user's interests, favorite providers previously saved by the user, user's interactions with the interaction infrastructure (e.g., calls, clicks, views), and the like, as correlated with or filtered by the related categories, previously-searched categories, and the like. The viewed category recommendations section may be configured to display results from the user from any one of or any combination of the user interactions module 1326, the user interests module 1328, the revisits module 1330, the chains module 1332, the also clicked module 1334, and any other module based on user specific data, as these results are correlated with or filtered by results from the related categories module 1336.

The user interface 1400 can comprise a search recommendations section comprising a section label 1418 ("Since you searched for"), one or more providers 1420 previously searched by the user, and a plurality of recommendations 1422. The search recommendations section can be configured to display recommended providers based on providers or categories of providers that the users have previously searched. Thus, the search recommendations section may be configured to display results from the user interactions module 1326 and the related categories module 1336.

The user interface 1400 can comprise a seasonality recommendations section comprising a section label 1424 ("Because it's Valentine's Day") and a plurality of recommendations 1426. The section label 1424 may indicate the current seasonality (e.g., time of the year) and the recommendations 1426 may be generated based on the current seasonality. In some implementations, the seasonality recommendations section may be configured to display results from the seasonality module 1338.

The user interface 1400 can comprise a day parting recommendations section comprising a section label 1428 ("Because it's Tuesday morning") and a plurality of recommendations 1430. The section label 1428 may indicate the current day parting information (e.g., day of week and/or time of day) and the recommendations 1430 may be generated based on the current day parting information. In some implementations, the day parting recommendations section may be configured to display results from the day parting module 1340.

The user interface 1400 can comprise a geo recommendations section comprising a section label 1432 ("Popular near you") and a plurality of recommendations 1434. The recommendations 1432 may be generated based on the current geographic location of the user. The location may be provided by the user (e.g., as part of the search 1438) or determined automatically using GPS or other suitable location service. In some implementations, the geo recommendations section may be configured to display results from the geo module 1342.

In various embodiments, aspects of the user interface 1400 can be controlled by configuration data associated with the user interface and/or the underlying modules. For instance, the configuration data may dictate the combination of sections or modules to be displayed, the number of recommendations to be displayed for each module, the label text or graphics to be displayed for each section, the type and amount of historical data to be displayed, if any, for each module, information to be displayed for each recommendation, and the like.

FIG. 15 illustrates another example user interface 1500 for providing recommendations, in accordance with embodiments. The user interface 1500 may be configured to be displayed by a mobile application on a mobile device. The mobile user interface 1500 may be configured to display substantially the same information as the non-mobile user interface 1400 discussed above, however, the layout of the content in the mobile user interface 1500 may be customized for displaying on mobile devices with smaller viewports, less resolution, and less computational resources compared with conventional desktop or laptop computers. In some implementations, the mobile user interface 1500 may be adapted to facilitate user interactions via a touchscreen.

For instance, the user interface 1500 can comprise sections of recommendations such as those discussed above in FIG. 14. However, a fewer number of recommendations per section may be displayed by default to conserve screen space and/or to improve rendering time. In some embodiments, only one of the recommendations may be displayed in a section by default, and more (e.g., three recommendations) are displayed only when a user hovers over or selects the section. The user may be able to view the available recommendations for the section by swiping left or right, with the currently selected recommendation 1504 being magnified or enlarged and the non-selected recommendations 1506, 1508 being reduced in size.

In some embodiments, the mobile user interface 1500 may be configured to display the current position 1538 of the mobile device by using the positioning capabilities of the mobile device.

Figure 16:
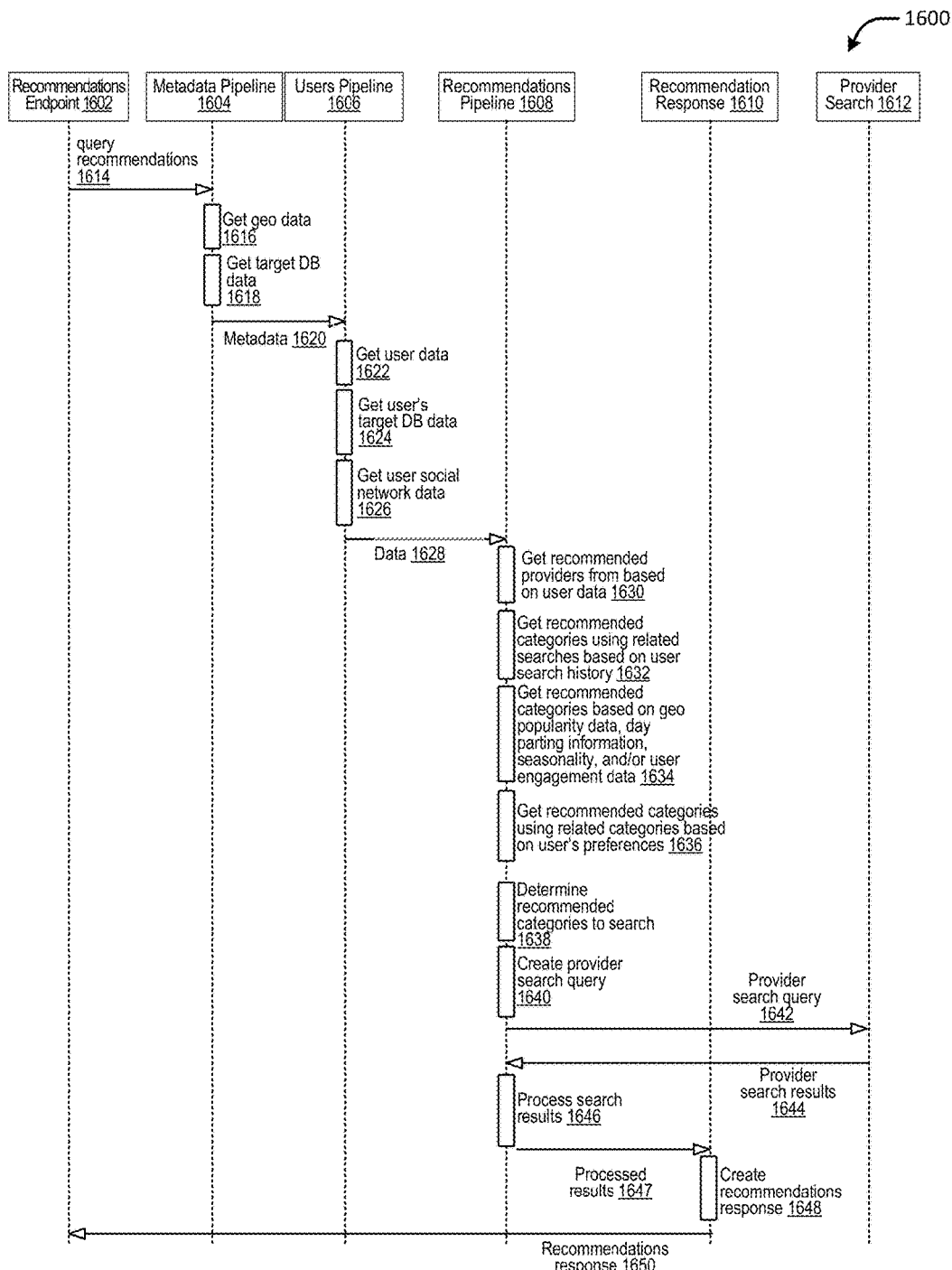
FIG. 16 illustrates an example series of communications between components of a recommendation service for providing recommendations, in accordance with embodiments.

FIG. 16 illustrates an example series of communications between components of a recommendation service 1600 for providing recommendations, in accordance with embodiments. In an implementation, the recommendation service 1600 is built on Java Search Infrastructure (JSI) framework. The framework can comprise one or more JSI pipeline layers which calls various data sources and modules to generate recommendations.

A recommendations endpoint 1602 such as an application using the recommendation service can initiate the generation of recommendations by sending a request for recommendations 1614 to a metadata pipeline 1604.

The metadata pipeline 1604 can be configured to obtain metadata based at least in part on the request for recommendations 1614. At step 1616, the metadata pipeline 1604 can be configured to obtain geo data such as city and/or state based on the request 1614. The geo data can be used to narrow the recommendations to those near or at a specific geographic location indicated by the geo data (e.g., the current location of a user). At step 1618, the metadata pipeline 1604 can be configured to obtain data about one or more target databases (DBs). The target DBs can include the data sources discussed in FIG. 13. The target DBs can be determined based at least in part on the identity of the recommendation endpoint 1602, the request for recommendations 1614, configuration data indicating the combination of data sources and/or modules that is necessary to make the recommendation, and the like. Data about the target DBs can include information on how to connect to those DBs. The metadata 1620 obtained by the metadata pipeline 1604, including the geo data obtained at step 1616, the target DB data obtained at step 1618, and any other suitable metadata, can be provided to the users pipeline 1606.

The users pipeline 1606 can be configured to obtain data based at least in part on the metadata provided by the metadata pipeline 1604. At step 1622, the user pipeline 1606 can be configured to obtain user data based at least in part on the metadata 1620. For instance, the metadata can include information a particular user that may be used to obtain user's interests data, user's profile data, user's interactions data collected by the interaction infrastructure, and the like. At step 1624, the user pipeline 1606 can be configured to obtain target DB data based at least in part on the metadata 1620. For example, the metadata 1620 can include connection information on how to connect to the target DBs. At step 1628, the user pipeline 1606 can optionally be configured to obtain social network data based at least in part on the metadata 1620. For example, the metadata 1620 can include a list of social networks that the user is a part of and the corresponding connection information and/or credentials. Such metadata can be used to obtain the user's social data from the list of social networks including user profiles, contacts, posts, files, and the like on those social networks. The data 1628 obtained by the users pipeline 1606 including the user data obtained at step 1622, the target DB data obtained at step 1624, and the social network data obtained at step 1626, and any other suitable data can be provided to the recommendations pipeline 1608.

The recommendations pipeline 1608 can be configured to make recommendations based at least in part on the data 1628 provided by the users pipeline 1606. In some embodiments, the recommendations pipeline 1608 may comprise modules similar to the modules 1304 discussed in FIG. 13. At step 1630, the recommendations pipeline 1608 can be configured to determine providers to recommend (e.g., using the Also Clicked module) based on user data such as user clicks, user's previously stored favorite providers, preferences, interactions with the interaction infrastructure (e.g., calls), and the like. At step 1632, the recommendations pipeline 1608 can be configured to determine categories to recommend using related searches based on the user's search history. At step 1634, the recommendations pipeline 1608 can be configured to determine categories to recommend based on geo popularity data, day parting information, seasonality, user engagement data, and the like. At step 1636, the recommendations pipeline 1608 can be configured to determine categories to recommend using related categories based on the user's preferences. In a preferred embodiment, the steps 1630-1636 may be executed in parallel. In some other embodiments, at least some of the steps 1630-1636 may be executed sequentially. At step 1638, the recommendations pipeline 1608 can be configured to determine categories to search for providers. Categories recommended by the previous steps may be blended, for example, by the category blending module 1344 of FIG. 13. The blending may involve assigning weights to the recommended categories, ranking weighted categories, and selecting a predetermined number of categories from the ranked categories. At step 1640, the recommendations pipeline 1608 can be configured to create a provider search query for retrieving providers of the categories determined at step 1638 above.

The provider search query 1642 can be provided to a provider search service 1612. The provider search service 1612 can be configured to execute the provider search query 1612 and return search results 1644, to the recommendations pipeline 1608, comprising the data for the requested providers.

The recommendations pipeline 1608 can be configured to process the search results, at step 1646. The processing of the search results can include formatting, filtering, combining, de-duplicating, correlating, and/or any other suitable operations performed on the search results. The processed search results 1647 may be provided to a recommendation response 1610 module.

The recommendation response module 1610 can be configured to create, at step 1648, a recommendations response comprising the processed results. The recommendations response 1650 can be provided to the recommendation endpoint 1602 that initially requested the recommendations.

Figure 17:
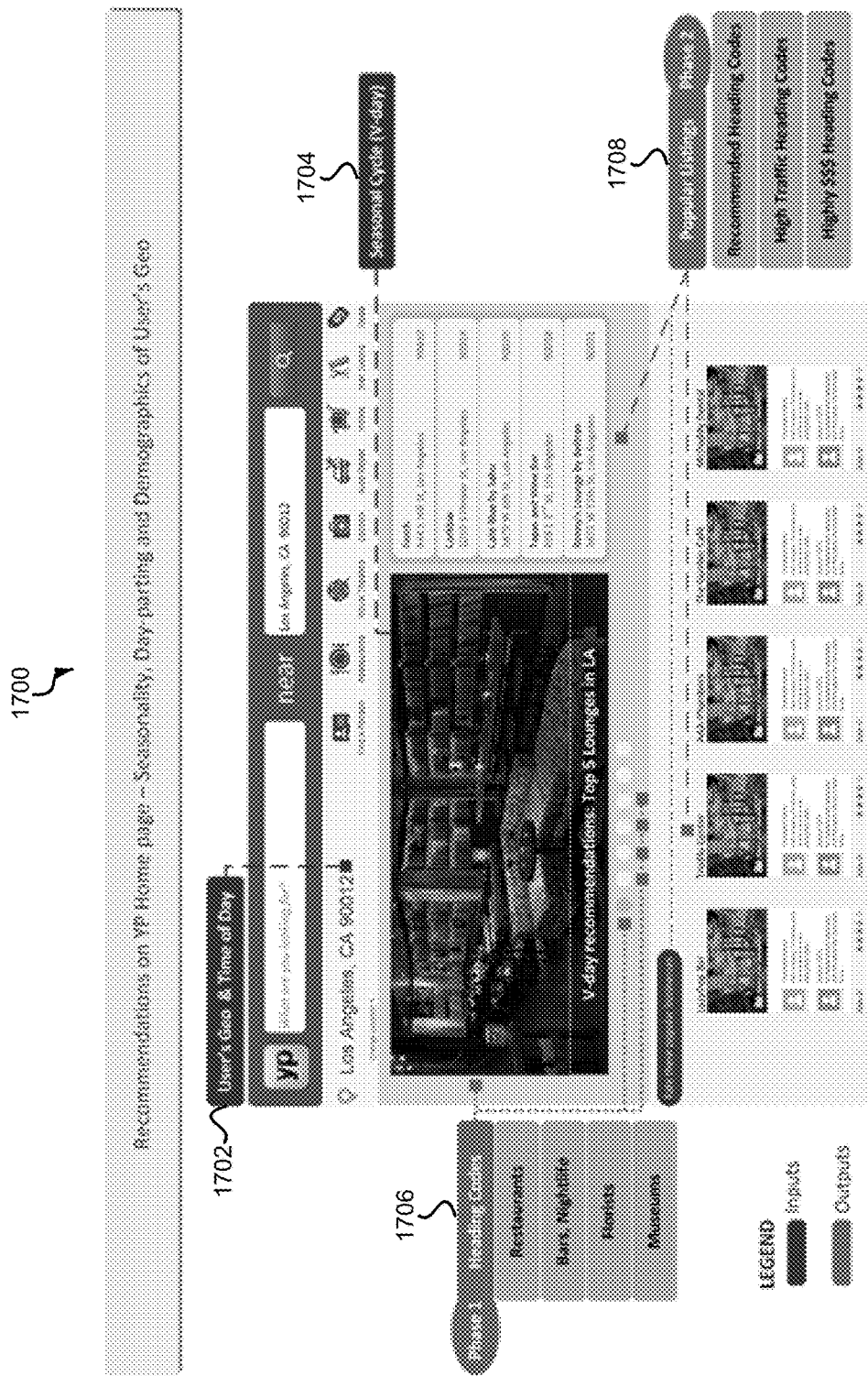
FIG. 17 illustrates a user interface for making personalized provider recommendations in related categories.

FIG. 17 illustrates a user interface 1700 for making personalized provider recommendations in related categories. This figure also illustrates some of the inputs 1702 and 1704 that are used for making recommendations and outputs 1706 and 1708 that include diverse provider recommendations in related categories.

The inputs can include context information that indicates a current condition or an attribute of the user's environment. For example, some context information illustrated in this figure includes the user's geographical location and time of day 1702 as well as the day of year or seasonal cycle 1704, which can indicate information such as holidays (e.g., valentine's day or Christmas) that occur on an annual cycle and apply generally to all users, or events that occur on shorter cycles (e.g., weekly meeting or monthly car wash) that only apply to certain groups of users or specific users. Other context information can include the setting or environment that the user is in (e.g., at home, at work, or out for leisure such as at a park or sporting event) and an activity that the user is performing (e.g., exercising or working) The context information can be inputted by the user through buttons, text boxes and other interface items in the user interface 1700 and/or context information can be received from client device sensors such as GPS, cameras, microphones, accelerometers and gyroscopes.

The user interface 1700 outputs provider recommendations based on the inputs 1702 and 1704 and other user information that can be stored in a user account or profile at a server. The recommendations are organized in two phases. In phase one 1706, provider recommendations are made in related or complementary categories. Category relationships can be professionally curated or the relationships can be mined from user data associated with some or all of the users. For example, mining the data of all users can indicate that users often visit a restaurant and a movie theater during an outing, while mining the data of users that belong to a certain demographic group (e.g., users in the ages of 21-30) can indicate a relationship between the categories of restaurants and bars/nightlife. As shown in user interface 1700, recommendations are made in the related categories of restaurants, bars/nightlife, florists and museums. To ensure diversity, a specific number of provider recommendations are made in each category (e.g., 10 in each category).

In phase two 1708, different types of providers or providers with different offerings are recommended to further increase diversity. For example, a specific number of recommendations can be made for providers that are highly rated, that are offering content objects such as coupons or offers, that are frequently visited, that have paid a fee to be listed, at different price ranges, or any combination of these factors. User interface 1700 is displaying five recommended providers to the right side of the screen based on a traffic amount ranking and five recommendations on the bottom side of the screen based on ratings.

Figure 18:
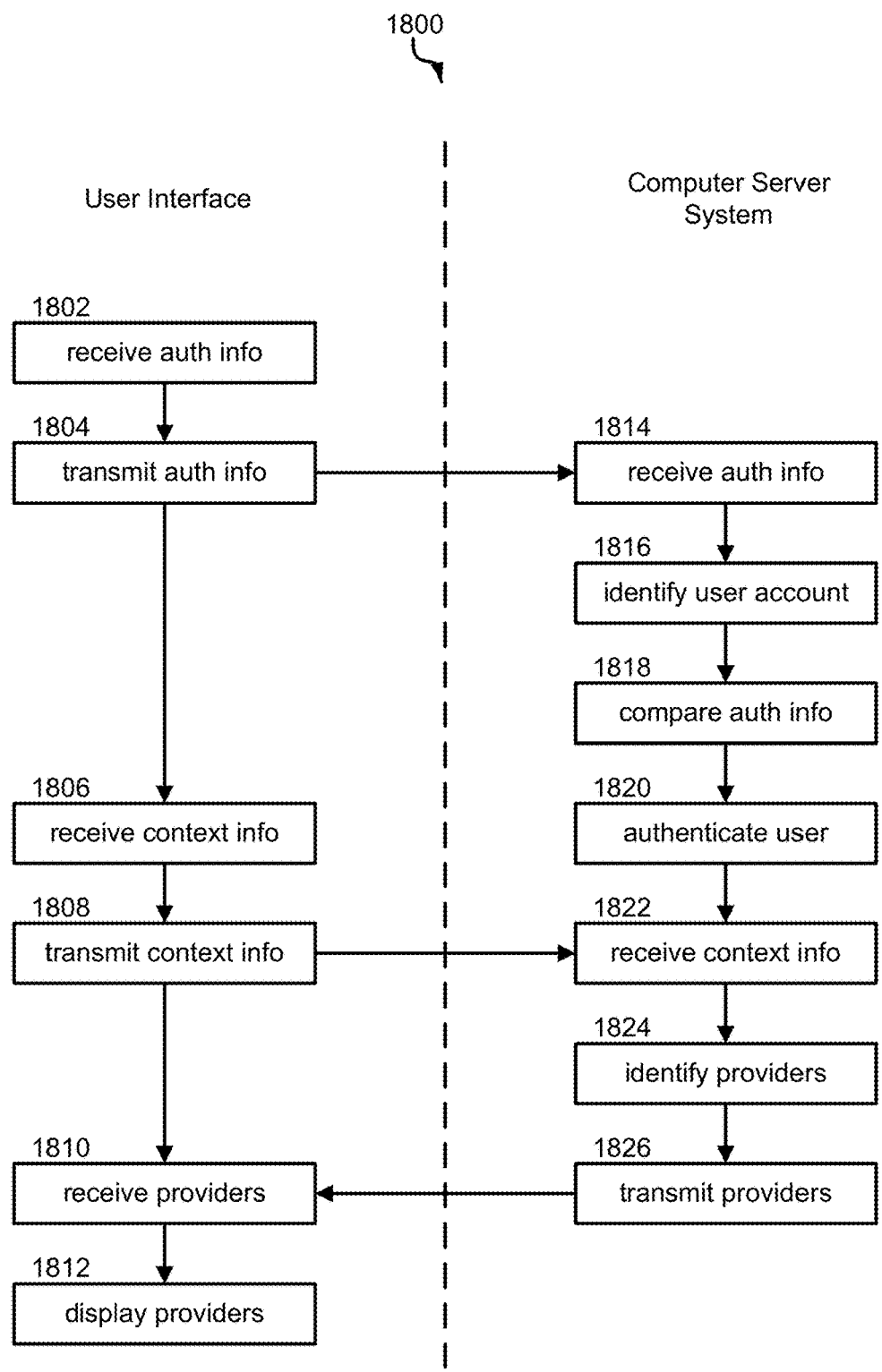
FIG. 18 shows a flowchart of one embodiment of a process for making personalized provider recommendations in related categories.

FIG. 18 shows a flowchart of one embodiment of a process 1800 for making personalized provider recommendations in related categories. This embodiment illustrates the interactions between a user interface executed on a client device and a computer server system. At block 1802, the user interface receives authentication information such as a username and password. At block 1804, the authentication information is transmitted to the computer server system for authentication. At block 1806, the user interface receives context information, for example, from user input or client device sensors. At block 1808, the context information is transmitted to the computer server system for processing. At block 1810, the user interface receives recommended providers from the computer server system, and at block 1812 the providers are displayed in the user interface.

Referring now to the computer server system, at block 1814, the authentication information is received from the user interface. At block 1816, a user account or user profile is identified based on the authentication information. For example, if the authentication information includes a user id, the computer server system can identify a user account based on the user id. At block 1818, the computer server system compares the authentication information received from the user interface with authentication data stored in the user account and at block 1820, the user is authenticated based on the comparison. At block 1822, the context information is received from the user interface and at block 1824, the computer server system identifies providers or provider profiles based on the context information. Additional details relating to the identification of providers are discussed below with reference to FIG. 15. At block 1826, the identified providers are transmitted to the user interface for display as recommendations.

Figure 19:
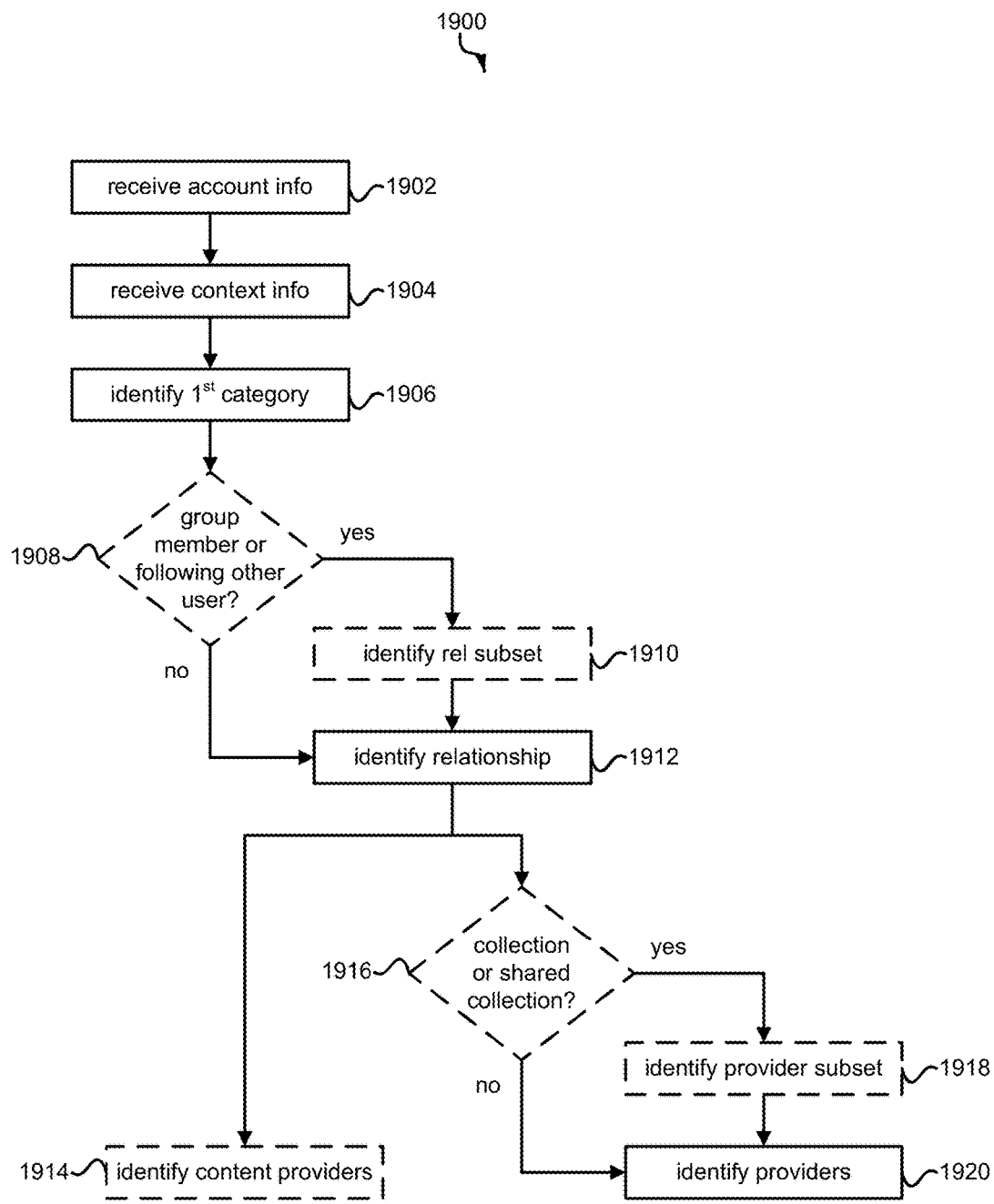
FIG. 19 shows a flowchart of another embodiment of a process for making personalized provider recommendations in related categories.

FIG. 19 shows a flowchart of another embodiment of a process 1900 for making personalized provider recommendations in related categories. In this embodiment, process 1900 starts at block 1902, wherein account information is received. At block 1904, context information is received. A first category is identified at block 1906 based on the context information.

Optional blocks 1908 and 1910 can be performed to further refine the provider recommendation results. At block 1908, if the user is determined to be a member of a group (e.g., a demographic group or privately defined group) or if the user is following another user (e.g., a celebrity), then a subset of the category relationships can be identified to narrow down the search space of relationships at block 1910. For example, if the user is a member of a group, then the subset of relationships that were mined from user profiles of the group can be identified at block 1910. If the user is following a second user, then relationships that are defined by the second user or mined from the second user's profile data can be identified at block 1910. In other embodiments, any number and combination of conditions can be used in blocks 1908 and 1910 to limit the search space to a subset of relationships. This can help reduce the processing time required to identify relationships at block 1912 and improve results by providing more personalized recommendations.

If neither of the conditions in block 1908 are satisfied or if the optional blocks are not performed, one or more category relationships can be identified in block 1912 from a database or stored list of relationships based on the first category identified at block 1906. If any of the conditions in block 1908 are met, then the relationships identified at block 1912 can be selected from the subset of relationships identified at block 1910. Each relationship indicates that one or more categories are related. Thus, the relationships identified at block 1912 indicate one or more additional categories that are related to the first category.

Optional blocks 1914-1918 can be performed to further diversify the provider recommendation results. In this embodiment, block 1914 is performed to identify providers that have an associated content object (e.g., providers that have offers or coupons). At block 1916, a determination is made based on whether the user has defined a collection of providers or if there are any collections that are shared with the user. If either condition is satisfied, a subset of providers can be identified at block 1918 to reduce processing time and provide more personalized results. For example, the subset of providers can correspond to providers in the collections that are defined by the user or shared with the user. In other embodiments, any number and combination of conditions can be used in blocks 1916 and 1918 to limit the search space to a subset of providers. At block 1920, one or more providers are identified for recommendation either from the subset if blocks 1916 and 1918 are performed or from the general database of providers.

The providers identified at blocks 1914 and 1920 are providers that are associated with the first category identified at block 1906 and related categories identified at block 1912. To ensure a diverse mix of recommendation results, a certain number of providers can be identified for each of the first category and related categories, and a certain number of providers can be identified at each block 1914 and 1920 for each category. Furthermore, the providers can be identified based on rankings from the user and other users, the user's geographical location (to find providers that are in close proximity to the user), and other data from the user's profile, which can include the user's history of activity and interactions with the system, providers or provider chains that the user has visited or saved as favorites, and user interests that were provided by the user. In other embodiments, different conditions can be used to identify a certain number of providers of different types. For example, instead of or in addition to identifying content providers at block 1914, providers can be identified based on any combination of factors such as rating, traffic amount, whether a provider paid a listing fee, and price range. Additionally, the content providers identified at block 1914 or other specific type of providers can also be selected from the subset of providers identified at block 1918.

The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random access memory (RAM) and non-volatile storage drive (e.g., disk drive, optical drive, solid state drive), which are forms of tangible computer-readable memory.

The computer-program products may be stored in non-volatile storage drive or another computer-readable medium and loaded into memory. Each processor may comprise a microprocessor, such as a microprocessor from Intel® or Advanced Micro Devices, Inc.®, or the like. To support computer-program products, the systems may run an operating system that handles the communications of the product with the noted components, as well as the communications between the noted components in support of the computer-program product. Exemplary operating systems may include Windows® or the like from Microsoft® Corporation, Solaris® from Oracle®, LINUX, UNIX, and/or the like.

The communications interface(s) may provide an interface to other communication networks and devices and may serve as an interface to receive data from and transmit data to other systems, WANs and/or the Internet. Embodiments of communications interface typically include an Ethernet card, a modem (telephone, satellite, cable, ISDN), a (asynchronous) digital subscriber line (DSL) unit, a FireWire® interface, a USB® interface, a wireless network adapter, and the like. For example, the communications interface may be coupled to a computer network, to a FireWire® bus, or the like. In other embodiments, the communications interface may be physically integrated on a motherboard, and/or may be a software program, or the like.

RAM and non-volatile storage drive are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM and non-volatile storage drive may be configured to store the basic programming and data constructs that provide the functionality of various embodiments of the present invention, as described above.

Software instruction sets that provide the functionality of the present invention may be stored in RAM and non-volatile storage drive. These instruction sets or code may be executed by the processor(s). RAM and non-volatile storage drive may also provide a repository to store data and data structures used in accordance with the present invention. RAM and non-volatile storage drive may include a number of memories including a main random access memory (RAM) to store of instructions and data during program execution and a read-only memory (ROM) in which fixed instructions are stored. RAM and non-volatile storage drive may include a file storage subsystem providing persistent (non-volatile) storage of program and/or data files. RAM and non-volatile storage drive may also include removable storage systems, such as removable flash memory.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" and variations of the term may represent one or more devices for storing data, including read only memory (ROM), random access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for making personalized provider recommendations in related categories, the system comprising:
    a network attached hardware storage configured to store:
    a plurality of entity categories, each entity category indicating at least one of a type of good and a type of service offered by a provider, and providers from different entity categories offer different types of goods or different types of services;
    a plurality of provider specific profiles, each provider specific profile including an associated provider and at least one associated entity category from the plurality of entity categories;
    a plurality of category relationships, each category relationship indicating that two or more entity categories from the plurality of entity categories are related; and
    a plurality of user accounts, each user account including associated authentication data and associated user profile data;
    a user interface configured to:
    receive authentication information from a user;
    transmit the authentication information to a computer server system;
    receive context information indicating at least one of a current condition or an attribute of an environment of the user;
    transmit the context information to the computer server system;
    receive a plurality of providers from the computer server system; wherein the plurality of providers is personalized to the user; and
    display the plurality of providers; and
    the computer server system being communicatively coupled to the network attached storage and the user interface, the computer server system being configured to:
    receive the authentication information from the user interface;
    identify a first user account from the plurality of user accounts based on the authentication information;
    compare the authentication information with a first authentication data that is associated with the first user account;
    authenticate the user based on the comparison of the authentication information with the first authentication data;
    receive the context information from the user interface, the context information comprises a determined geographic location, of the user, determined by a mobile device of the user;
    identify a first entity category from the plurality of entity categories based on the context information;
    identify a first category relationship from the plurality of category relationships based on the first entity category, the first category relationship indicating that the first entity category and a second entity category are related, wherein the second entity category is different from the first entity category;
    select a first provider specific profile from the plurality of provider specific profiles based on first user profile data that is associated with the first user account, wherein the first provider specific profile is associated with the first entity category;
    select a second provider specific profile from the plurality of provider specific profiles based on the first user profile data, wherein the second provider specific profile is associated with the second entity category;
    transmit to the user interface, a first provider associated with the first provider specific profile and a second provider associated with the second provider specific profile, wherein the first provider and the second provider are different providers;
    process a content provisioning management layer engine to provide an intermediary content interface for the first provider and the second provider to manage intermediary content transmitted by an intermediary system to the user interface on behalf of the first provider and the second provider where the content provisioning management layer engine analyzes the intermediary content transmitted and based on the analysis assigns the intermediary system to one or more of a specific category and a general category, to thereby provide a central management for intermediary content information transmitted between the first and second providers, the intermediary system and the user interface; and
    in response to transmitting the first and second providers to the user interface, adjust the user interface to lower resolution of the user interface and computational resources required to display the transmitted providers on the mobile device of the user.

2. The system for making personalized provider recommendations in related categories of claim 1, wherein the context information includes a current day of year, and wherein the computer server system identifies the first entity category based on the current day of year.

3. The system for making personalized provider recommendations in related categories of claim 1, wherein the context information includes a current time of day, and wherein the computer server system identifies the first entity category based on the current time of day.

4. The system for making personalized provider recommendations in related categories of claim 1, wherein the context information includes a geographical location, and wherein the computer server system identifies the first entity category based on the geographical location.

5. The system for making personalized provider recommendations in related categories of claim 1, wherein the first user profile data includes a user location history, and wherein the computer server system identifies the first provider specific profile based on the user location history.

6. The system for making personalized provider recommendations in related categories of claim 1, wherein the first user profile data includes a user interest provided by the user, and wherein the computer server system identifies the first provider specific profile based on the user interest.

7. The system for making personalized provider recommendations in related categories of claim 1, wherein the first user profile data includes a user activity history indicating previous user interactions with the system, and wherein the computer server system identifies the first provider specific profile based on the user activity history.

8. A method for making personalized provider recommendations in related categories, the method comprising:
   storing a plurality of entity categories, each entity category indicating at least one of a type of good and a type of service offered by a provider, and providers from different entity categories offer different types of goods or different types of services;
   storing a plurality of provider specific profiles, each provider specific profile including an associated provider and at least one associated entity category from the plurality of entity categories;
   storing a plurality of category relationships, each category relationship indicating that two or more entity categories from the plurality of entity categories are related;
   storing a plurality of user accounts, each user account including associated authentication data and associated user profile data;
   receiving authentication information from a user;
   identifying a first user account from the plurality of user accounts based on the authentication information;
   comparing the authentication information with first authentication data that is associated with the first user account;
   authenticating the user based on the comparison of the authentication information with the first authentication data;
   receiving context information indicating at least one of a current condition or an attribute of an environment of the user, the context information comprises a determined geographic location, of the user, determined by a mobile device of the user;
   identifying a first entity category from the plurality of entity categories based on the context information;
   identifying a first category relationship from the plurality of category relationships based on the first entity category, the first category relationship indicating that the first entity category and a second entity category are related, wherein the second entity category is different from the first entity category;
   selecting a first provider specific profile from the plurality of provider specific profiles based on first user profile data that is associated with the first user account, wherein the first provider specific profile is associated with the first entity category;
   selecting a second provider specific profile from the plurality of provider specific profiles based on the first user profile data, wherein the second provider specific profile is associated with the second entity category;
   transmitting to a user interface a first provider associated with the first provider specific profile and a second provider associated with the second provider specific profile, wherein the first provider and the second provider are different providers;
   processing a content provisioning management layer engine to provide an intermediary content interface for the first provider and the second provider to manage intermediary content transmitted by an intermediary system to the user interface on behalf of the first provider and the second provider where the content provisioning management layer engine analyzes the intermediary content transmitted and based on the analysis assigns the intermediary system to one or more of a specific category and a general category, to thereby provide a central management for intermediary content information transmitted between the first and second providers, the intermediary system and the user interface; and
   in response to transmitting the first and second providers to the user interface, adjusting the user interface to lower resolution of the user interface and lower computational resources required to display the transmitted providers on the mobile device of the user.

9. The method for making personalized provider recommendations in related categories of claim 8, wherein displaying the plurality of providers includes displaying a specific number of providers in each of the first entity category and the second entity category.

10. The method for making personalized provider recommendations in related categories of claim 8, wherein displaying the plurality of providers includes displaying providers for a specific number of entity categories.

11. The method for making personalized provider recommendations in related categories of claim 8, further comprising:
    identifying a subset of provider specific profiles from the plurality of provider specific profiles,
    wherein the first provider specific profile is identified from the subset of provider specific profiles.

12. The method for making personalized provider recommendations in related categories of claim 11, wherein each provider specific profile in the subset includes an associated content object.

13. The method for making personalized provider recommendations in related categories of claim 11, wherein each provider specific profile in the subset belongs to a user collection generated by the user.

14. The method for making personalized provider recommendations in related categories of claim 13, wherein each provider specific profile in the user collection includes an associated ranking, and wherein the first provider specific profile is identified based on a first ranking associated with the first provider specific profile.

15. The method for making personalized provider recommendations in related categories of claim 11, wherein each provider specific profile in the subset belongs to a user collection generated by a second user, and wherein the user collection is shared with the user from which the authentication information is received.

16. The method for making personalized provider recommendations in related categories of claim 8, further comprising:
    determining the first category relationship based on a second user profile data associated with a second user account.

17. The method for making personalized provider recommendations in related categories of claim 16, wherein the second user profile data includes a user collection generated by a second user, and wherein the first category relationship is determined based on the user collection.

18. A non-transitory computer-readable medium, having instructions stored therein, which when executed cause a computer to perform a set of operations comprising:
receiving authentication information for a user;
identifying a first user account from a plurality of user accounts based on the authentication information;
comparing the authentication information with first authentication data that is associated with the first user account;
authenticating the user based on the comparison of the authentication information with the first authentication data;
receiving context information indicating at least one of a current condition or an attribute of an environment of the user, the context information comprises a determined geographic location, of the user, determined by a mobile device of the user;
identifying a first entity category from a plurality of entity categories based on the context information, each entity category indicating at least one of a type of good and a type of service offered by a provider, and providers from different entity categories offer different types of goods or different types of services;
identifying a first category relationship from a plurality of category relationships based on the first entity category, the first category relationship indicating that the first entity category and a second entity category are related, wherein the second entity category is different from the first entity category;
selecting a first provider specific profile from a plurality of provider specific profiles based on a first user profile data that is associated with the first user account, wherein the first provider specific profile is associated with the first entity category;
selecting a second provider specific profile from the plurality of provider specific profiles based on the first user profile data, wherein the second provider specific profile is associated with the second entity category;
transmitting to a user interface a first provider associated with the first provider specific profile and a second provider associated with the second provider specific profile, wherein the first provider and the second provider are different providers;
processing a content provisioning management layer engine to provide an intermediary content interface for the first provider and the second provider to manage intermediary content transmitted by an intermediary system to the user interface on behalf of the first provider and the second provider where the content provisioning management layer engine analyzes the intermediary content transmitted and based on the analysis assigns the intermediary system to one or more of a specific category and a general category, to thereby provide a central management for intermediary content information transmitted between the first and second providers, the intermediary system and the user interface; and
in response to transmitting the first and second providers to the user interface, adjusting the user interface to lower resolution of the user interface and lower computational resources required to display the transmitted providers on the mobile device of the user.

19. The non-transitory computer-readable medium of claim 18, having further instructions stored therein, which when executed cause the computer to perform a set of operations comprising:
identifying a subset of category relationships from the plurality of category relationships,
wherein the first category relationship is identified from the subset of category relationships.

20. The non-transitory computer-readable medium of claim 19, having further instructions stored therein, which when executed cause the computer to perform a set of operations comprising:
determining that the first user account is following a second user account, wherein the subset of category relationships is identified based on a second user profile data associated with the second user account.

* * * * *